(12) United States Patent
Levenson

(10) Patent No.: US 7,324,019 B2
(45) Date of Patent: Jan. 29, 2008

(54) ADJUSTABLE ERGONOMIC KEYBOARD FOR USE WITH STATIONARY PALM AND ELEMENTS THEREOF

(76) Inventor: David J. Levenson, 5463 Maynard St., Pittsburgh, PA (US) 15217

( * ) Notice: Subject to any disclaimer, the term of this patent is extended or adjusted under 35 U.S.C. 154(b) by 460 days.

(21) Appl. No.: 10/169,654

(22) PCT Filed: Jan. 3, 2001

(86) PCT No.: PCT/US01/00162

§ 371 (c)(1),
(2), (4) Date: Jul. 3, 2002

(87) PCT Pub. No.: WO01/50608

PCT Pub. Date: Jul. 12, 2001

(65) Prior Publication Data

US 2003/0011503 A1    Jan. 16, 2003

(51) Int. Cl.
*H03M 11/00* (2006.01)
(52) U.S. Cl. .................. 341/22; 400/488; 400/489; 400/486; 345/168
(58) Field of Classification Search ............ 341/20, 341/22; 400/488, 493, 489, 486; 345/157, 345/168
See application file for complete search history.

(56) References Cited

U.S. PATENT DOCUMENTS

| | | | |
|---|---|---|---|
| 3,929,216 A | 12/1975 | Einbinder |
| 3,945,482 A | 3/1976 | Einbinder |
| 4,244,659 A | 1/1981 | Malt |
| 4,265,557 A | 5/1981 | Runge |
| 4,332,493 A | 6/1982 | Einbinder |
| 4,517,424 A | 5/1985 | Kroczynski |
| 4,565,460 A | 1/1986 | Kline |
| 4,584,443 A | 4/1986 | Yaeger |
| 4,597,681 A | 7/1986 | Hodges |
| 4,661,005 A | 4/1987 | Lahr |
| 4,754,268 A | 6/1988 | Mori |
| 4,824,268 A | 4/1989 | Diernisse |
| 4,849,732 A | 7/1989 | Dolenc |
| 4,913,573 A | 4/1990 | Retter |
| 4,917,516 A | 4/1990 | Retter |
| 5,073,050 A | 12/1991 | Andrews |
| 5,076,834 A | 12/1991 | Ohba et al. |
| 5,119,078 A | 6/1992 | Grant |
| 5,122,786 A | 6/1992 | Rader |
| 5,137,384 A | 8/1992 | Spencer et al. |
| 5,156,475 A | 10/1992 | Zilberman |
| 5,160,919 A | 11/1992 | Mohler et al. |
| 5,178,477 A | 1/1993 | Gambaro |

(Continued)

*Primary Examiner*—Albert K. Wong
(74) *Attorney, Agent, or Firm*—The Webb Law Firm

(57) ABSTRACT

An ergonomic keyboard as shown in FIG. 3A for use with a stationary palm wherein the keys (15) of the keyboard are actuated only by motion of the joints in the digits. The keyboard may have a thumb region (20), a palm rest region (8) and a hypothenar rest region which are discrete parts and are adjustable relative to one another along a longitudinal axis. Some keys may be actuated by the back surface of the digits. The keyboard may be on an upper portion (2) which is mounted on a base (1) such that three dimensional rotational adjustment is possible between the upper portion and base. The position of the keyboard relative to a user may be adjusted. The spacing of the keys on the keyboard may be spaced at different intervals and have different forces for actuation.

23 Claims, 60 Drawing Sheets

U.S. PATENT DOCUMENTS

| | | |
|---|---|---|
| 5,212,473 A | 5/1993 | Louis |
| 5,228,791 A | 7/1993 | Fort |
| 5,270,709 A | 12/1993 | Niklsbacher |
| 5,302,040 A | 4/1994 | Louis |
| 5,311,210 A | 5/1994 | O'Brien et al. |
| 5,318,367 A | 6/1994 | Braun et al. |
| 5,332,322 A | 7/1994 | Gambaro |
| 5,339,097 A | 8/1994 | Grant |
| 5,341,133 A | 8/1994 | Savoy et al. |
| 5,351,066 A | 9/1994 | Rucker et al. |
| 5,360,280 A | 11/1994 | Camacho et al. |
| 5,372,441 A | 12/1994 | Louis |
| D354,279 S | 1/1995 | Ciccone |
| 5,388,921 A | 2/1995 | Chung |
| 5,391,006 A | 2/1995 | Danziger |
| 5,393,150 A | 2/1995 | Fort |
| D356,075 S | 3/1995 | Paloyan et al. |
| D356,553 S | 3/1995 | Retter |
| 5,397,189 A | 3/1995 | Minogue |
| D357,011 S | 4/1995 | Paull et al. |
| 5,410,333 A | 4/1995 | Conway |
| D357,911 S | 5/1995 | Grant et al. |
| 5,411,341 A | 5/1995 | Ullman |
| 5,416,498 A | 5/1995 | Grant |
| 5,424,728 A | 6/1995 | Goldstein |
| 5,426,449 A | 6/1995 | Danziger |
| 5,432,510 A | 7/1995 | Matthews |
| D361,562 S | 8/1995 | Beltz |
| 5,439,304 A | 8/1995 | Phillips et al. |
| D362,432 S | 9/1995 | Paull et al. |
| 5,456,542 A | 10/1995 | Welch et al. |
| 5,457,452 A | 10/1995 | Skovronski |
| 5,458,425 A | 10/1995 | Torok |
| 5,469,160 A | 11/1995 | Yang |
| 5,476,332 A | 12/1995 | Cleveland, Jr. |
| 5,481,263 A * | 1/1996 | Choi ............................ 341/20 |
| 5,486,058 A | 1/1996 | Allen |
| 5,493,654 A | 2/1996 | Gopher et al. |
| 5,497,151 A | 3/1996 | Dombroski |
| 5,500,643 A | 3/1996 | Grant |
| 5,502,460 A | 3/1996 | Bowen |
| 5,503,484 A | 4/1996 | Louis |
| 5,508,719 A | 4/1996 | Gervais |
| 5,521,596 A | 5/1996 | Selker et al. |
| 5,543,790 A | 8/1996 | Goldstein |
| 5,552,782 A | 9/1996 | Horn |
| 5,583,497 A | 12/1996 | Hankes |
| 5,594,618 A | 1/1997 | Sellers |
| 5,612,691 A | 3/1997 | Murmann et al. |
| 5,612,718 A | 3/1997 | Bryan |
| 5,613,786 A | 3/1997 | Howell et al. |
| 5,626,222 A | 5/1997 | Aguilera |
| 5,626,427 A | 5/1997 | Klauber et al. |
| 5,627,566 A | 5/1997 | Litschel |
| 5,642,108 A | 6/1997 | Gopher et al. |
| 5,653,543 A | 8/1997 | Abe |
| 5,660,488 A | 8/1997 | Miller |
| 5,673,040 A | 9/1997 | Hargreaves et al. |
| 5,676,476 A | 10/1997 | Uke |
| 5,689,253 A | 11/1997 | Hargreaves et al. |
| 5,730,403 A | 3/1998 | Johnson |
| 5,742,242 A | 4/1998 | Sellers |
| 5,764,164 A | 6/1998 | Cartabiano et al. |
| 5,764,180 A | 6/1998 | Cummings |
| 5,781,127 A | 7/1998 | Kleve |
| 5,796,354 A | 8/1998 | Cartabiano et al. |
| 5,818,357 A | 10/1998 | Motoyama et al. |
| 5,899,616 A | 5/1999 | Caplan |
| 5,902,257 A | 5/1999 | Korth |
| 5,982,357 A | 11/1999 | Burgett et al. |
| 6,002,184 A | 12/1999 | Delson et al. |
| 6,005,496 A | 12/1999 | Hargreaves et al. |
| 6,084,576 A | 7/2000 | Leu et al. |
| 6,127,949 A | 10/2000 | Dodd |
| 6,147,422 A | 11/2000 | Delson et al. |
| 6,184,804 B1 | 2/2001 | Harrison |

* cited by examiner

FIG. 7  TOP

FIG. 4  FRONT 1 cm

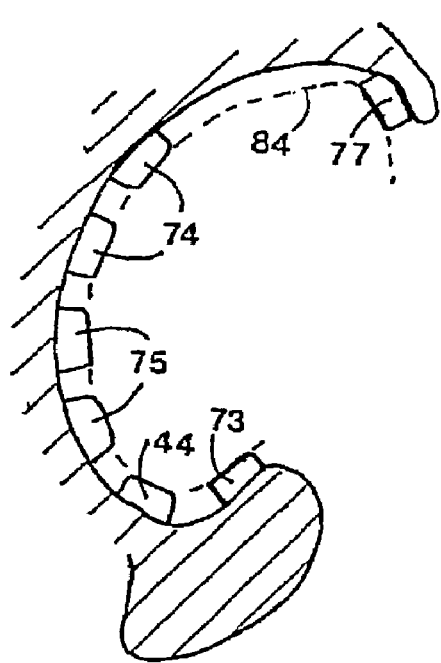
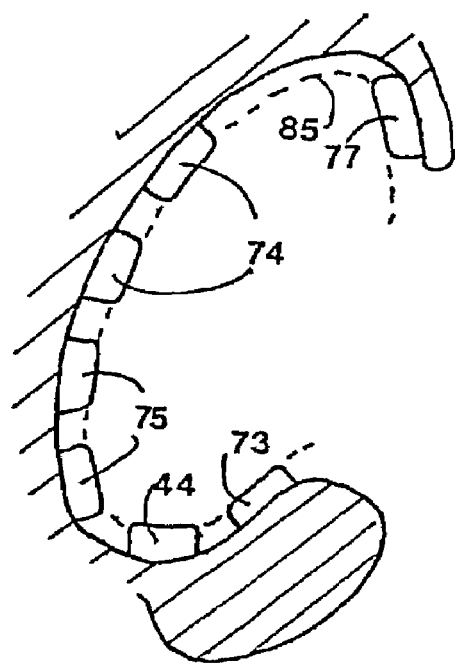
FIG. 27A  FIG. 27B
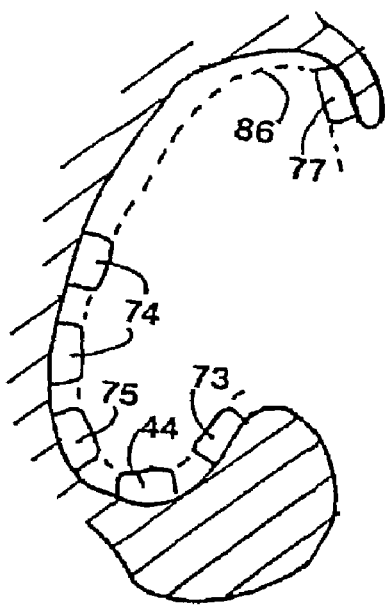
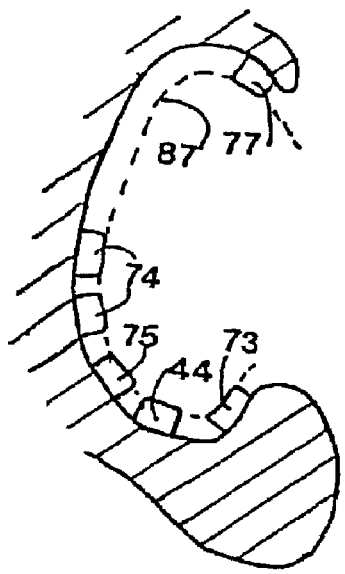
FIG. 27C  FIG. 27D
1 cm

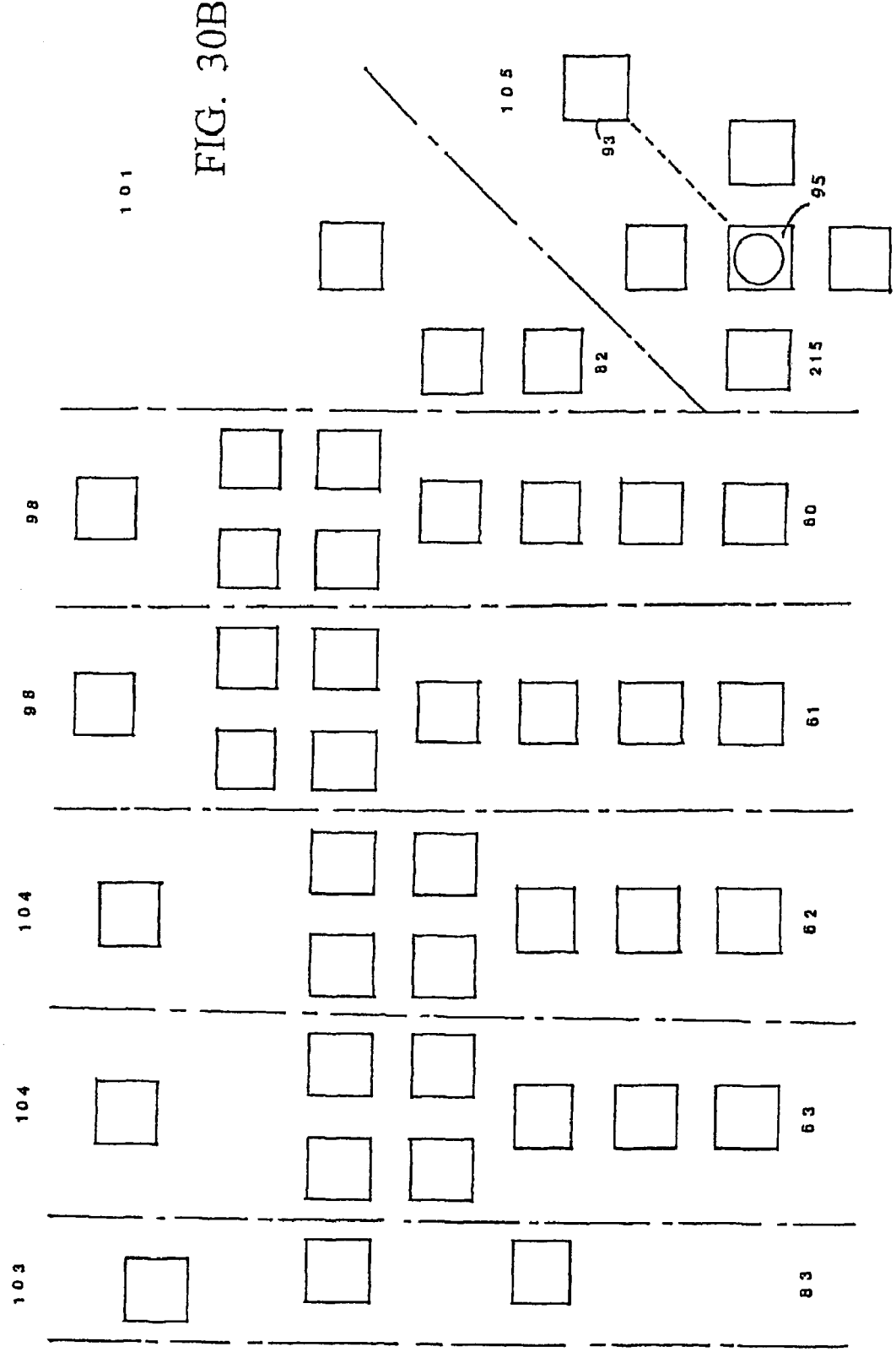

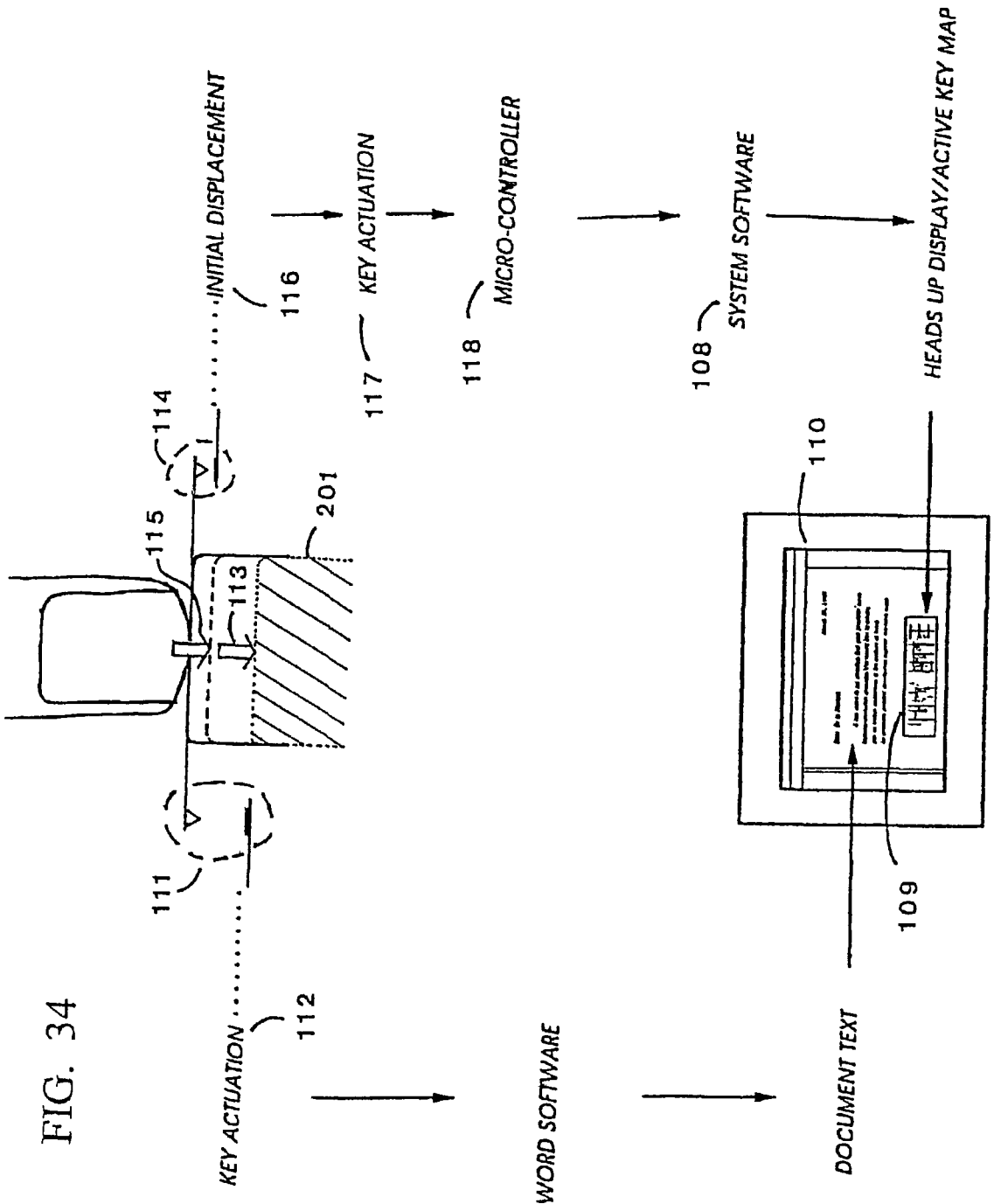

ADJUSTABLE ERGONOMIC KEYBOARD FOR USE WITH STATIONARY PALM AND ELEMENTS THEREOF

BACKGROUND OF THE INVENTION

1. Field of the Invention

The field of this invention is generally related to the topic of computer keyboards. More specifically this invention focuses upon keyboard design issues pertaining to ergonomic arrangements which permit the user to operate the keyboard in a standard fashion for data input to a computer, while achieving maximal adjustability to suit the user's anatomic requirements and ergonomic constraints. Improvements in these areas permit enhanced efficiency of key, manifest as improved speed and accuracy, while simultaneously minimizing upper extremity malpositioning and user effort and strain, which together may lead to repetitive stress injury, carpal tunnel syndrome and similar disorders.

2. Description of Related Art

For purposes of this application, the five digits on the hand may alternately be referred to as four fingers and a thumb.

Conventional contemporary computer keyboards, which serve as user-computer interfaces for such purposes as data and text input, trace their general design and functional characteristics to manual typewriters. Those earlier machines utilized mechanical linkages to convert finger pressure into symbols embossed upon paper. The functional mechanical design requirements of those typewriters produced a standard keyboard arrangement in which all keys were of similar size and were ordered in flat, parallel horizontal rows. Keys were not aligned in vertical rows, however, since the underlying mechanical linkages required that keys be offset with respect to keys in rows above and below. In order that all typed symbols achieve similar print density and appearance, it was necessary to apply the same vertical typing pressure to each key, regardless of which finger was utilized.

Mechanical linkages therefore dictated the fundamental arrangement and operation of keys. Typing, of necessity, required that fingers move to where keys were located and that they function as dictated by those mechanical arrangements. Little consideration was given to the functional anatomy of the fingers and hand.

Interestingly, many of the design characteristics of those original key arrangements and operations have been carried over, perhaps unwittingly, to conventional contemporary computer keyboards, even though the mechanical considerations which necessitated the original design are no longer relevant.

Both mechanical typewriters and contemporary computer keyboards share the following characteristics: a) the wrist and hand are not intended to rest upon any support while typing; b) each key is actuated by a downward pressing motion, regardless of where the key is located and which finger is utilized; c) keys are generally of similar size, shape and surface contour; d) key spacing is generally equal; and e) key tops define a typing surface which is level (or only slightly sloped) and generally continuous (i.e., key tops are not significantly elevated or depressed relative to each other). In addition, in both typing systems, key selection by the four fingers of each hand requires two kinds of motions: first, the fingers move through the air from key to key, often stretching to reach keys which are not within immediate reach and, second and simultaneously, the forearms, wrists and hands move in a subtly coordinated fashion to help position each finger in the appropriate location. Finally, the actual motions required to actuate the key selected are multiple and complex. They may include, at various times and in varying combinations, motions at the shoulder, elbow, forearm, wrists and the different finger joints.

Although widespread usage has demonstrated the functionality of current computer keyboards, these functional features of the computer keyboard have created a number of important problems, limitations and difficulties. These may be summarized as follows:

A. According to experts who study the ergonomics of keyboard usage, typing is optimally performed without resting or supporting any portion of either upper extremity upon the keyboard or supporting desk. Although occasional interludes for resting the wrists and hands are expected, the unsupported wrist, arm and shoulder can become tired during prolonged typing, and such fatigue increases both the mechanical stress on the limbs and the user's psychological stress.

B. The design of most keyboards necessitates that, for typing, the wrists be moved close together and turned outward (so-called ulnar or lateral deviation). Continuous muscular effort is required to maintain this position. Such an arrangement is therefore uncomfortable and stressful, and may contribute to carpal tunnel syndrome. More generally, any malpositioning of joints and tendons during keyboard use may be a factor in repetitive use injury.

C. The process of locating each key to be actuated in succession is difficult. Ideally, the user would combine visual and tactile cues to position each finger precisely for sequential key actuation. However, the technique of touch-typing directs the eyes away from the keyboard, to either the source material used for input of data or the CRT screen to monitor the information as it appears after input. Thus, tactile cues become essential for correct finger positioning for key selection and inadequate tactile cues about key location, and identity often becomes a limiting factor in user efficiency. Two aspects of tactile input are important in this regard:

1) the tactile determination of distance and direction for one key to another;

A lack of tactile cues about key to key distance and location occurs most frequently in the process of moving fingers from one distant key to another. As noted above, the hand and palm are not intended to rest upon the keyboard while typing, so they cannot provide any permanent geographic landmarks. The act of reaching up or down, and laterally or medially to actuate a distant key, often requires that the finger or fingers be lifted off their respective initial locations before moving to the next distant keys. This process eliminates most of the essential physical reference points between various fingers which facilitate determination of the precise distance and direction from one key to another. In essence, the user, through training and intuition, learns to measure distances and directions between keyboard points in terms of distance and direction between various regions of the hand. When one finger remains positioned on a first key, it is possible to use the hand to measure the correct distance and direction to the next key. However, when the user must lift the finger off the first key to reach the next, the initial point for measurement is lost, and the accuracy of locating the next key is reduced.

2) the differential tactile features of each key surface which may help to distinguish one key from another;

As the finger arrives near the destination key, recognition of the precise key location can be facilitated by the tactile features of the surface being touched. In most keyboards, the surfaces, shapes and contours of the various keys are identical. In addition, the flat keyboard surface lacks any geographic or topological landmarks or cues. Thus, key identification is impaired by the lack of any tactile features which would aid in distinguishing the desired key from adjacent ones.

D. The linear arrangement of key rows, combined with similar key sizes and constant key to distances, forces the smallest fingers reach the same distance and apply the same pressure for key actuation as required for the longest and strongest fingers. This situation, combined with the distorted orientation of the wrist described above, places excessive strain on the smaller fingers during key actuation.

E. The flat keyboard surface forces the hands and forearms to rotate inward (internal rotation), a position which tends to force the elbows up and out, increasing muscular effort and stress.

In sum, these characteristics place several limitations on the functionality of the keyboard. These limitations include:

A. The lack of hand and wrist support, plus the awkward hand, wrist and forearm position and difficult reach for certain finger-key combinations, cause significant stress on ligaments and tendons, promoting fatigue and increasing the tendency to repetitive stress injury.

B. The lack of adequate tactile cues, plus the need to select keys from a mid-air position, combined with the difficult reach for certain fingers, slow typing speed and increases the error rate for key selection.

Numerous modifications to individual aspects of the typewriter and computer keyboard have been introduced or proposed to address these issues. Several themes may be discerned in the prior art:

A. Improvement in the Positioning of the Hands.

Many arrangements have been disclosed which permit a separation of the keyboard into two halves by a variety of sliding, rotating or similar mechanisms or by creating two independent and unattached keyboard halves. This arrangement tends to lessen ulnar deviation of the hands. Other arrangements previously disclosed permit the adjustment of the keyboard position in one or more of three orthogonal axes, thereby influencing the degree of forearm internal/external rotation, wrist flexion/extension and wrist radial/ulnar deviation (Szmanda et al. U.S. Pat. No. 5,067,834; Rader U.S. Pat. No. 5,122,786; Fort U.S. Pat. No. 5,228,791; Fort U.S. Pat. No. 5,393,150; Danziger U.S. Pat. No. 5,426,499; Skovronski U.S. Pat. No. 5,457,452). However, in these latter arrangements, which utilize a ball and socket or similar mechanism, the center of rotation in each axis is displaced somewhat away from the center of the hand and of the face of the keyboard. Thus, when the keyboard is rotated by means of any of those adjustment methods, the hands and the keyboards are displaced varying distances forward, back, up, down and/or laterally. Thus, a second compensatory adjustment of the keyboard must be made to return the hand to its original spatial location and orientation relative to the body and the other hand.

B. Supports for the Wrists and/or Forearms.

A flat padded surface, situated at the lower edge of the keyboard, and intended for resting the wrist or hypothenar eminence when not typing, is available as an integral feature of many keyboards and may be obtained as a separate component for attachment to keyboards. In addition to providing some comfort to the user, this modification is intended to optimize wrist positioning, thereby reducing the likelihood of carpal tunnel syndrome. Several patents disclose arrangements to support the forearm while using a keyboard. In Danziger U.S. Pat. No. 5,426,499, a hand support is described. In Rader U.S. Pat. No. 5,122,786, a forearm rest is described; it has several adjustments for positioning the forearm, but does not provide for adjustment of wrist flexion/extension. Hargreaves et al. U.S. Pat. No. 5,689,253 and Johnson U.S. Pat. No. 5,730,403 show different methodologies for support of the palm while typing.

In Bryan U.S. Pat. No. 5,612,718, extensive consideration is given to positioning keyboard halves on the arms of a chair, with adjustments of keyboard position and some adjustments of an arm rest or arm support. Similarly, Litschel U.S. Pat. No. 5,627,566 shows two types of integral forearm supports, and Bryan U.S. Pat. No. 5,612,718 shows a variably adjustable chair with an adjustable arm assembly for support of the forearm.

C. Improvements in the Orientation of Keys Relative to the Fingers.

Prior art patents (Einbinder U.S. Pat. No. 3,929,216; Einbinder U.S. Pat. No. 3,945,482; Malt U.S. Pat. No. 4,244,659; Einbinder U.S. Pat. No. 4,332,493; Zilberman U.S. Pat. No. 5,156,475; Gambaro U.S. Pat. No. 5,178,477; Louis U.S. Pat. No. 5,302,040; Louis U.S. Pat. No. 5,372,441; and Hargreaves et al. U.S. Pat. Nos. 5,673,040, 5,689,253) have disclosed vertically curved keyboards, which presumably bring the upper row or rows of keys closer to the fingers, although this does not preferentially help the shorter fingers. One patent (Danziger U.S. Pat. No. 5,391,003) discloses snap-on keys of varying heights to create the desired curve. Another patent (Choi U.S. Pat. No. 5,481,263) attaches the keys to a curved vertical rib. None describes how the precise or correct curvature is established or determined.

D. Variation in the Size, Spacing and Orientation of Individual Keys.

Some inventions give varying degrees of explicit attention to key size and spacing. In Hodges U.S. Pat. No. 4,597,681 an "adjustable keyboard" is disclosed, built around keys whose height and angulation may be individually adjusted to reposition the rows of keys closer together or further apart. In Camacho U.S. Pat. No. 5,360,280, the center keys are elongated to accommodate a central curved area of the keyboard. In Minogue U.S. Pat. No. 5,397,189, slight variations in inter-key spacing are described, though the intent seems to be to achieve conventional distances. In Conway U.S. Pat. No. 5,410,333, the front and back keys are different widths, 18 vs. 15 mm. In Choi U.S. Pat. No. 5,481,263, the spacing between adjacent vertical rows (ribs) can be adjusted by sliding or pivoting the ribs. In Litschel U.S. Pat. No. 5,627,566, unique keys with multiple sensors are disclosed, in which the height and the key spacing are exactly fitted to the user's hand by means of an adjustment screw or with smaller or larger key units. No systematic discussion of the methodology for determining key spacing or key size adjustments is presented in those prior art patents.

A fundamental paradox arises in these design efforts. Critical analysis indicates that if any portion of upper extremity is supported during typing, the inherent mobility of the hand will be reduced. Since the current arrangement of keys is such that finger motions without hand movements are inadequate to reach many keys, the reduced mobility of the hand caused by the rest support will make typing even more difficult.

To the Applicant's knowledge, no patents disclose a keyboard arrangement specifically designed for use with a stationary hand or palm. Such a feature is desirable in a keyboard design.

Certain premises are inherent in the design and arrangement disclosed here. These premises are:

A. The wrists will rest on a comfortable support. This support may also involve contact with, and support of, the adjacent area of the palm, but for simplicity reference is solely to a wrist support. Supports for the forearm may also be optionally supplied.

B. The wrist support will permit the entire upper extremity to be oriented in any comfortable and ergonomically correct position. This position, with the forearms somewhat separated, is described with reference to rotation relative to the length of the forearm (internal/external rotation), and with respect to up/down (flexion/extension) and left/right (radial/ulnar deviation) position of the wrist. By necessity, the best position will be somewhat different for each user; hence, this keyboard invention incorporates adjustability of the wrist support to permit the wrist to rest to any comfortable and ergonomically appropriate position.

C. The hand and digits will rest naturally in comfortable and ergonomically correct positions. Conventional keyboard arrangement forces the hand and digits to lie almost flat, on a single plane or surface. Casual inspection indicates that the thumb flexes and extends along a plane perpendicular to the flexion/extension plane for the other fingers. Further, when at rest the tips of the fingers do not naturally lie along a single straight line but describe a curve reflecting the different lengths of the fingers. Thus, an ergonomically correct rest position (or "home" position) for the hand will require home row keys which are oriented in unconventional positions and directions, i.e., different from those found in conventional keyboards.

D. Key actuation will require only natural, ergonomically appropriate motions of the digits alone. This feature follows logically from the previously described features. Since the wrists (and possibly the adjacent palm areas) are supported, maintained in a stationary position and not intended to be mobile, only digit motion is possible. Key arrangements are therefore necessary which enable key actuation by finger motions which are comfortable and easy, and which do not require difficult reaching, stretching or twisting of the fingers. In essence, keys are positioned where the fingers can naturally and easily reach them for key actuation.

Several advantages of such an arrangement may thus be identified as:

A. Arm, forearm and wrist are positioned and supported in comfortable and ergonomically correct positions, lessening stress and decreasing the likelihood of repetitive stress injury.

B. These arm, forearm and wrist positions can be adjusted to suit each individual user.

C. By requiring only digit motion for key actuation, the chance of key selection error is reduced, since the wrist and palm remain as stationary reference points as the digit seeks out its target key.

D. The rest positions for the digits, and the motions utilized for key actuation are comfortable, easy and ergonomically sound, lessening the effort, degree of stress and likelihood of repetitive stress injury and keystroke errors.

However, certain problems and difficulties may be discerned when one attempts to superimpose such a keyboard arrangement upon previously disclosed keyboards. These problems and difficulties are:

A. Existing keyboard surfaces are flat or only mildly contoured. Even in the most contoured keyboards, the longer fingers are closer to the surface of the keyboard than the shorter fingers of the same hand, making it more difficult for the shorter ones to reach and actuate keys. This effect is enhanced as the fingers move up and down or laterally to actuate keys which are equally spaced from each other. It is further exaggerated by the requirement that the wrist and palm remain stationary, forcing all fingers to do excessive stretching to reach more distant keys.

B. Even if an arrangement can be established which positions keys at an appropriate distance from the finger tips of the average user, this arrangement may not be suitable for other users with different hand and finger sizes.

C. When a keyboard is split into right and left sections which are separated from each other and then tilted or angled to suit the user's comfort, most keys will not be visible; hence, visual cues used for locating keys will be reduced or eliminated, increasing the difficulty of key selection.

D. By requiring only digit motion for key actuation, the muscles of the weaker digits (i.e., ring and short fingers) are required to provide the same force for key actuation as corresponding muscles of the stronger digits.

To address these additional issues, this invention discloses a methodology for defining the maximal and minimal reach of each finger while the palm is stationary. This involves tracing the arc of the finger tip as it moves up and down ("vertically") through varying degrees of flexion and extension of the MCP (metacarpophalangeal, [knuckle]), PIP (proximal interphalangeal, [finger joint nearer to knuckle]) and DIP (distal interphalangeal) joints. These motions define a space bounded by two arcs, representing the maximum and minimum reach for each finger. Within this space the surface of all keys for a specific finger may be appropriately placed for comfortable, ergonomic usage. If the keys are farther away, they cannot be reached with a stationary palm; if they are closer, then they will be bumped as the finger moves up and down to actuate other keys.

When keys are positioned according to this arrangement, the result is a curved, vertical array of keys for each finger. When these arrays are arranged side by side as described in detail below, the result is a keyboard that is complexly curved but with each key precisely positioned for optimum ergonomic usage.

The methodology disclosed in this invention extends the art beyond what has been disclosed in prior art patents known to the Applicant. Those patents assume that keys can be placed appropriately but do not specify how this may be accomplished.

This invention discloses key positioning such that actuation is accomplished by the full swing of each finger while the palm is immobile. Specifically, the range of motion is envisioned to utilize the MCP as well as the PIP and DIP joints of each finger. In Choi U.S. Pat. No. 5,481,263, a somewhat related arrangement is disclosed, but utilizing finger motion only at the PIP and DIP joint; no motion of the MCP joint is shown or suggested.

This invention also describes an arrangement in which a top key may be actuated by the finger as it sweeps in full extension, with the fingernail, or any region of skin on the nail side of the finger actually striking and actuating the key. This arrangement provides an additional group of potential key placement sites and increases the flexibility of the keyboard and the number of keys which may be included. A soft key surface may be used to cushion the impact of the hard nail.

Actuation of a key with the back of the finger has been suggested or shown elsewhere.

An arrangement has been disclosed (Yaeger U.S. Pat. No. 4,584,443) which places each finger tip in a cup; extension or outward motion is used for "key" actuation, although the key itself is not a conventional key. In Allen U.S. Pat. No. 5,486,058, actuator switch caps are disclosed with three flat surfaces, one, horizontal for actuation by downward motion, and two, nearly vertical, for actuation by inward or outward motion of the finger, respectively. Runge U.S. Pat. No. 4,265,557 discloses an arrangement for key actuation through mechanical linkages actuated by slight extensor or flexor motions of the fingers, with the opposed key surfaces being closely approximated. Horn U.S. Pat. No. 5,552,782 discloses an arrangement of two parallel horizontal supporting surfaces, with keys arrayed on the inner, facing surface of each, and the hand placed between. Downward motion actuates keys on one surface, and upward motion the keys of the other. A curved array of keys is not used in this arrangement. Use of multiple different areas of the back side of the finger, including the nail, is disclosed in Litschel U.S. Pat. No. 5,627,566. In this arrangement minimal finger motion is permitted, and only one or two keys for actuation with finger flexion or reach is disclosed. A full swing of the finger is not envisioned.

This invention specifically positions the thumb in a rest position in which it is separated from the index finger and rotated outward, so that the natural flexion of the thumb brings the thumb first toward the side of the index finger and thence toward the palm. As a consequence of this arrangement, a number of keys may be positioned such that they may be actuated by natural, comfortable and ergonomically appropriate motions of the thumb. These motions include:

1. Thumb flexion and extension, utilizing, respectively, the thumb flexor muscles and ligaments, and the thumb extensor muscles and ligaments. Several keys may thus be actuated with this arrangement, including by application of pressure by the nail or extensor surface of the thumb during thumb extension.

2. Thumb adduction and abduction, i.e., moving the thumb in a plane perpendicular to the plane of thumb flexion/extension, thereby bringing the thumb toward or away from the side of the index finger. One or more keys may be readily actuated by each of these motions.

3. Some combination or combinations of thumb flexion/extension and abduction/adduction.

This combination of rest thumb position and the thumb motions described above for multiple key actuation is featured in this invention.

The prior art includes many patents which describe multiple thumb keys (Einbinder U.S. Pat. No. 3,929,216; Gopher et al. U.S. Pat. No. 5,493,654; and Torok U.S. Pat. No. 5,485,425). Some describe thumb key positions which require for key actuation one or more orthogonal thumb motions as described immediately above (Einbinder U.S. Pat. Nos. 3,929,216; 3,945,482; and 4,332,493; Retter U.S. Pat. No. 4,913,573; Allen U.S. Pat. No. 5,486,058; and Klauber et al. U.S. Pat. No. 5,626,427). In all of these, however, the thumb position at rest is on the same surface as the fingers, in contrast to this invention in which the natural thumb position (i.e., away from and rotated relative to the rest of the hand) places the thumb tip out of the plane of the other digits.

In other patents (Dolenc U.S. Pat. No. 4,849,732; Mohler et al. U.S. Pat. No. 5,160,919; Nikisbacher U.S. Pat. No. 5,270,709; Gambaro U.S. Pat. No. 5,332,322; Grant U.S. Pat. No. 5,339,097; Rucker et al. U.S. Pat. No. 5,351,066; Conway U.S. Pat. No. 5,410,333; Danziger U.S. Pat. No. 5,426,449; and Litschel U.S. Pat. No. 5,627,566), thumb keys are arranged for actuation such that the thumb is allowed to move away from the hand and rotate so that its natural flexion motion would bring it toward the side of the index finger and with further flexion toward the palm; this is the same thumb rest position as described in this invention. Yet, in almost all of those patents, the thumb keys (and the associated motions for key actuation) are co-planar rather than orthogonal to each other, so that no key motion utilizes thumb abduction or adduction as the sole motion. In one patent (Yaeger U.S. Pat. No. 4,584,443), an arrangement similar to that disclosed herein is suggested; however, it is qualitatively different in that the thumb and fingers rest within rings or cups and do not rest upon keys. In another patent (Horn U.S. Pat. No. 5,552,782), a related arrangement may be suggested, but the figures and text are insufficient to provide a clear description or explanation, and the emphasis is elsewhere.

This invention discloses the inclusion of a joystick, pointer, tracker ball or similar cursor controller device in place of a key, between the keys, or as the whole keyboard itself (i.e., sliding the keyboard across the table top serves the same function as moving a mouse). Multiple patents have addressed these issues (Rader U.S. Pat. No. 5,122,786; Zilberman U.S. Pat. No. 5,156,475; Grant U.S. Pat. No. 5,339,097; Conway U.S. Pat. No. 5,410,333; Ullman U.S. Pat. No. 5,411,341; Grant U.S. Pat. No. 5,416,498; Danziger U.S. Pat. No. 5,426,499; Gervais U.S. Pat. No. 5,508,719; Selker et al. U.S. Pat. No. 5,521,596; Sellers U.S. Pat. No. 5,594,618; Litchel U.S. Pat. No. 5,627,566; and Retter U.S. Pat. No. 4,917,516). This invention advances the art relative to those prior disclosures by making it possible to reach and actuate any joystick, tracker ball, pointer or similar device incorporated within the key region or as part of the keyboard base, while maintaining the wrist and palm stationary and at rest, and hence without moving the hand from its typing position.

This invention discloses an arrangement in which the force necessary for key actuation may be variably reduced to account for the weaker muscles utilized for key actuation by the smaller fingers. Uke U.S. Pat. No. 5,676,476 discloses an arrangement in which keystroke resistance is (apparently) increased to 100 grams for all keys.

This invention discloses an arrangement in which multiple tactile cues associated with keystroking surface characteristics are utilized to enhance the user's ability to identify each key in turn for actuation. Miller U.S. Pat. No. 5,660,488 discloses a simplistic version of such an arrangement in which a protrusion is formed on a finger contacting surface of each key.

This invention discloses an arrangement in which a contoured sheet of flexible material is positioned upon the keyboard to alter the height of the keys relative to the finger tips. A similar arrangement for a planar keyboard is disclosed in Caplan U.S. Pat. No. 5,899,616.

BRIEF SUMMARY OF THE INVENTION

A first embodiment of the invention is directed to a keyboard for use by a hand. The keyboard has a body and the body has:

a) a hand supporter for maintaining the wrist and palm in an unstrained, relaxed, stationary position during keyboard usage;

b) a plurality of keys on a keypad actuatable by the fingers of the hand; and c) wherein the fingers are permitted unrestrained movement about the three joints of each finger for actuation of the keys on the keypad while the wrist and palm remain in the unstrained, relaxed, stationary position.

The body may have a thumb region, palm rest region and hypothenar rest region which are all discrete parts and adjustable relative to one another along the longitudinal axis.

A second embodiment of the invention is directed toward a keyboard for use by a hand, including the wrist. The keyboard is comprised of:

a) a base;

b) an upper portion in contact with the base, wherein the upper portion includes a hand supporter for maintaining the wrist and palm in an unrestrained, relaxed, stationary position during keyboard usage; and c) wherein the upper portion contacts the base and may be positioned in three degrees of rotational freedom.

A third embodiment of the invention is directed to a keyboard support assembly for providing maximum adjustability comprising:

a) a base on which a keyboard is supported;

b) a forearm rest;

c) a three bar linkage connecting the keyboard to the forearm rest, comprised of a first linkage, second linkage and third linkage;

d) wherein the first linkage is connected to the keyboard and to the second linkage;

e) wherein the second linkage is connected to the first linkage and the third linkage;

f) wherein the third linkage is connected to the second linkage and the forearm rest; and g) wherein there is rotational freedom between the first and second linkages and between the second and third linkages.

A fourth embodiment of the invention is directed to a keypad on a keyboard comprised of a plurality of finger key arrays adjacent to one another on the keyboard, wherein the fingers are identified as the index, long, ring and short fingers and wherein each finger key array has associated with it specific keys and wherein each finger key array has a different curvature to accommodate the range of motion of that finger to actuate the respective keys when the wrist and palm are in a stationary position.

A fifth embodiment of the invention is directed to a keypad for a keyboard comprising:

a) a plurality of keys;

b) a predetermined distance each key must be depressed to actuate the key;

c) a resistance associated with each key necessary to depress that key the predetermined distance to actuate the key; and d) wherein the resistance associated with each key is a function of the size of the finger depressing that key, such that a larger finger has a greater depression force than does a smaller finger.

A sixth embodiment of the invention is directed to a keyboard having keys actuated by hand comprised of:

a) at least one key positioned on a keypad and having an actuation surface facing the side of a digit of the hand opposite the nail when the hand is in a typing position; and b) at least one top key positioned on a keypad and having an actuation surface facing the nail or back surface of the digit of the hand when the hand is in the typing position.

A seventh embodiment of the invention is directed to a keyboard comprised of:

a) a keypad with a plurality of keys thereon, wherein each key has a contact surface which must be depressed for key actuation; and b) a height adjustment device for placement over at least one key to heighten the contact surface of the at least one key.

An eighth embodiment of the invention is directed to a keyboard comprised of:

a) a finger region having a keypad with keys, wherein the keys on the keypad are oriented to be actuatable by only motion of the fingers at their joints when the wrist and palm of a hand are in an unstrained, relaxed, stationary position in a palm rest;

b) wherein a hand axis is defined by a line extending through the metacarpophalangeal joint of each finger;

c) a thumb region having a channel with keys, wherein the channel is oriented along a channel surface having a central axis which forms an angle of between 15-45 degrees with the hand axis; and d) wherein a thumb home key is located in the position of the thumb along a path defined by the thumb as it moves with flexion from a naturally relaxed position toward the index finger in its relaxed position.

A ninth embodiment of the invention is directed to a keyboard comprising:

a) a keypad;

b) a plurality of keys upon the keypad, wherein each key has a top surface that is physically depressed for key actuation; and c) wherein the top surface of one or more of a plurality of keys has a different tactile identification to facilitate recognition of the keys.

A tenth embodiment of the invention is directed to a keypad for a keyboard comprising:

a) at least one key;

b) a sensor associated with that key to determine the force exerted upon that key;

c) a key identifier;

d) a key actuator which when actuated transfers data to a processing unit;

e) wherein a first force upon the key will actuate the key identifier to identify that key to the user; and f) wherein a second force, greater than the first force, will actuate the key actuator.

BRIEF DESCRIPTION OF THE DRAWINGS

Note that all illustrations which show the right keyboard half 100, or any portion thereof, should be interpreted as automatically indicating the presence of a similar, mirror image illustration and corresponding embodiment for the left keyboard half 200, or corresponding portion thereof.

FIG. 4 is a front view of the right keyboard half 100.

FIG. 7 is a top view of the right keyboard half 100.

FIG. 27A is a partial transverse section along line 21A-21A as shown in FIG. 3A, showing an embodiment for the number, size, location and orientation for keys in the index finger key array 60 utilizing key arrangement 210 (FIG. 28A), shown to scale.

FIG. 27B is a partial transverse section along line 27B-27B as shown in FIG. 3A, showing an embodiment for the number, size, location and orientation for keys in the long finger key array 61 utilizing the same key arrangement 210 (FIG. 28A), shown to scale.

FIG. 27C is a partial transverse section along line 27C-27C as shown in FIG. 3A, showing an embodiment for the number, size, location and orientation for keys in the ring finger key array 62 utilizing the same key arrangement 102 (FIG. 28E), shown to scale.

FIG. 27D is a partial transverse section along line 27D-27D as shown in FIG. 3A, showing an embodiment 102 for the number, size, location and orientation for keys in the small finger key array 63 utilizing the same key arrangement 102 (FIG. 28E), shown to scale.

FIG. 30B is a schematic diagram or map showing an alternative embodiment 309 for the selection and arrangement of key arrays and cursor control devices in the left keyboard half 200. Numbers across the top reference the specific key arrangement embodiment of the keys below; numbers below each set of keys designate the corresponding key array.

FIG. 34 is a simplified schematic and block diagram showing the process by which both finger presence or light pressure 115 and actuation pressure 113 on each typical key 201 may be separately, simultaneously and uniquely represented on different regions of a video display terminal 110.

DETAILED DESCRIPTION OF THE INVENTION

Figure 1A:
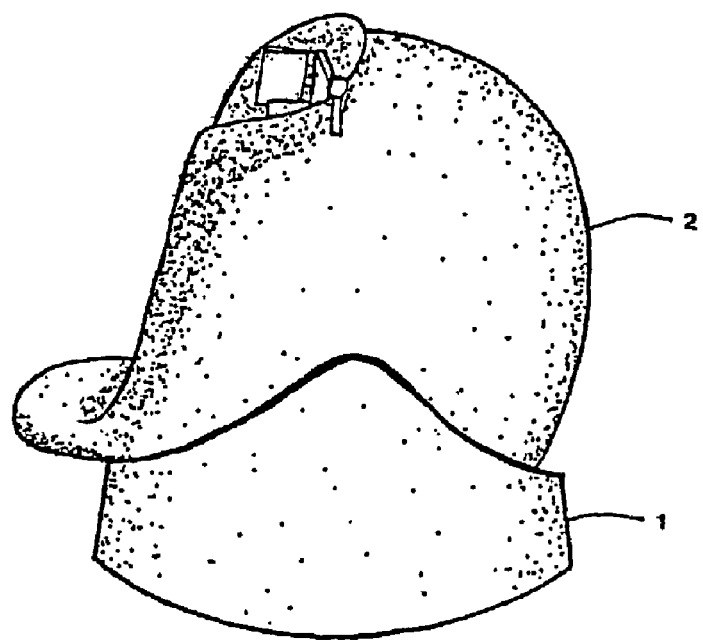
FIG. 1A is a perspective view of a portion of the invention, showing the right and left keyboard halves 100 and 200, respectively, appropriately positioned for operation.
Figure 1A:
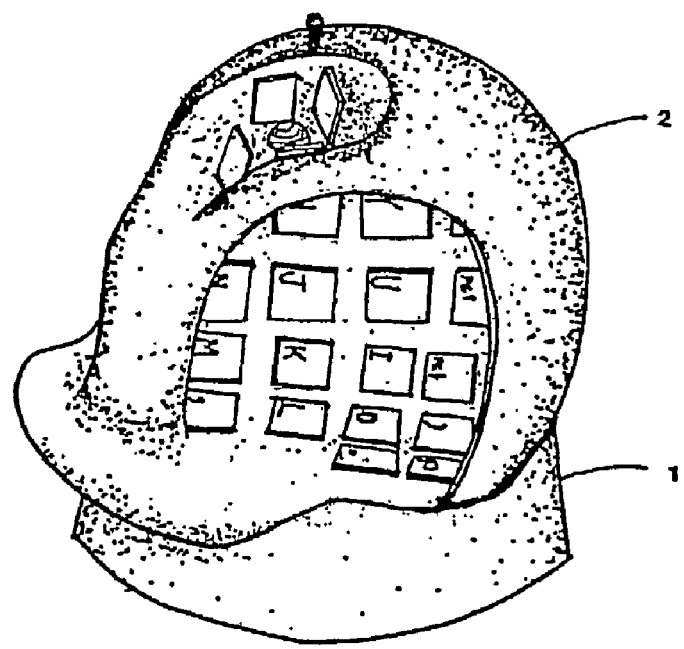

To accomplish the goals outlined above, this invention discloses a keyboard design built around an ergonomically correct wrist rest. Integral to this is an adjacent area upon which to rest the hypothenar region (the heel) of the palm. This hypothenar rest region provides stability for the hand, such that the hand will not slide or shift as the forearm and wrist are rotated or positioned for optimum comfort.

Also adjacent to the wrist rest region is an integral area, the thumb region where are located one or more keys for actuation by the thumb. In contrast to conventional arrangements for thumb keys, the thumb home key (i.e., the key upon which the thumb lightly rests when in a relaxed and ergonomically comfortable rest position) is oriented with its surface more or less perpendicular to the plane of orientation of the home keys for the fingers. Additional thumb keys may be actuated by thumb extension or by orthogonal thumb motions, i.e., abduction and adduction. Such permitted motions are those which are natural, comfortable and ergonomically appropriate.

With wrist, thumb and hypothenar regions positioned comfortably and naturally upon the keyboard, the appropriate rest locations for the four fingers, and their corresponding home keys, are naturally and readily defined. The appropriate locations and orientations for the additional keys for finger actuation are derived from anatomic and ergonomic considerations. The natural motions of the fingers, when the wrist and palm are stationary, are extension and flexion, with minimal lateral and medial deviations of the fingers. These constraints define natural, comfortable, ergonomically appropriate arcs of motion for the fingers, which thereby determine the general locations and orientations for the corresponding finger keys. The key surfaces so defined may be envisioned as being located more or less on the inner surface of a portion of a bowl or sphere (the finger region).

Features of the invention which derive from these concepts may be briefly summarized as follows:

A. The keyboard component of this invention consists of two more or less symmetrical pieces, each termed a keyboard half. Each half has an upper portion which rests upon and may be attached to a base. The upper portion consists of several regions which comprise, among others, a contoured wrist rest, a contiguous hypothenar rest (for the heel of the hand), a contiguous thumb region where keys are positioned for appropriate ergonomic actuation by the thumb, an adjacent finger region, and a hemispherical outer surface region, the convex region, which contacts and may be attached to a congruent region of the base, the contact region.

B. In one embodiment, the base may be contiguous with or attached to a forearm rest. A region of the base may rest on a table, or be secured to the front, top or underside of a table, chair, chair arm or other supporting structure, or may be supported by some apparatus from the floor. A fixed or fixable adjustable connecting apparatus is disclosed for connecting the keyboard half to the arm rest, chair seat, or to the supporting desk table or other supporting structure.

C. The upper portion may be attached to, and is freely adjustable, within certain ranges, in three axes relative to the base, with features to minimize friction between the two. A locking mechanism may be provided to secure the upper portion in any desired orientation relative to the base. In an alternative arrangement, palm rest and hypothenar rest region, as well as the thumb region and the finger key region, are disposed on a single structure without a separate base, said single structure rests upon or is connected to a supporting table or other structure without the benefit of positional adjustments except as such adjustments may be derived in a connecting apparatus.

D. The finger region is a surface, more or less concave, on which are arrayed keys for actuation by the four fingers. With the wrist and adjacent areas of the palm resting relaxed upon the wrist and hypothenar rests, the fingers will lie on home keys when each finger is naturally and comfortably relaxed. This produces a home row in which key surfaces are stepped up and down, rather than lying within the same plane.

I disclose a methodology for determining where in three dimensions these and additional keys may appropriately be positioned for ergonomic use according to the guidelines described above and detailed below (i.e., utilizing ergonomic motions of the three finger joints with the palm and hand stationary). The arrangement which results provides for a number of keys for actuation by any finger which are ordered in a vertical key array, which is more or less perpendicular to the home row. Key arrays which are positioned lateral to the key arrays for the index and small fingers are positioned so that, as for the other key arrays, only ergonomically appropriate motions of those respective fingers are needed for actuation.

Because the range of motion (i.e., the arc or sweep) for the shorter fingers is less than for the longer fingers, the spacing between keys, and the actual key sizes, are less for the shorter fingers than for the longer ones.

For some keys in the upper region of a key array, in place of a single key, two keys may be placed side by side. The top-most key in any array may be positioned to be actuated by the back or nail side of the fingertip during full extension. A key may also be positioned for actuation by the back surface of the PIP joint or proximal phalanx during MCP extension with the PIP joint flexed.

The key arrays may be curved in two dimensions, and radii of curvature vary for each finger, depending upon finger length. The key arrays are not parallel to each other, but rather are spaced farther apart at the upper than the lower regions.

This invention discloses various embodiments for arrangements for keys for the various key arrangements, discloses embodiments for the arrangements of key arrays for the keys of each keyboard half, and discloses embodiments for the assignment of alphanumeric, punctuation and function operations to the keys in said embodiments.

E. Tile thumb region is positioned to permit the thumb to rest in a natural, ergonomically appropriate position, separated from the index finger and rotated slightly outward, so that natural flexion of the thumb brings it toward the side of the index finger, and thence toward the palm. The various keys for thumb actuation are positioned in more or less orthogonal orientation, so that actuation is accomplished by natural ergonomic thumb motions, i.e., thumb flexion or extension, or thumb adduction or abduction.

F. Since a fundamental premise of this new keyboard design paradigm is key actuation without motion of the palm, wrist, forearm and arm, this invention provides that other ancillary keyboard interactions (e.g., control of cursor movement by mouse, pointer, roller ball or other device, or selection of function keys, etc.) may be accomplished, without the need for these unwanted motions, by incorporating these cursor controllers in place of one or more standard keyboard keys and by including a matrix of keys to function as a numeric keypad.

G. To facilitate use by users with different hand or finger sizes, I disclose an arrangement for adjusting the height of the key surfaces by the placement of one of a series of flexible contoured sheets of specific, predetermined thickness(es) over the keyboard surface to raise the key surface to the appropriate distance from the user's fingertips, or by the use of a contoured flexible sheet placed over the palm rest region and/or the hypothenar rest region, to bring the user's hand palm and finger tips closer to the keys, or by the use of individual key height adjustments, to raise the height of individual keys.

H. To reduce further the effort required for key actuation by small fingers, I disclose an arrangement in which the force required for key actuation by the weaker (shorter) fingers is less than for the longer fingers. This is accomplished by differences in the springs or other components of keys which determine resistance to key motion for actuation.

I. To facilitate tactile recognition of individual keys, I disclose different surface contours, textures, resiliencies and thermal conductivities for the surfaces of individual keys to enhance tactile distinctions between keys.

J. To facilitate visual recognition of keys, even when key surfaces cannot be viewed by the user (due to key orientation or obscuration by the user's hands or keyboard structure), I include an arrangement, (a so-called "heads-up display") in which light touch on a key provides an indication on the CRT screen of the identity of the key when it is touched and before enough pressure is applied to that key to cause its actuation.

In sum, this invention discloses arrangements which make it possible for a keyboard user to position himself or herself as may be maximally comfortable, with shoulder, upper arm, forearm and wrist positions adjusted to the user's preference, and with these portions of the upper body as well as the wrists and hypothenar regions ergonomically positioned to the user's preference, comfortably supported at rest and immobile. The necessary ergonomic requirements for comfortable operation of keys by fingers and thumb of differential lengths, while wrist and palm are maintained immobile, are defined in this invention, and both the methodology for determining appropriate key positioning and the resulting key arrangements are shown in various embodiments. Arrangements to permit lockable adjustments to keyboard orientation are disclosed, as well as are arrangements to increase the number of available key operations, to accommodate key actuation to the differing strengths of different digits, to accommodate users with differing hand and finger sizes, to enhance tactile cues for key identification, and to provide an alternative methodology to provide visual cues to facilitate identification of individual keys. Multiple alternative embodiments of certain features are disclosed, as well as the multitude of possible combinations and permutations of the various disclosed arrangements.

In summary, my invention consists, individually and in various combinations and permutations, of:

an ergonomic computer keyboard structure and its associated design;

certain component parts of the keyboard with their associated specific designs and arrangements;

arrangement for lockable adjustability of keyboard orientation for hand, wrist and forearm ergonomic comfort;

apparatus for lockable adjustable attachment of the keyboard to tabletop, chair, forearm rest or other structures;

apparatus for lockable adjustable support for user's forearm while using the keyboard;

methodology for determining the preferred location of keys for use in this keyboard;

apparatus for adjusting the height of keys of this keyboard to conform to various hand and finger sizes;

preferred arrangements for keys for this keyboard;

preferred arrangements of alphanumeric, punctuation and function assignments for said key arrangements for this keyboard;

arrangements for providing tactile cues to user for locating keys while using this keyboard; and arrangements for computer software and for key actuation mechanism which together provide visual cues to the user for locating keys while using this keyboard.

In various places throughout this description of my invention, I disclose an embodiment or an embodiment of one or more features, arrangements, mechanisms or designs of my invention, along with one or more additional or alternative embodiments of one or more of those features. It should be understood that, rather than representing mutually exclusive alternatives, the various embodiments, preferred embodiments and alternative embodiments I have disclosed can and should be considered as if they had been presented and disclosed in all of their possible individual embodiments as well as all of their various combinations and permutations. Figures which illustrate one or more embodiments should not be interpreted as excluding other embodiments described or suggested in the text or included by these caveats.

Certain components of this inventions contain features of adjustability. The figures used to present those components in one position, orientation or arrangement are meant as illustrations, and are not intended to exclude other possible positions, orientations or arrangements. All illustrations which show the right keyboard half 100, or any portion thereof, or a right forearm rest 40, should be interpreted as automatically indicating the presence of a similar, mirror image embodiment for the left keyboard half 200, or corresponding portion thereof, or of a left forearm rest, respectively. Similarly, any textual reference to any such illustration should be similarly interpreted.

Section headings in bold type, subheadings and text formatting features (e.g., text in bold or italics, bullet points) are provided for convenience but do not constitute essential parts of the description of this invention. Numbers in bold and figure designations in bold are essential features of this disclosure.

A. Overall Shape, Appearance and Component Parts of the Keyboard, Including Identification and General Description of Multiple Specific Surface Regions, Relationships Among Adjacent Regions and Between These Regions and Corresponding Portions of the Hand.

Figure 1B:
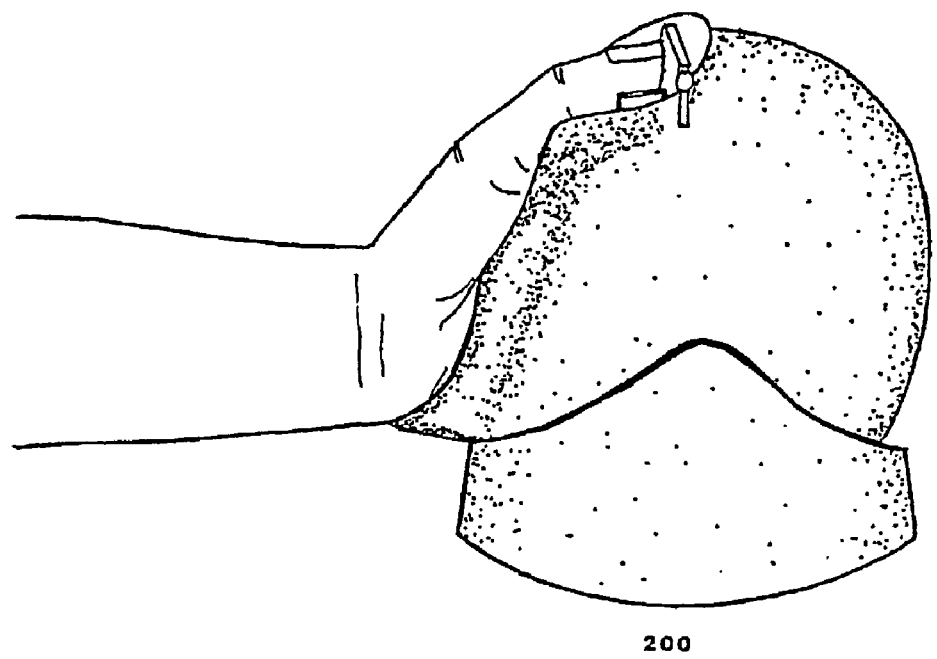
FIG. 1B is a perspective view of a portion of the invention showing the right and left keyboard halves 100 and 200, respectively, appropriately positioned for operation, with the user's right and left hands appropriately positioned for operation of the keyboard.
Figure 1B:
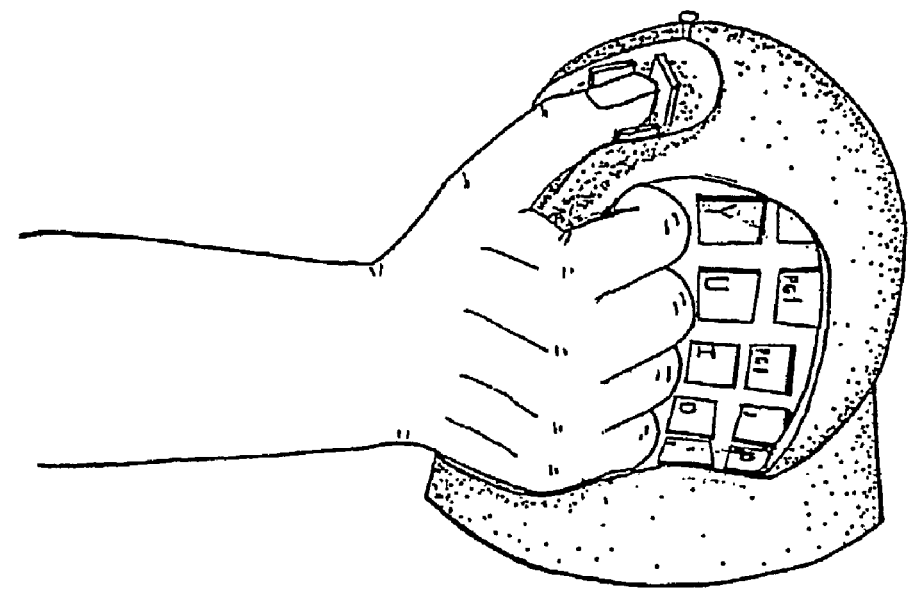
Figure 5:
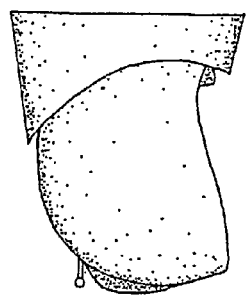
FIG. 5 is a rear view of the right keyboard half 100.
Figure 6:
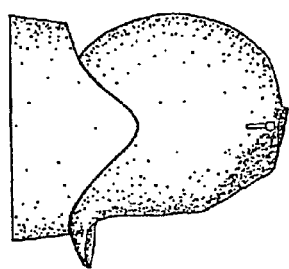
FIG. 6 is a left side view of the right keyboard half 100.
Figure 3:
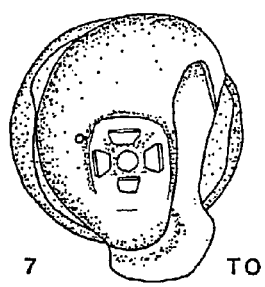
FIG. 3 is a right side view of the right keyboard half 100.
Figure 3:
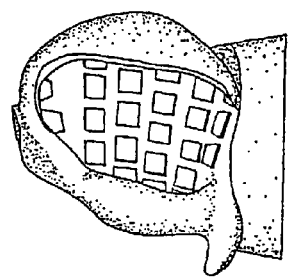

Split Keyboard:

As shown in FIGS. 1A and 1B, and furthered detailed in subsequent figures, one aspect of the physical apparatus of this invention consists of a keyboard structure containing keys, actuated by pressure applied by one of the ten digits, said keys utilized for data entry into a computer processing unit either by direct wiring or some other form of communication, including infrared, radio waves, sound waves or other mechanisms. The keyboard is similar to a standard computer keyboard in that it contains more or less the usual number of keys, said keys arranged more or less in the typical "QWRETY" pattern, and actuation of said keys requiring digit pressure applied to the stroking surface of the key.

Figure 2:
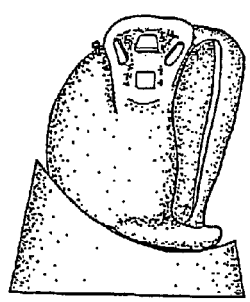
FIG. 2 is an orientation drawing for the right keyboard half 100, indicating the relative orientation of the views which are depicted in various subsequent figures.

The keyboard structure is separated or divided into two sections, right 100 and left 200, which are each termed a keyboard half. The keyboard halves 100, 200 are approximately symmetric mirror images of each other, although the precise number and arrangement of keys, and the potential substitution of a keyboard cursor controller for one or more keys, and other necessary improvements, may differ slightly between the two keyboard halves, thereby disturbing the precise symmetry. Unless otherwise indicated, such substitutions or rearrangements can be accomplished in either keyboard half, and thus the illustrated or described unique features of either keyboard half may be interpreted as disclosed in either and both halves; hence, a description of one keyboard half should suffice and the description of only the right keyboard half 100 is provided, with limited exceptions. External views of the right keyboard half 100 are summarized in FIG. 2, and shown in greater detail in FIGS. 3A, 3B, 3C, 4A, 4B, 4C, 5, 6A, 6B, 7A and 7B. FIG. 2A is an orientation drawing to clarify the views provided in various other figures.

The separation of the keyboard into two independent sections 100 and 200, which may be physically separated from each other and positioned as may suit the user, allows selection of the optimal amount of hand separation during keyboard use (and thus selection of the optimal degree of upper arm/shoulder internal rotation), thereby enhancing user comfort and minimizing strain and fatigue.

Base and Upper Portion Sections of Each Keyboard Half:

As shown in FIGS. 1A, 1B and 3-7, each keyboard half consists of two pieces, a base 1 and an upper portion 2.

Except for the keys and cursor control device, all of the electronic and other components necessary for the function of the keyboard may be contained in either the base 1 or upper portion 2, may located in a computer case, containing Computer Processor Unit (CPU) and other computer electronics, or elsewhere, or may be divided among them.

Base:

Referring now to FIGS. 1A, 1B, 3-11, 15-17 and 20, the base 1 is a three-dimensional structure which may be, at least partially, hollow. Its surface comprises several regions. One region of its surface, the contact region 3, is more or less oriented upward, and is in physical contact with portions of a specific congruent surface region of the upper portion, the convex region 4 (FIGS. 5, 6, 13, 14, 15B, 16A, 16B, 16G, 16H and 20) more or less on the underside of the upper portion 2. In another embodiment, three or more ball bearing 5 or other similar devices are positioned on and attached to the contact region 3 and juxtaposed between the contact region 3 of the base 1 and convex region 4 of the upper portion 2 to reduce friction (FIGS. 8, 9, 11, 15A, 15B, 16A, 16C, 16F, 16G, 16H, 17 and 20).

Figure 3A:
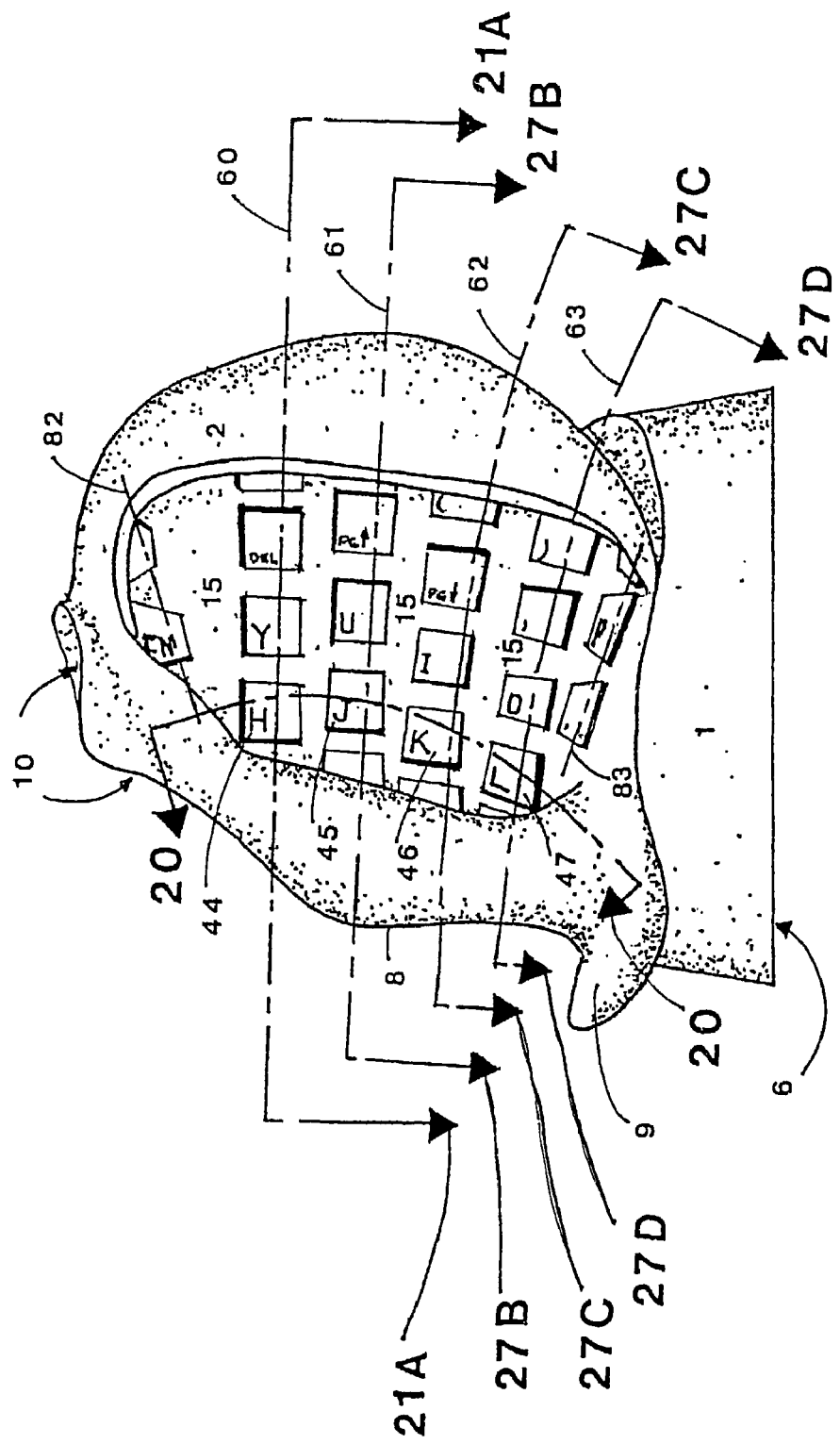
FIG. 3A is a right side view of the right keyboard half 100 with additional details.
Figure 4A:
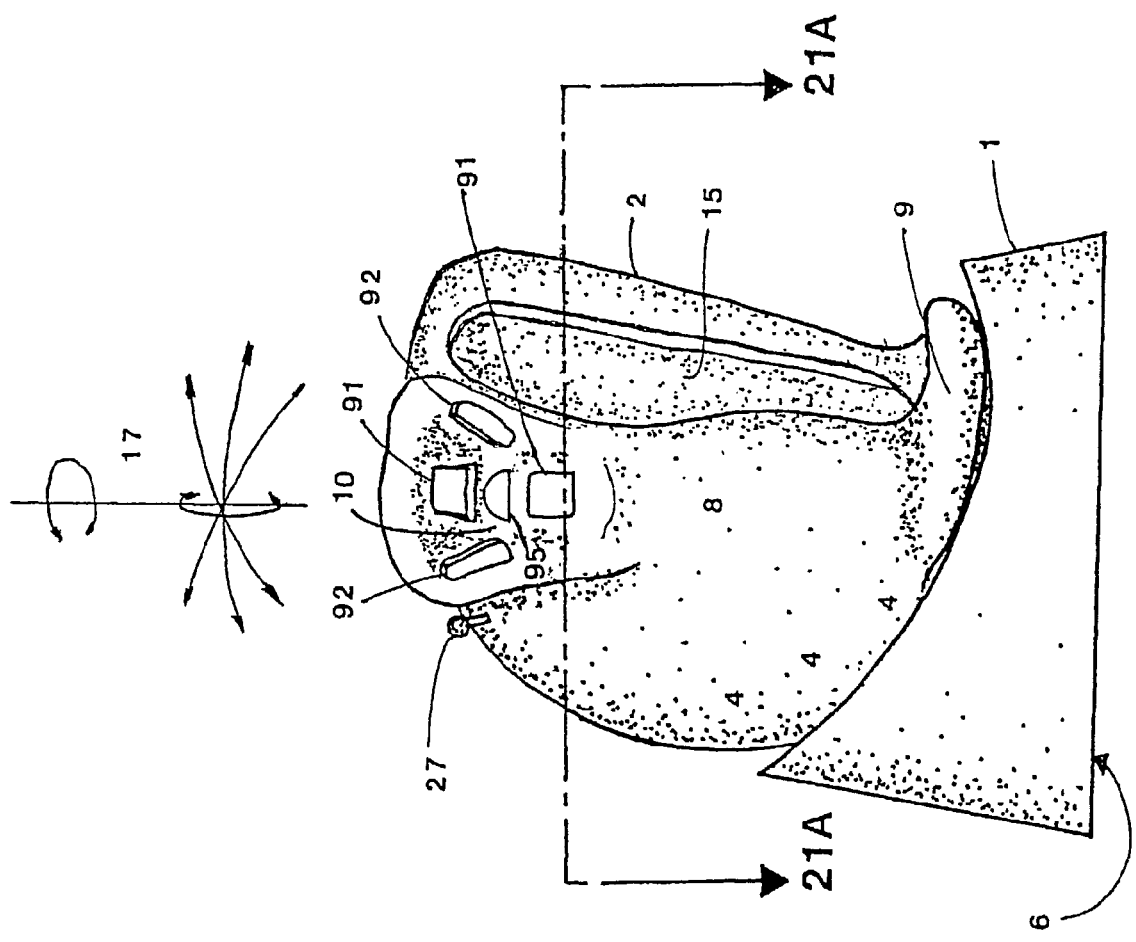
FIG. 4A is a front view of the right keyboard half 100.

Another region 6 of the base surface, more or less on the underside of the base may be utilized to rest upon a table or similar surface for support (FIGS. 3A and 4A.)

A region or regions of the base surface may be for support or connection to a supporting apparatus 7, or for other similar purposes, as discussed below (FIGS. 8, 18A, 18B and 19).

Upper Portion:

Referring now to FIGS. 1A, 1B, 3-7, 13, 14, 15B, 16A, 16B, 16G, 16H, 21, 22 and 23, the upper portion 2 is a three dimensional structure which is, at least in part, hollow. It comprises a number of surface regions. The physical relationship among these regions is shown diagrammatically in FIG. 3C.

One surface region, the convex region 4, is convex, representing a portion of the outer surface of a sphere. This region is in contact with corresponding contact region 3 of the base, but with aforementioned proviso to permit the inclusion of devices to reduce friction between these surfaces.

Another region of the upper portion 2, termed the pain rest region 8, comprises a complexly curved surface, more or less cylindrical, upon which the appropriate region of the user's palm, (and possibly the adjacent distal portion of the wrist) may comfortably rest.

Adjacent to this palm rest region 8, at one end of its cylindrical structure, is a contiguous surface region of the upper portion 2, termed the hypothenar rest region 9. This is a complexly curved region, somewhat approximating the shape of the inner surface of a portion of a truncated cone or of a flared skirt. The region of the palm toward the heel of the hand (the hypothenar eminence) will rest upon this surface when the palm rest region supports the corresponding region of the hand.

Figure 12A:
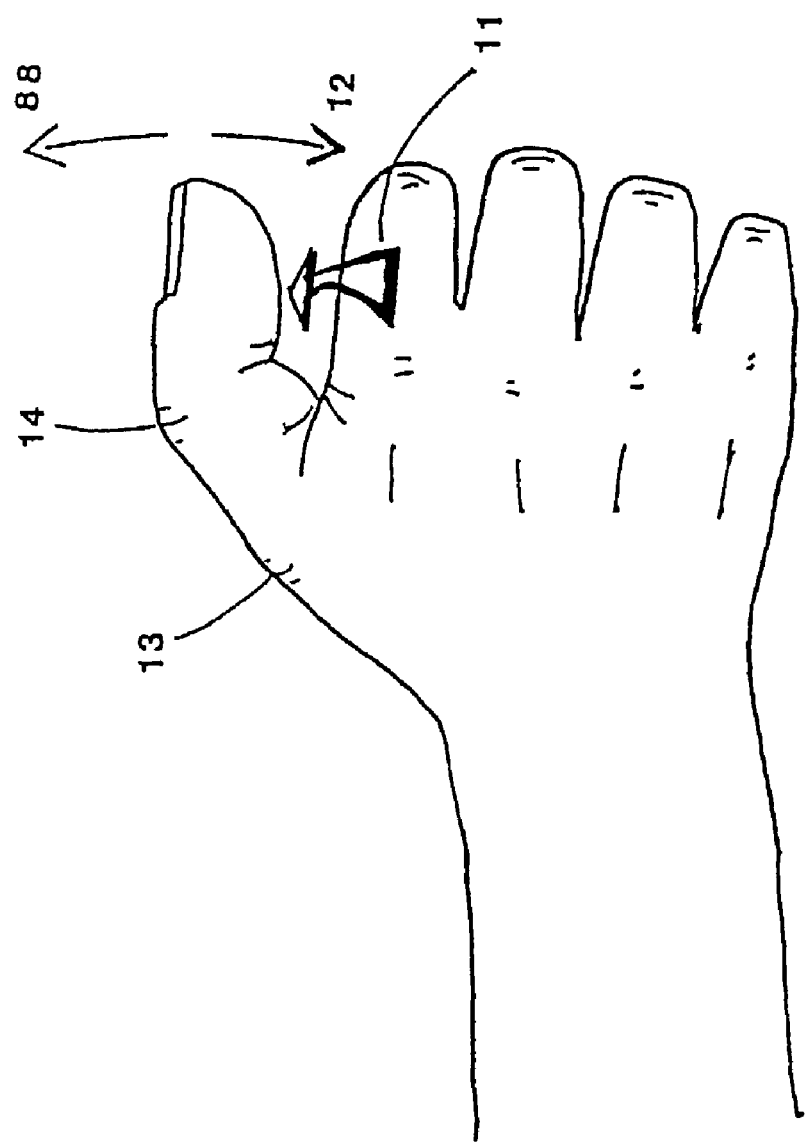
FIG. 12A is a side view and FIG. 12B is a top view of simplified anatomic illustrations of the right hand, indicating the natural, ergonomically appropriate hand and digit positions and thumb motions for operation of the upper portion 2.
Figure 12B:
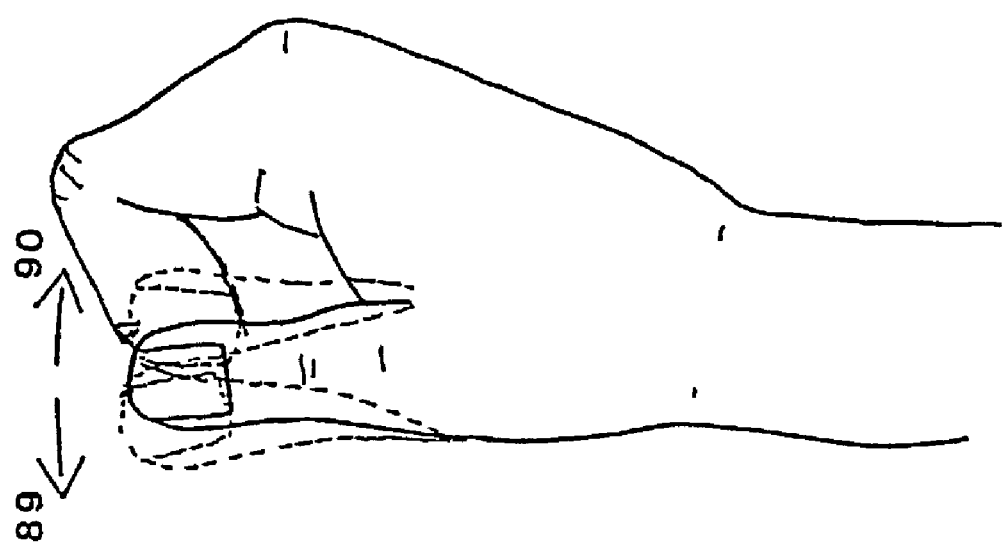
Figure 12C:
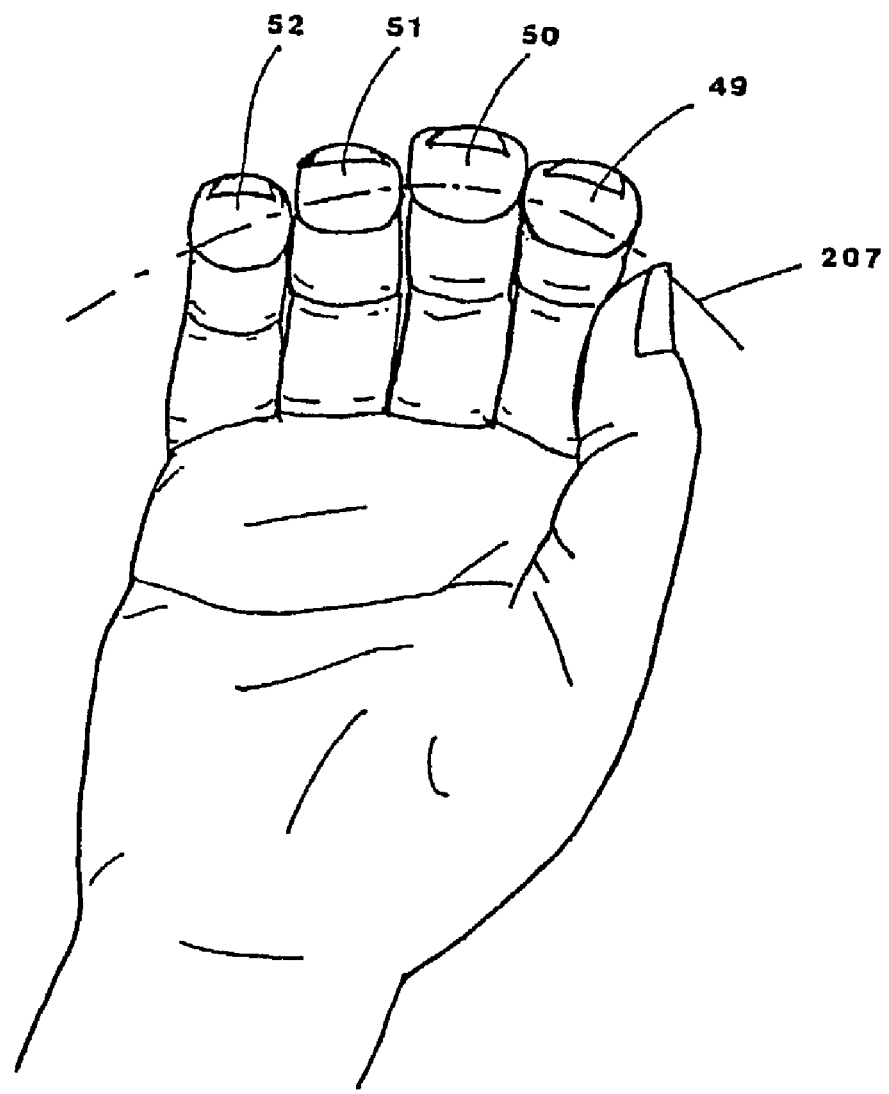
FIG. 12C is a simplified anatomic illustration of the palm surface of the right hand, indicating the natural, ergonomically appropriate hand and digit positions and the natural orientation of the tips of the fingers.
Figure 13:
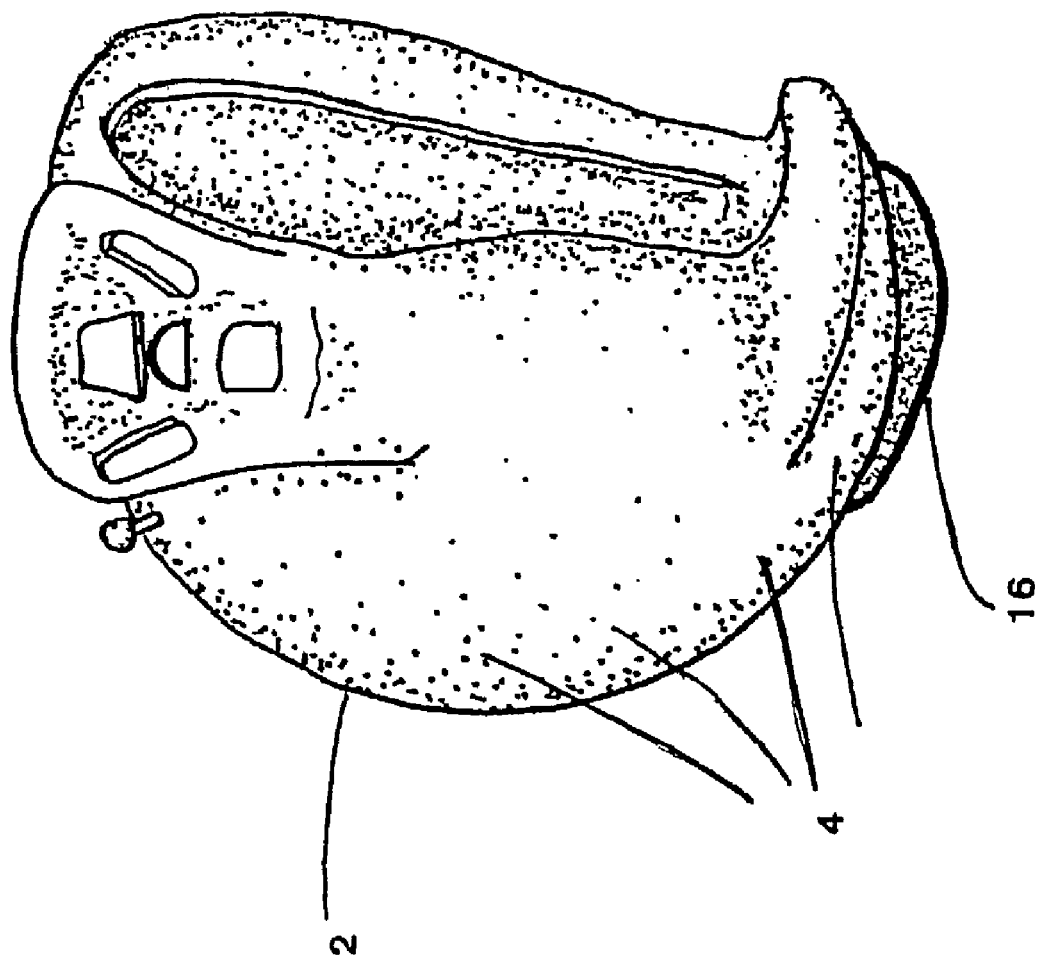
FIG. 13 is a front view of the upper portion 2 of the right keyboard half 100, shown disconnected from the base 1, revealing the disc 16. Finger keys are not shown in this illustration.
Figure 14:
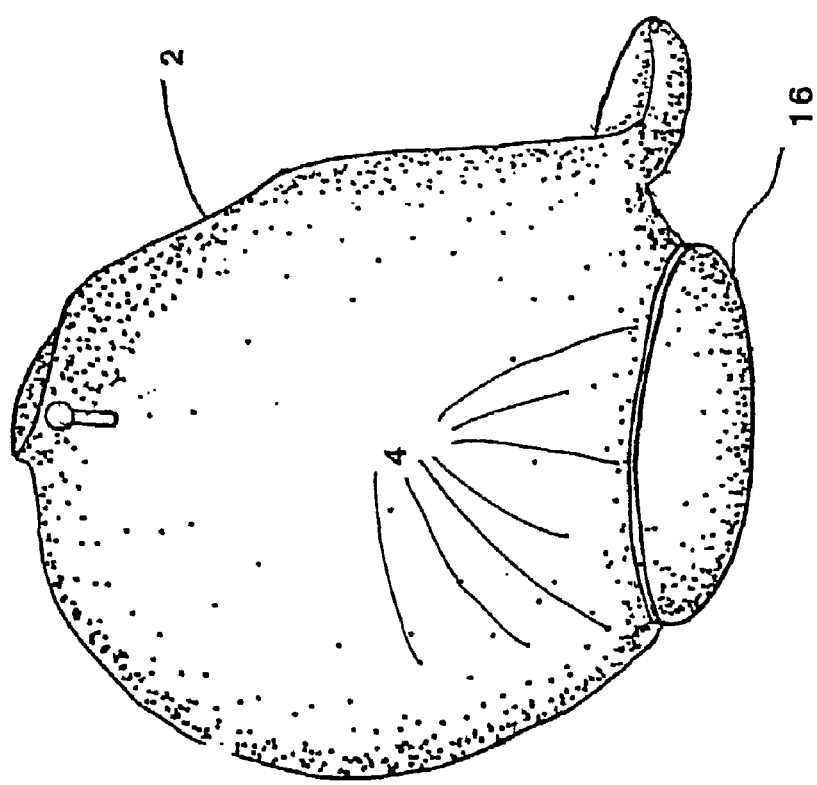
FIG. 14 is a left side view of the upper portion 2 of the right keyboard half 100 shown disconnected from the base 1, revealing the disc 16.

At the end of the palm rest region 8, opposite from the hypothenar rest region 9, is located a contiguous region of the upper portion 2, termed the thumb region 10, where the thumb will naturally and comfortably rest when the palm is positioned on the palm rest and the thumb is separated from the index finger and rotated outward slightly 11 (as shown in FIGS. 12A, 12B and 12C). In this position flexion 12 of the thumb's metacarpophalangeal (MCP) 13 and interphalangeal (IP) 14 joints will naturally bring the tip of the thumb toward the side of the index finger and thence toward the palm in the absence of the structural impediments created by the physical presence of the thumb region. The shape of the thumb region 10 surface is complexly curved, but may be recognized as somewhat similar to the inside of the portion of a tube. In an embodiment, the inner surface of this tube contains keys and/or cursor control devices as described below which may be actuated by natural, comfortable and ergonomic motions of the thumb, as shown in FIGS. 12A, 12B and 12C.

Figure 3B:
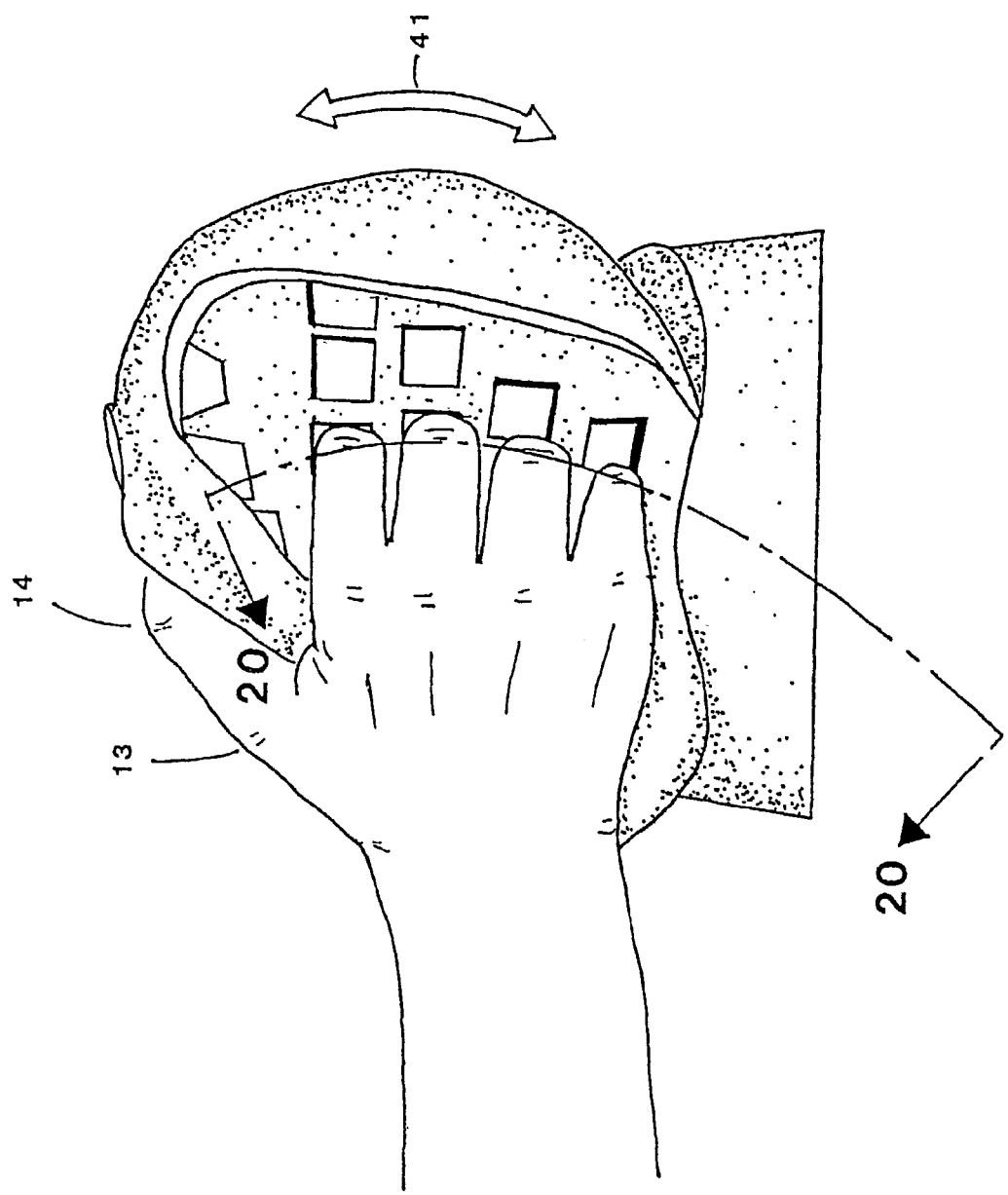
FIG. 3B is a right side view of the right keyboard half 100 with the user's hand appropriately positioned for operation of the keyboard.
Figure 3C:
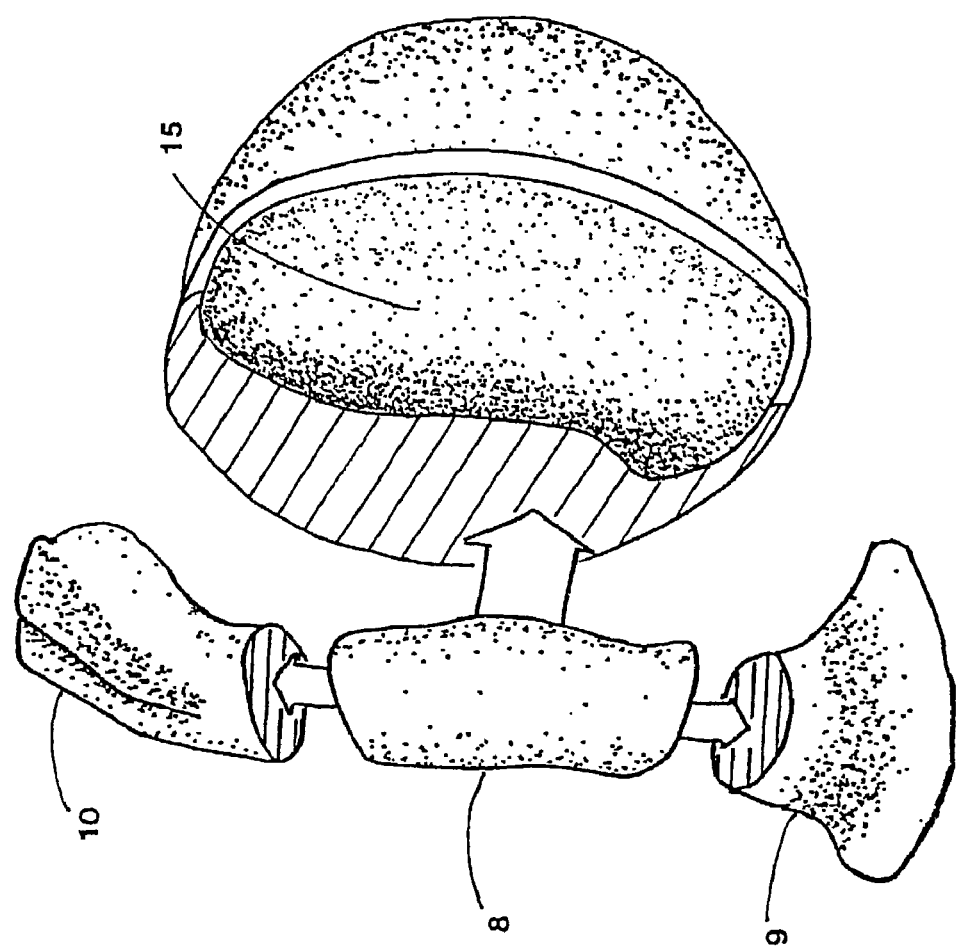
FIG. 3C is a perspective view showing a simplified deconstruction of the upper portion 2, indication the relationships of the various regions.

The thumb region 10 and the hypothenar rest region 9 are arranged more or less along the longitudinal axis of the palm rest region 8 (FIGS. 3C and 4A).

Another region of the upper portion 2, the finger region 15, is another surface region which is adjacent to the palm rest region 8. It comprises a surface on which are arrayed keys and/or cursor control devices. This surface is complexly curved, but may be approximated as a portion of the inside of a sphere or bowl, with the keys arrayed on the inner surface thereof. As shown in FIG. 3C, this surface is more or less contiguous with the palm rest region and extends laterally from it, such that the fingers will naturally lie near or on these keys, and may reach all of them comfortably with natural ergonomic motions, when the thumb, palm and hypothenar regions of the hand rest naturally and comfortably upon the corresponding regions of the upper portion (FIGS. 1B, 3B, 7B, 20 and 21B). A portion of the outer surface of the finger region is the convex region 4.

A region of the upper portion surface (not shown) may contain mechanisms to gain access to the interior of the upper portion 2.

A region of the upper portion 2 (not shown) may contain an apparatus for communication with the CPU, including wire or wireless transmission; alternatively, some or all of these apparati may lie upon the surface or within the interior space of the base.

An area of the convex region 4 may be utilized for affixing a rod 21 or, alternatively, the convex region 4 may contain an opening allowing a rod 21 from the outside to protrude into the interior of the upper portion 2 (FIGS. 15B, 16A, 16B, 16G and 16H).

This invention envisions arrangements, readily apparent to those skilled in the art, by which the palm rest region 8, the hypothenar region 9 and the thumb region 10 are rendered discontinuous but connected to each other and the distance between them rendered adjustable by standard mechanisms, thereby permitting the upper portion 2 to accommodate, in an optimal fashion, hands of different sizes and shapes. Similarly, this invention envisions arrangements, readily apparent to those skilled in the art, by which the palm rest region 8, the hypothenar region 9 and the thumb region 10 are rendered discontinuous from, but connected to, the finger region 15, and the distance between them rendered adjustable by standard mechanisms, thereby permitting the upper portion 2 to accommodate, in an optimal fashion, hands and fingers of different sizes and shapes.

To enhance user comfort, the top surface of the palm rest region 8 and the hypothenar rest region 9 is covered with cushioning material 250 (FIG. 4C) comprising foam, leather, soft plastic, or similar material, or gel or other viscous material enclosed in a leakproof material, which may mold to the shape of the user's wrist and hypothenar regions for maximal comfort.

B. Nature of the Mechanical and Physical Interaction Between Base and Upper Portion.

Referring now to FIGS. 3B, 4A, 4B, 7B, 15A, 15B, 16A, 16H and 17, the contact region 3 of the base 1, which contacts the convex region 4 of the upper portion, is designed so that the upper portion may (with certain imposed constraints) rotate freely in three orthogonal axes 17 (FIG. 4A) with respect to the base, while remaining in contact with the contact region. Indeed, for this reason, the various figures which show the base and upper portion together illustrate only one of an infinite range of orientations between the two; the preferred position may be selected by each user.

Figure 4B:
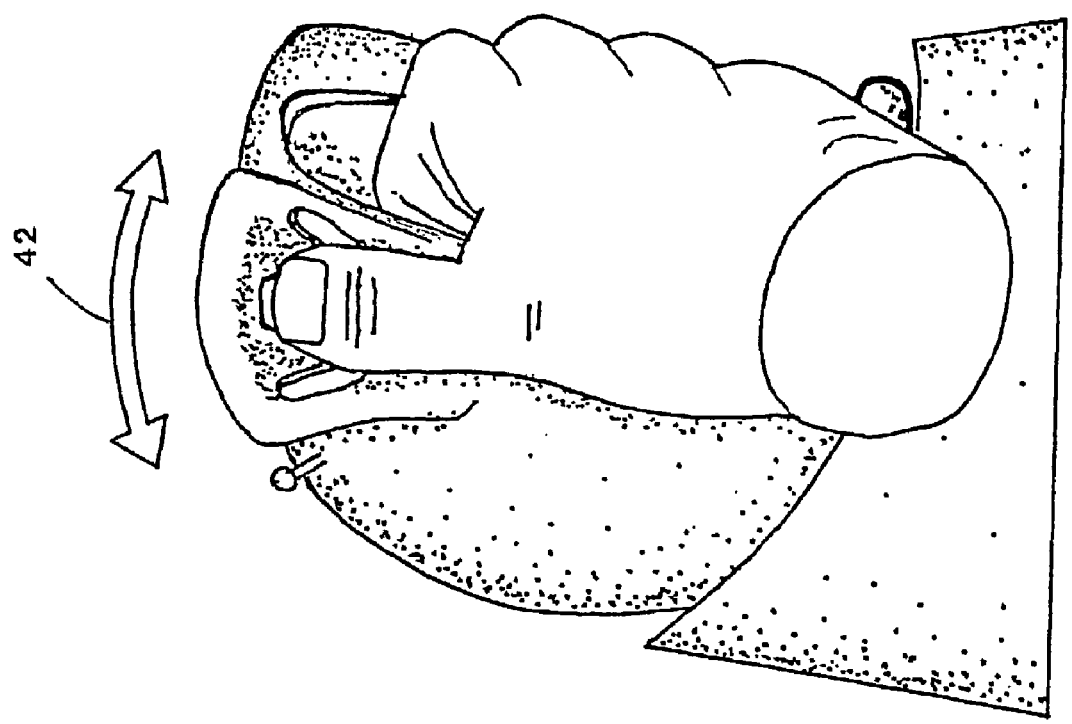
FIG. 4B is a front view of the right keyboard half 100 with additional details with the user's hand appropriately positioned for operation of the keyboard.
Figure 4C:
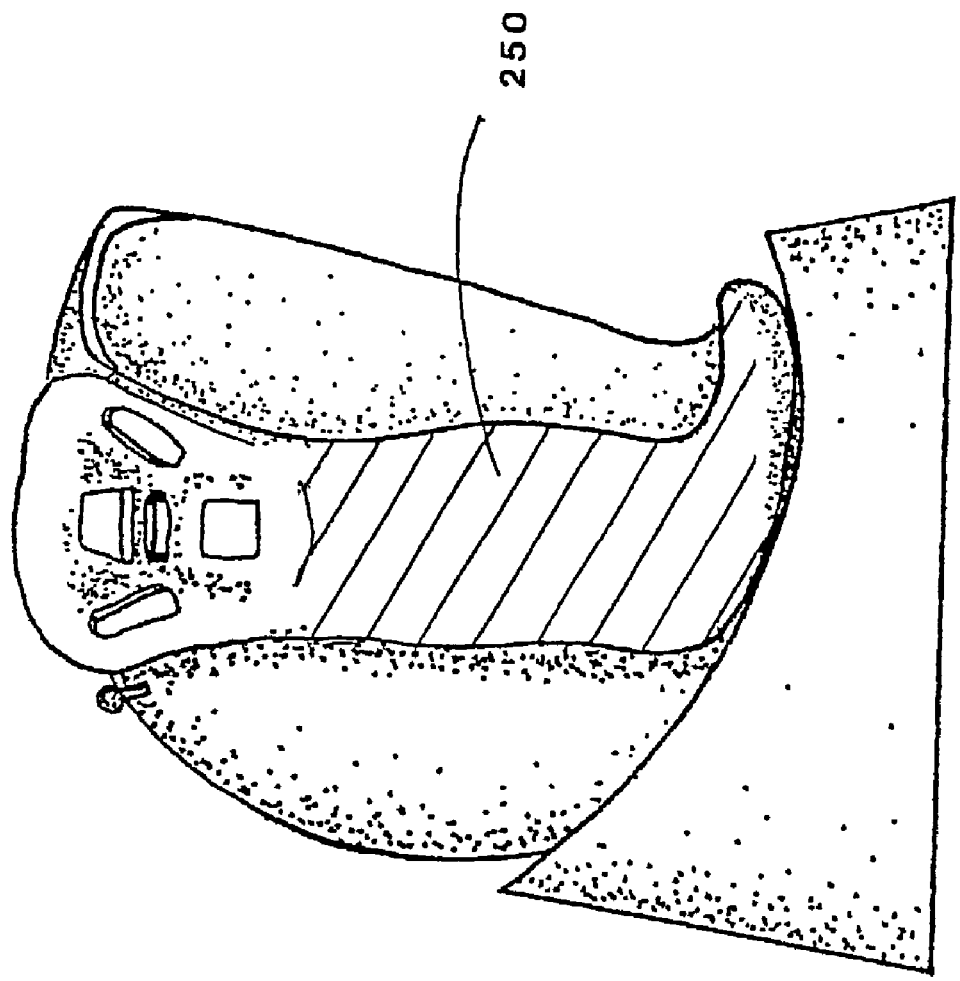
FIG. 4C is a front view of the right keyboard half 100 indicating areas where cushioning material 250 may be utilized.
Figure 5:
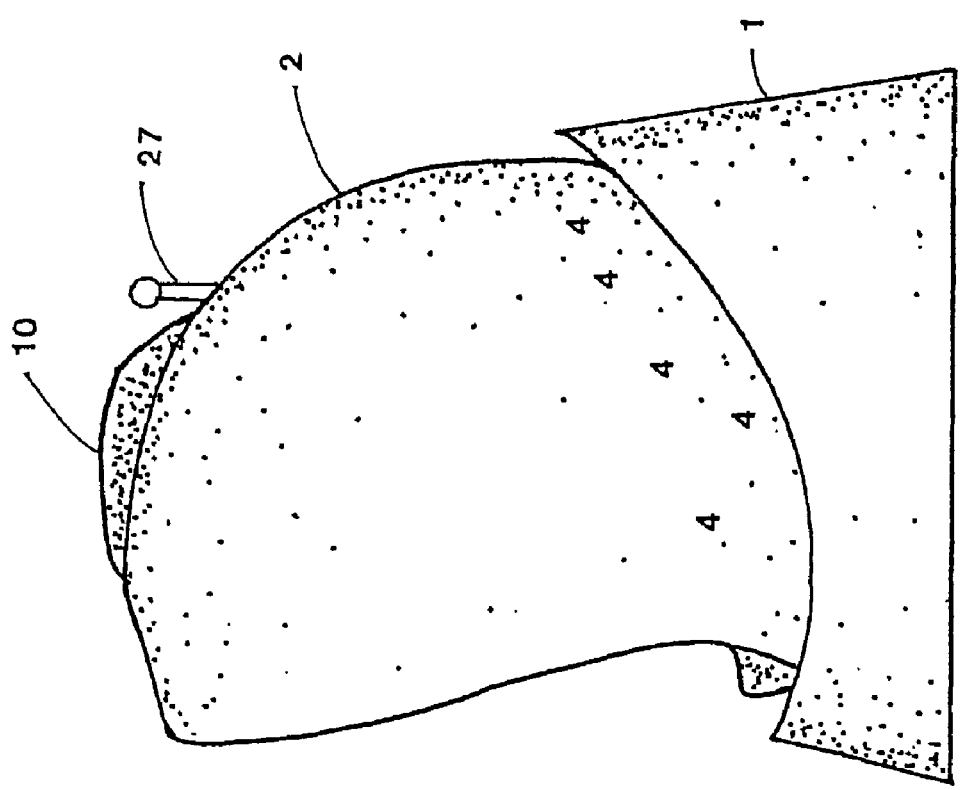
Figure 6A:
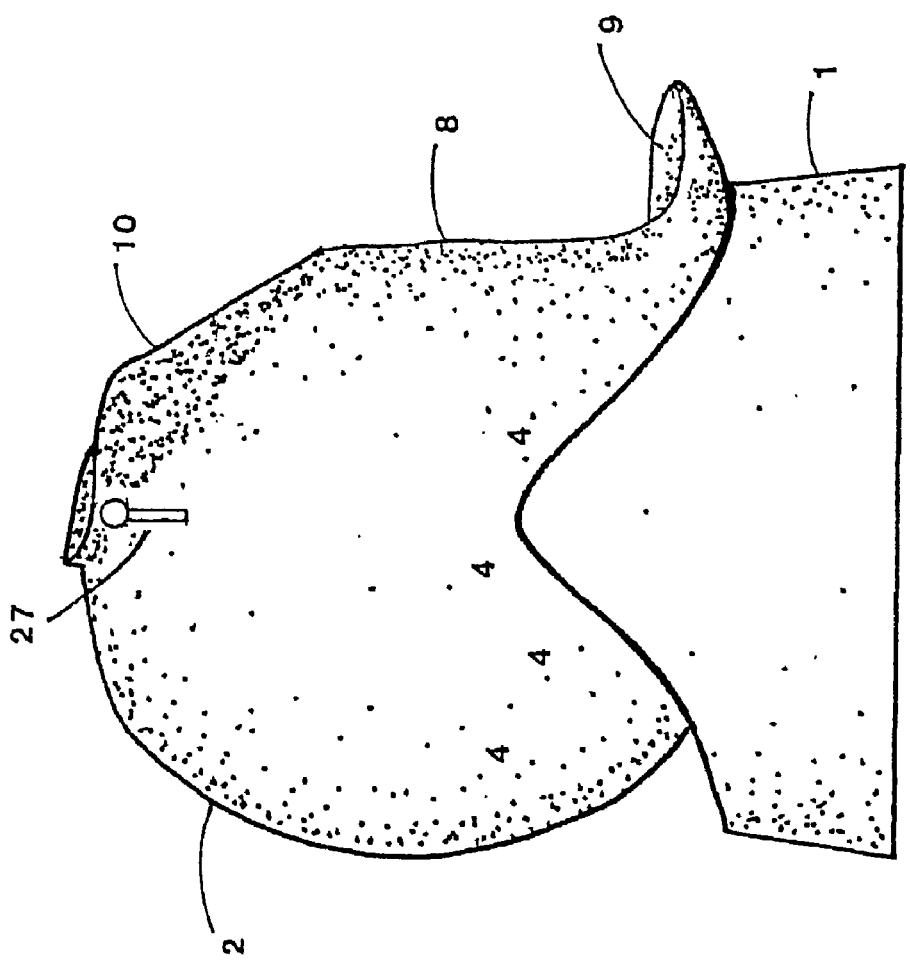
FIG. 6A is a left side view of the right keyboard half 100.
Figure 6B:
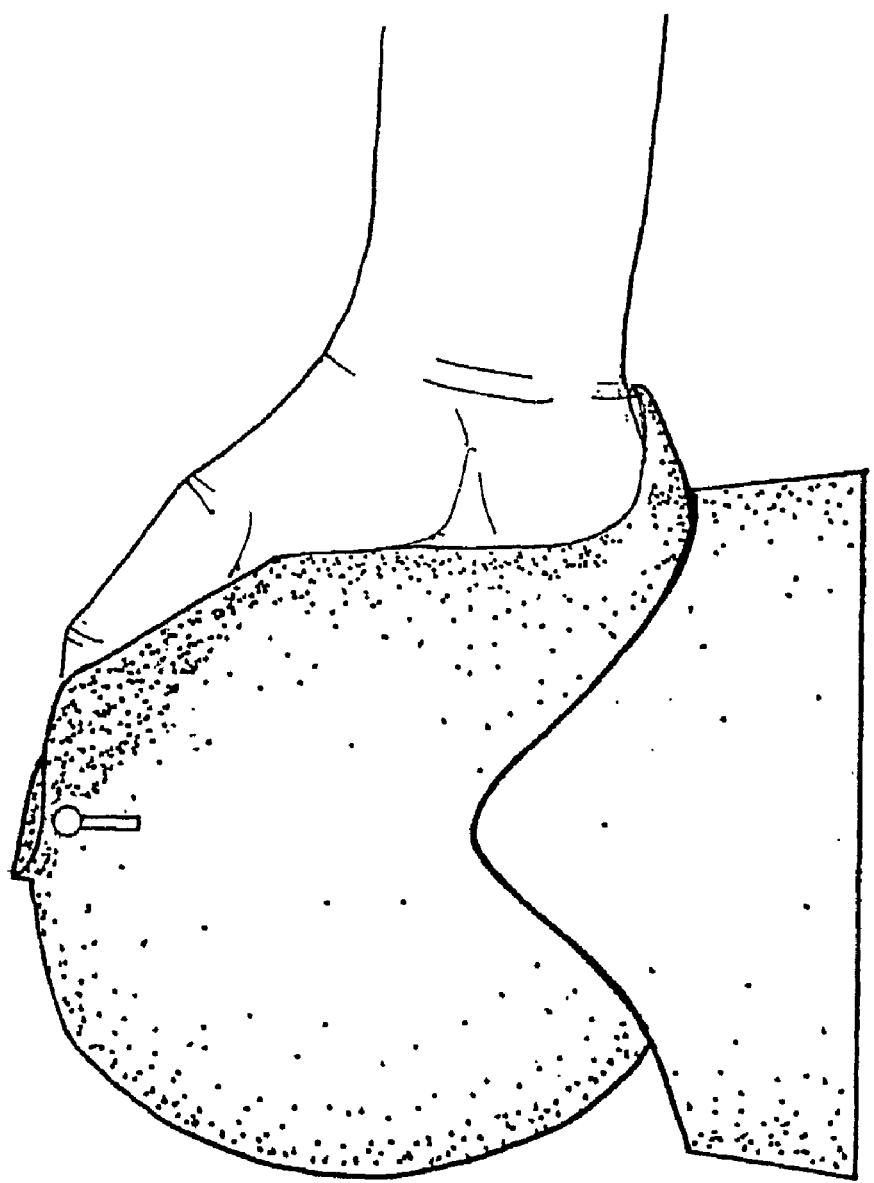
FIG. 6B is a left side view of the right keyboard half 100 with additional details with the user's hand appropriately positioned for operation of the keyboard.
Figure 7A:
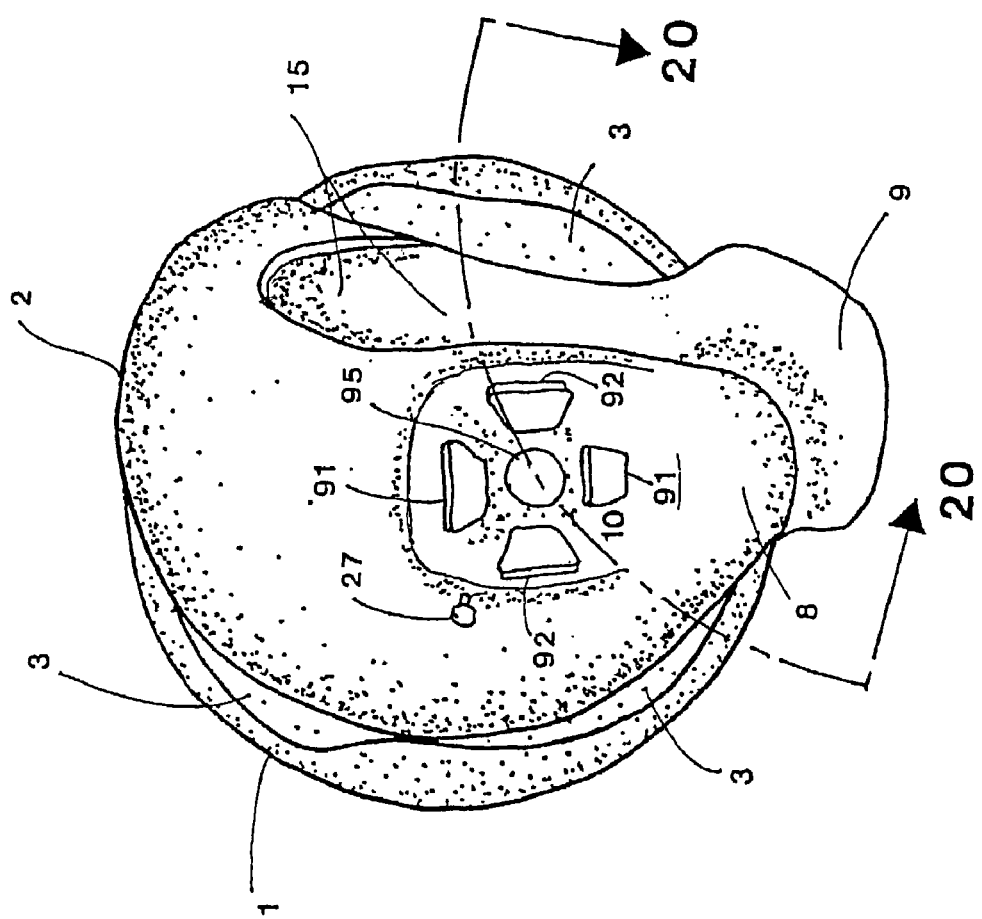
FIG. 7A is a top view of the right keyboard half 100.
Figure 7B:
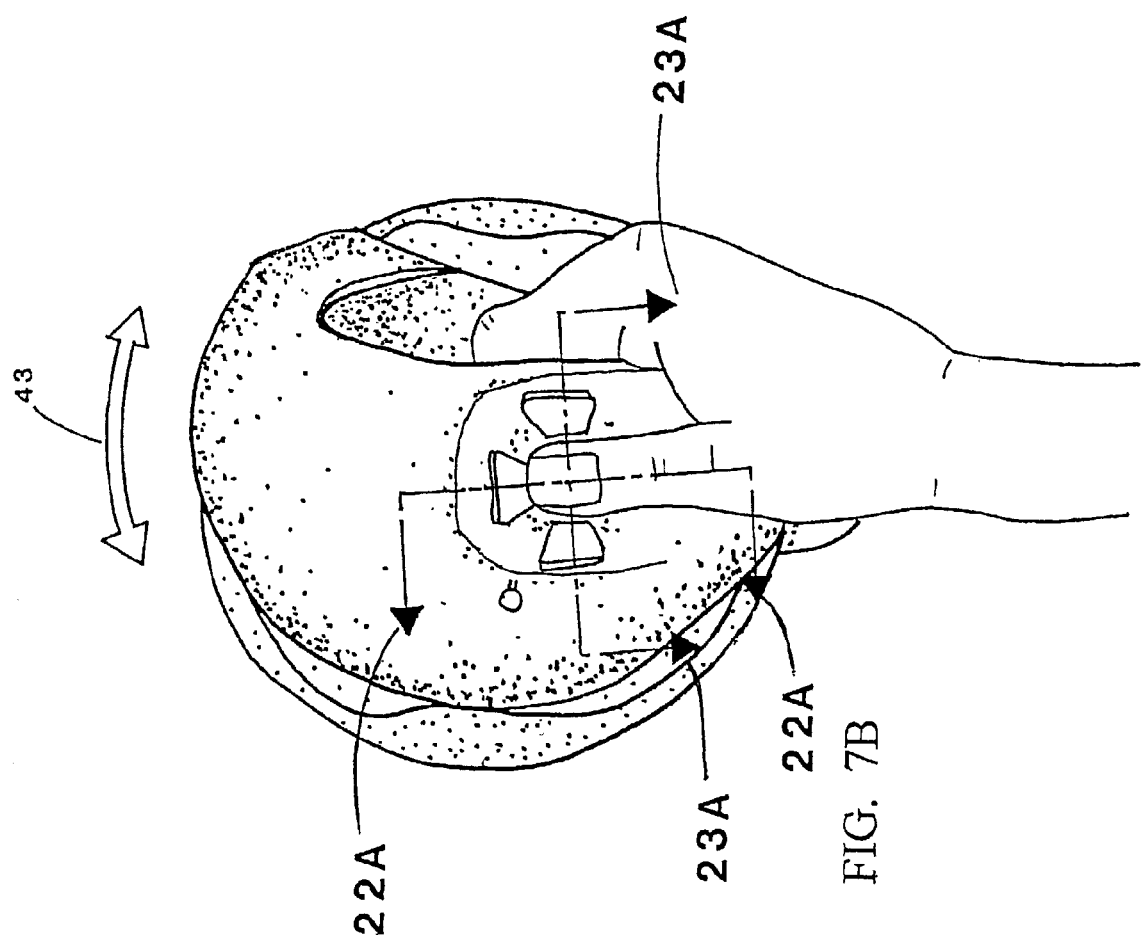
FIG. 7B is a top view of the right keyboard half 100 with additional details with the user's hand appropriately positioned for operation of the keyboard.
Figure 8:
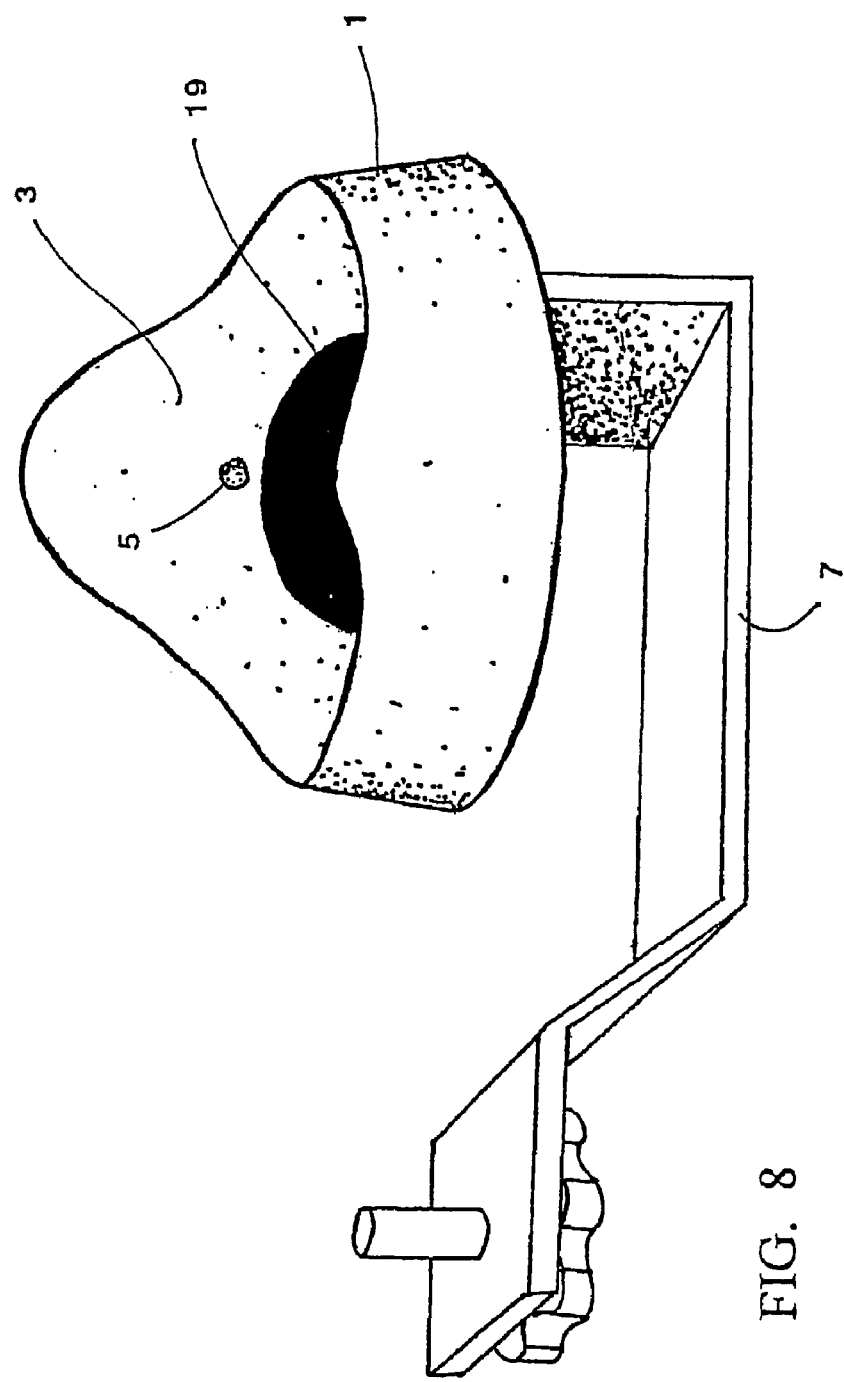
FIG. 8 is a perspective view of the base 1, illustrating an embodiment for attachment to a supporting structure.
Figure 9:
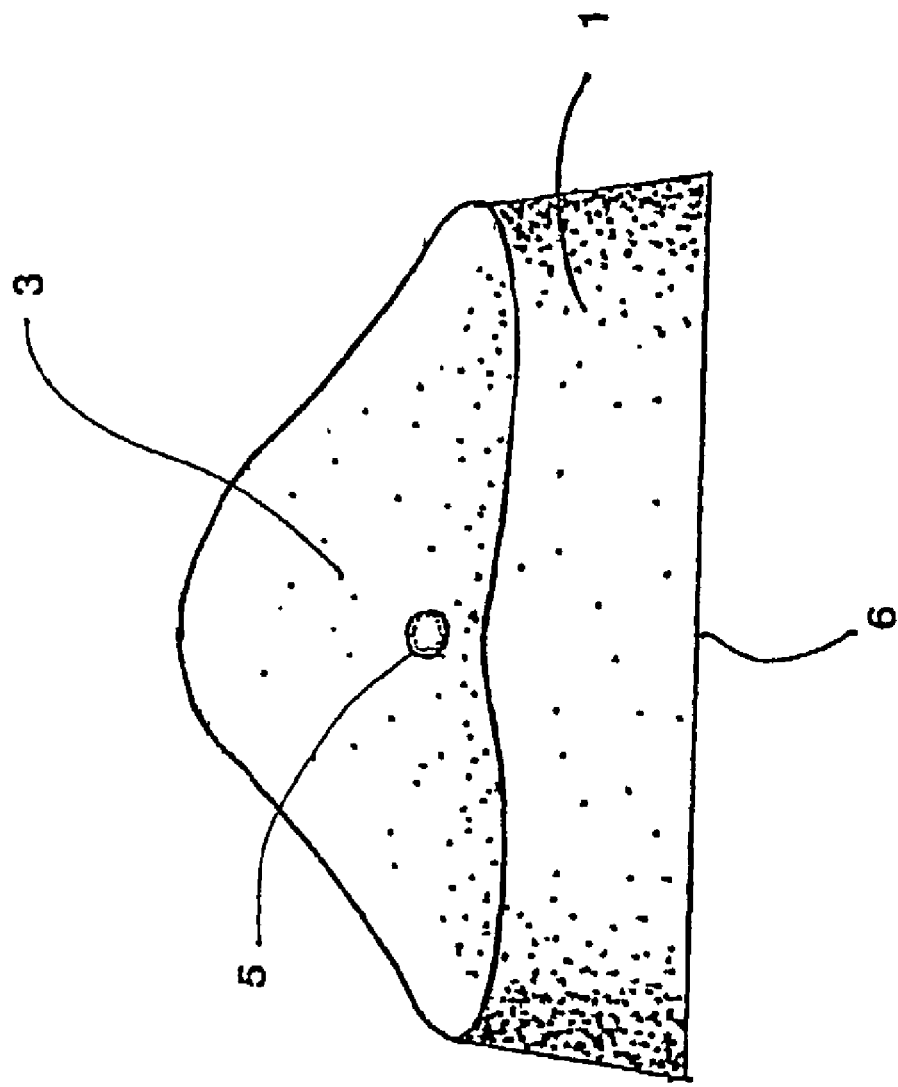
FIG. 9 is a front view of the base 1.
Figure 10:
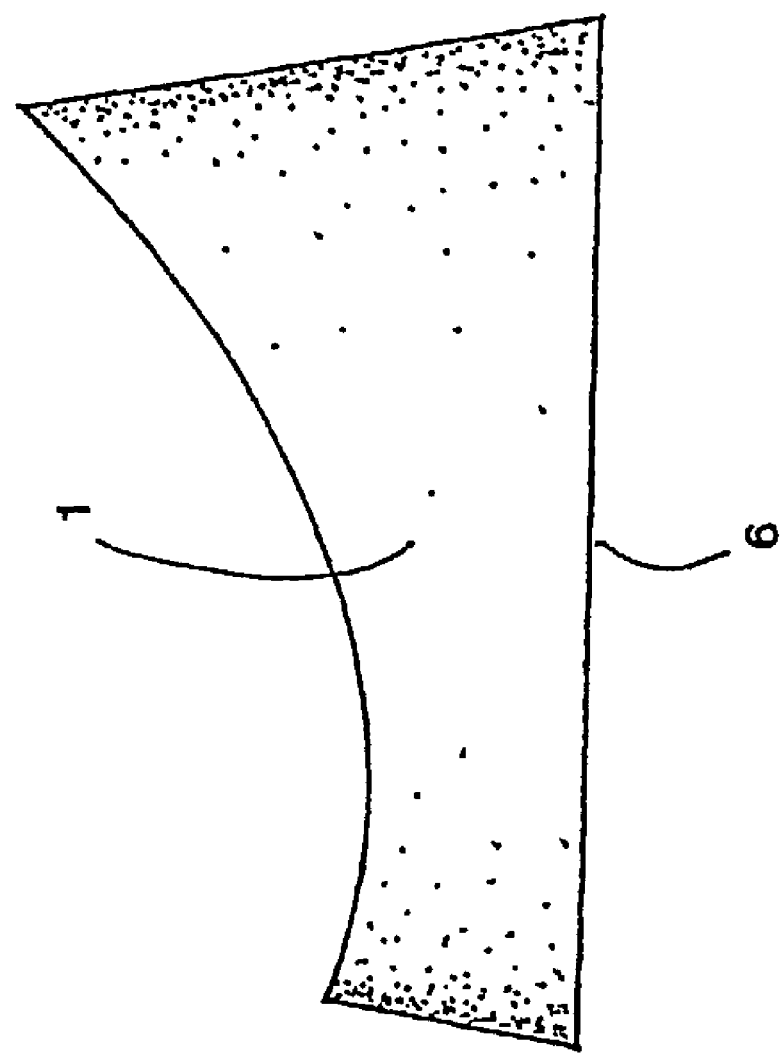
FIG. 10 is a side view of the base 1.

As shown in FIGS. 3B, 4B and 7B, simultaneous rotational adjustments of the forearm and wrist are possible with respect to medial/lateral deviation 41, internal/external rotation 42 and flexion/extension 43. The center of rotation 204 (FIG. 15B) for the upper portion in all three axes is more or less within the midportion of the hand as it rests on the palm rest, though the center of rotation could be as much as several centimeters distant from that location. This arrangement provides that rotational adjustments of wrist and forearm positions 41, 42, 43 by the use of this mechanism are not associated with significant translational motion of the hands, thereby avoiding the need for significant repositioning of the hands (up/down, forward/back or laterally/medially) as the rotational adjustments are made. Thus, each user may orient the upper portion to achieve the individually optimal position for forearm and wrist comfort, and thereby reduce the tendency for stress, fatigue and carpal tunnel syndrome.

Figure 15A:
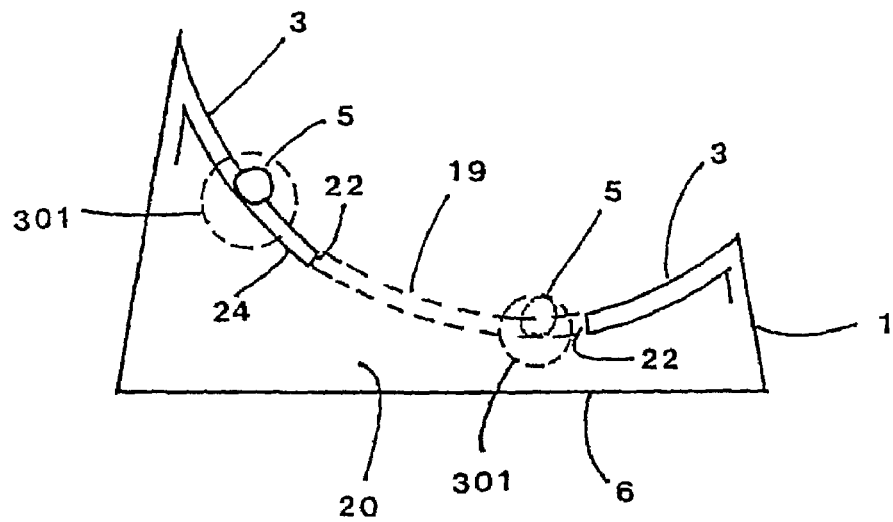
FIG. 15A is a simplified partial cross section along line 15-15 in FIG. 11, showing the contact region 3 and other areas of the base 1, and ball bearings 5.
Figure 15B:
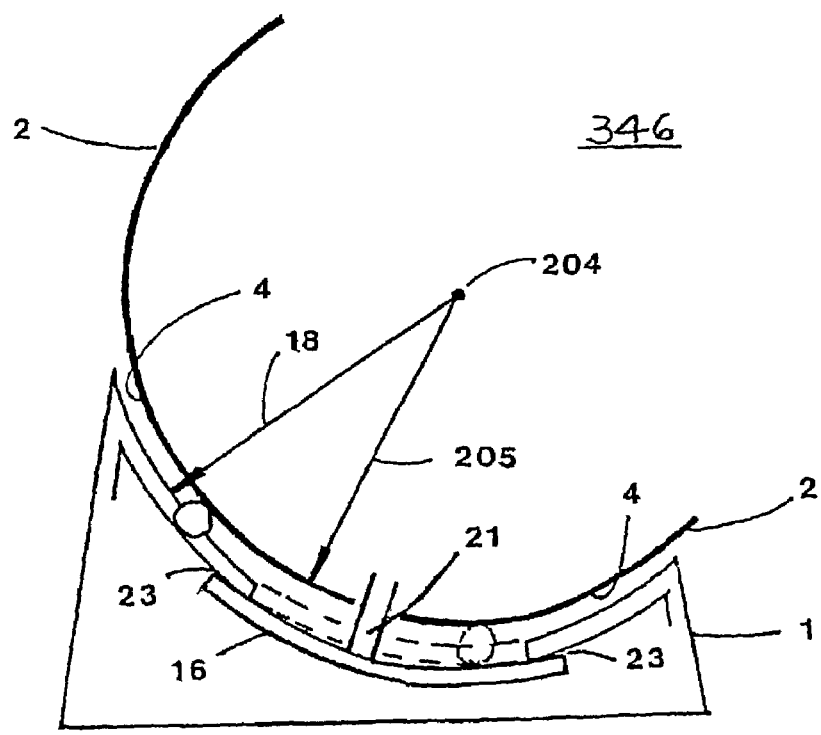
FIG. 15B shows the same cross section as FIG. 15A, but with the addition of a cross section of the corresponding adjacent convex region 4 of the upper portion 2, to indicate the relationship of the two regions and their components, including the location of the disc 16 in the interior of the base 1.

In the embodiment illustrated in FIG. 15B, the contact region 3 is a concave surface of almost the same radius of curvature 18 as the radius of curvature 205 of the convex region 4. Thus, both surfaces are portions of spheres which have a single common center 204, and the upper portion may therefore rotate, to some extent, in any of three axes 17 (see FIG. 4A), around that center 204 while remaining in contact with the base 1. The congruency of the two spheres ensures that, as the convex region 4 slides over the contact region 3, the upper portion 2 continues to rotate around that common center of rotation 204.

Further, in a further refinement of this embodiment, the rotation of the upper portion 2 relative to the base may be facilitated by the inclusion of lubricant or of some mechanism to reduce friction. In this refinement of the embodiment (FIGS. 8, 9, 11, 15A, 15B, 16A, 16H and 17), three (or more) ball bearings 5, spaced at equal distances from each other, may be located on or secured within the contact region 4 of the base 1, and secured by an appropriate mechanism to the base or, in an alternative variation, the equidistant ball bearing may be located on or secured within the convex region 4 of the upper portion 2. In both variations of this refinement, each ball bearing may rotate freely in three orthogonal axes, facilitating the free movement of the upper portion 2B relative to the base 2 with certain imposed constraints on the maximal distance of upper portion rotation in any direction, as detailed below.

Figure 16A:
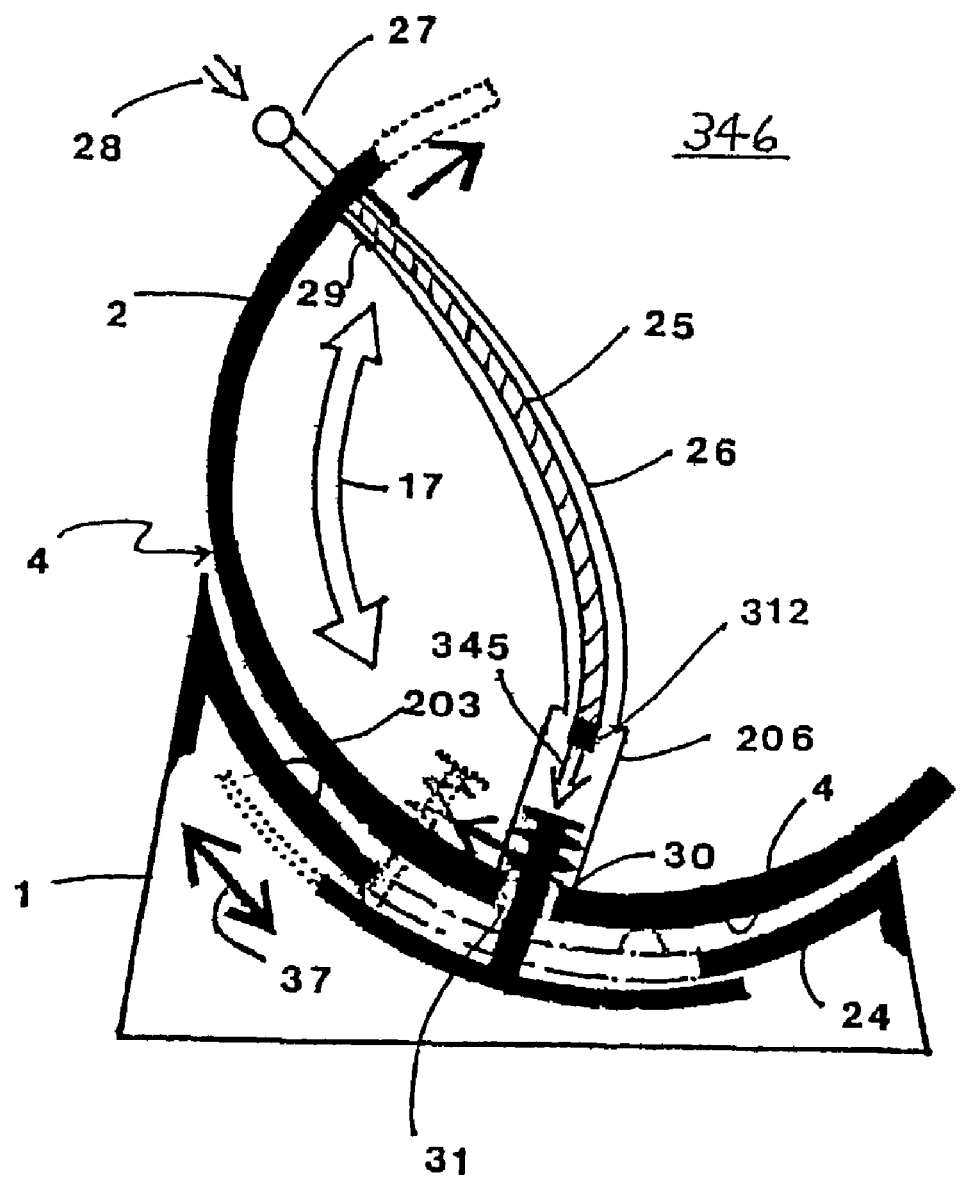
FIG. 16A is a partial cross section along line 15-15 in FIG. 11, additionally showing the contact region 4 of the base 1, and also showing a partial cross section of the corresponding adjacent convex region 4 of the upper portion 2, illustrating an embodiment 346 for a locking mechanism.
Figure 16B:
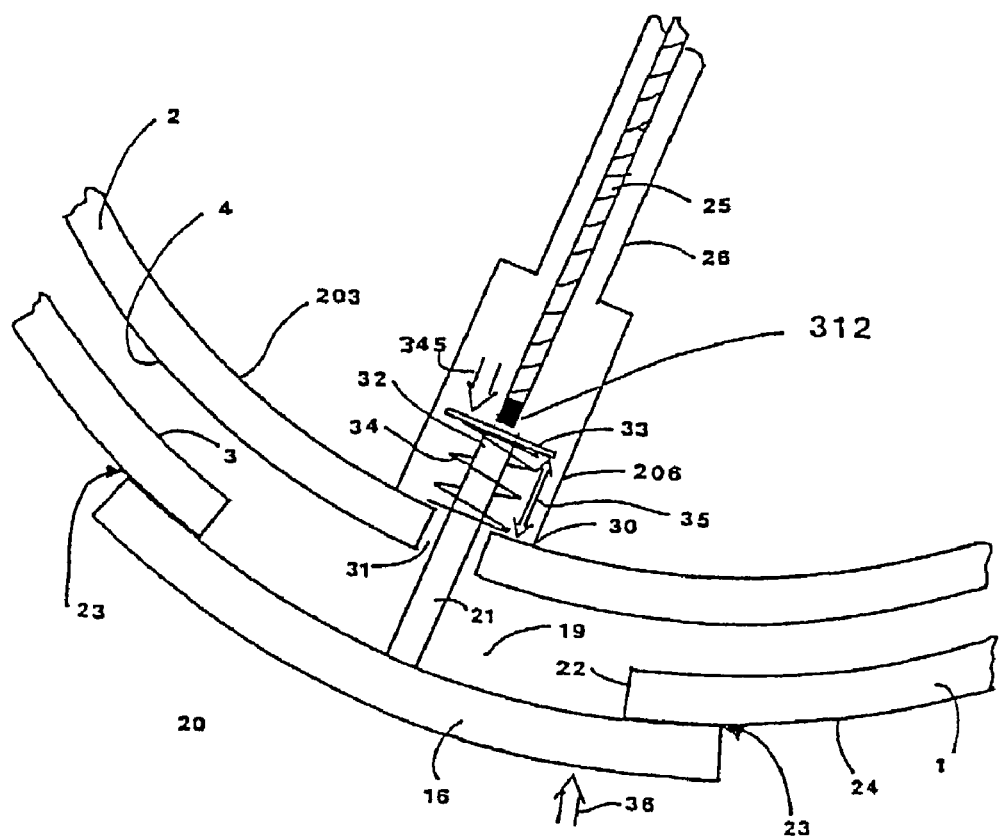
FIG. 16B is an enlargement of a portion of FIG. 16A, illustrating details of a portion of an embodiment 346 for a locking mechanism.
Figure 16C:
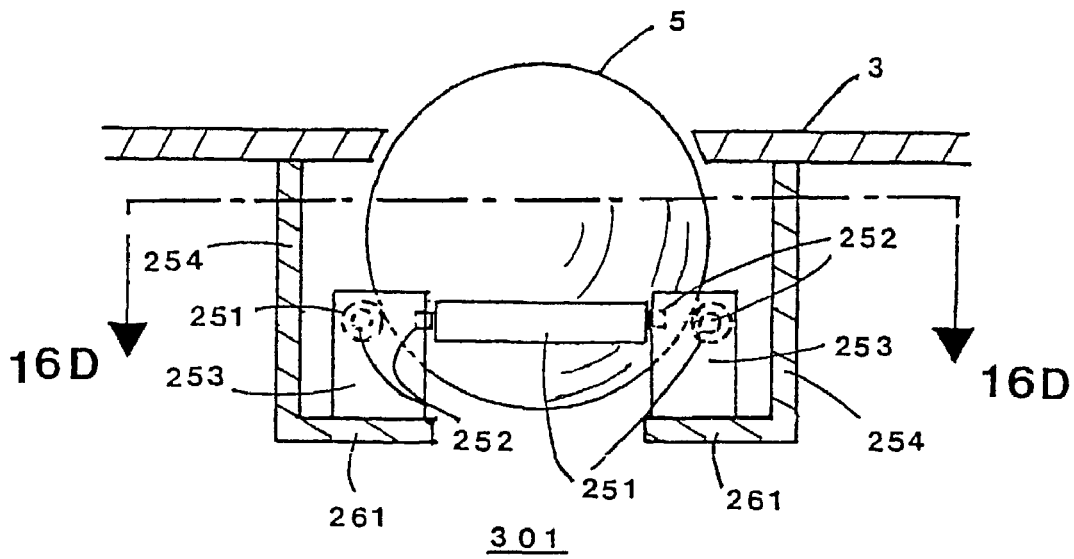
FIG. 16C is a detailed view of the ball bearing supporting apparatus 301 and adjacent contact region 3, as identified in FIG. 15A, with inclusion of ball bearing 5.
Figure 16D:
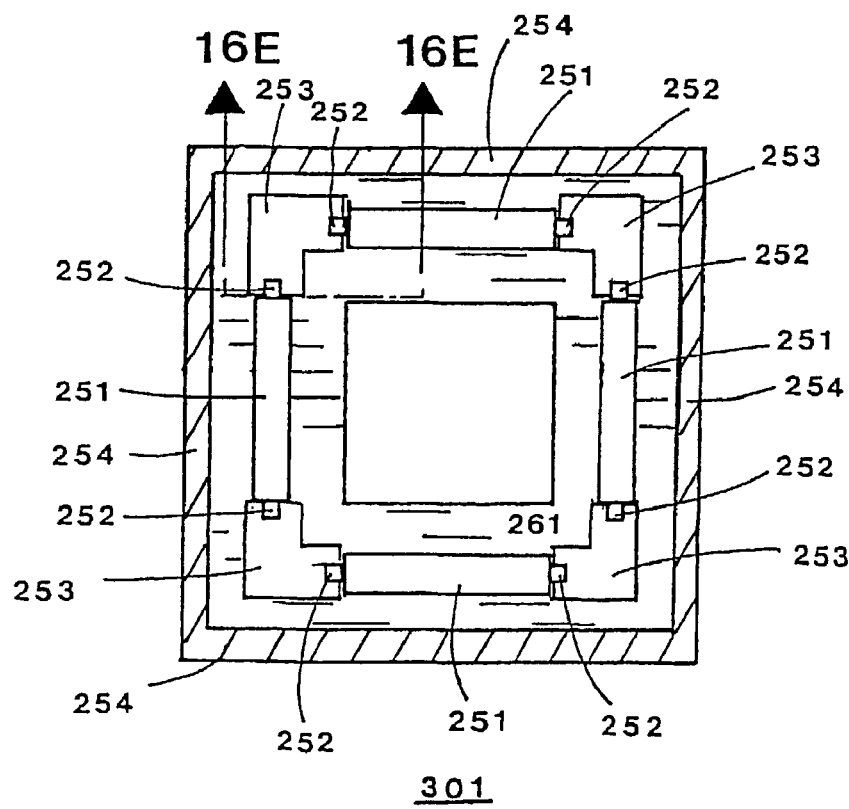
FIG. 16D is a detailed view along section 16D-16D as shown in FIG. 16C, showing a top view section of the ball bearing supporting apparatus 301, with the ball bearing 5 removed for clarity.
Figure 16E:
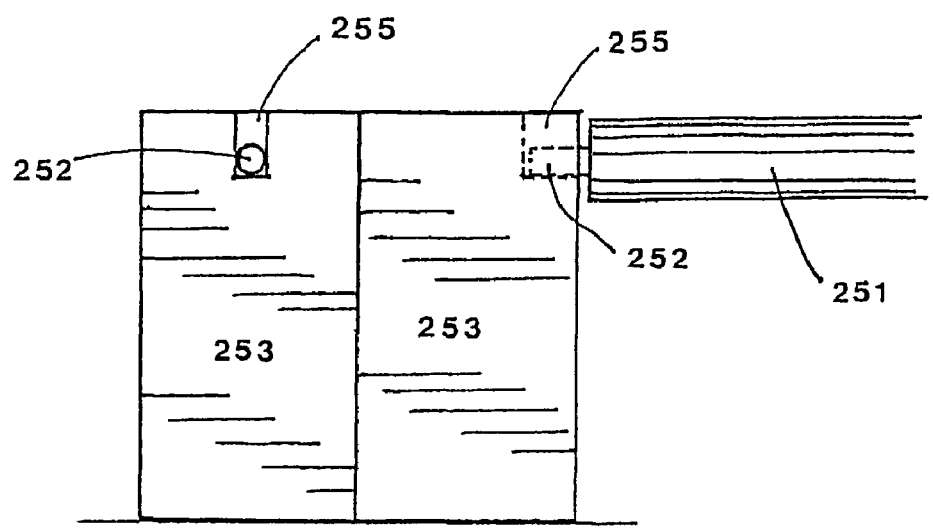
FIG. 16E is a detailed view along section 16E-16E as shown in FIG. 16D, showing a portion of the components of the ball bearing support apparatus 301, including a roller 251 and two axles 252, the latter engaged in slots 255 on support 253.
Figure 16F:
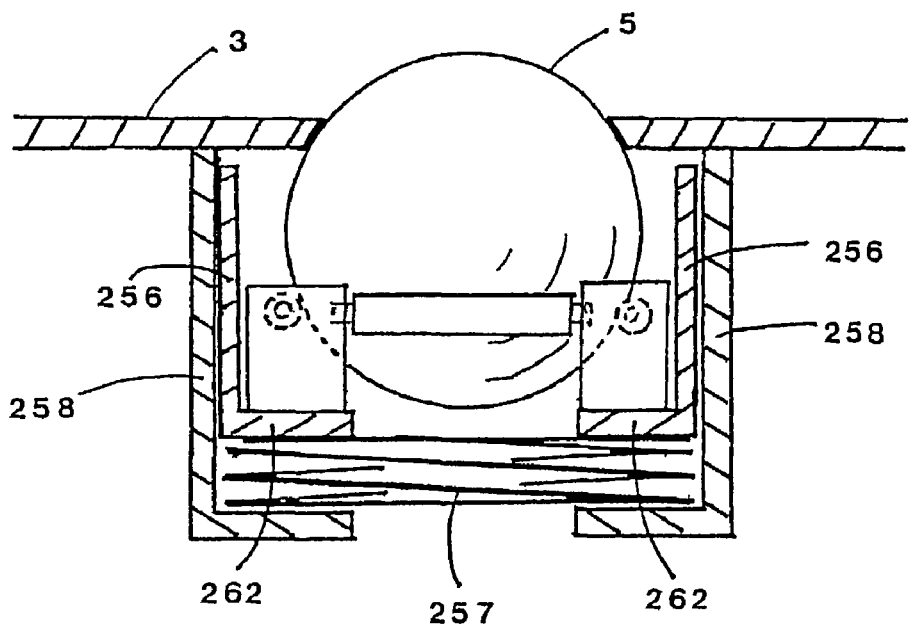
FIG. 16F is similar to FIG. 16C but shows an alternative embodiment 303 for a ball bearing support apparatus 303 and adjacent contact region 3, with inclusion of ball bearing 5, said alternative embodiment 303 to be utilized with an alternative embodiment 347 for a locking mechanism. Components of alternative embodiment 303 illustrated herein which are identical to components of embodiment 301 as shown in FIG. 16C are not specifically labeled herein.

An embodiment 301 for a mechanism to secure a ball bearing to the surface of the base 1 or upper portion 2 is shown in FIGS. 16C, 16D and 16F. This arrangement comprises a housing 254 with four rectangular, orthogonal and connected side walls and a square floor 261 attached to the bottom surface of the four side walls, said floor optionally containing an opening, which may be rectangular, for access to the interior of the housing 254, and said side walls attached along their free edge to the interior surface 24 of the base 1 or the interior surface of the upper portion 2, as may be appropriate to the particular embodiment of the invention. Contained within the housing 254 and secured to it are four supports 253, each support 253 arrayed with its base resting on or near a corner of the floor 261 of the housing 254, and each support 253 containing an upper area comprising two slots 255, clips or other similar retaining devices, each such slot 255 receiving one axle end 252 of a roller 251, said slot 255 preventing translational movement of, but not impeding rotational movement of the axles 252 and rollers 251 attached thereto. A ball bearing 5 of a diameter greater than the distance between opposing parallel rollers 251 rests its subequatorial region upon the four rollers 251. The supraequatorial region of the ball bearing 5 projects through a circular opening in the surface of the base 1 or upper portion 2 as may be appropriate for the particular embodiment of this invention, said opening being of smaller diameter than that of the diameter of the ball bearing 5. Thus, the ball bearing is retained within a space bounded by the rollers 251 and the opening in the surface of the base 1 or upper portion 2. In an embodiment, as in FIGS. 15A and 15B, rotation of the upper portion 2 relative to the base 1 causes the ball bearings 5 to rotate, such rotation being facilitated by contact of each ball bearing 5 against rollers 251, which to varying degrees may rotate as the ball bearing rotates, or may serve as a pivot point for low friction rotation of the ball bearing 5, thereby minimizing friction and resistance to ball bearing 5 rotation. In the embodiment as shown in FIGS. 11, 15A, 15B, 16A and 16B a minimum of three such devices 301, each with its associated ball bearing 5, is arrayed in from the inside surface 24 of the contact region 3.

Figure 11:
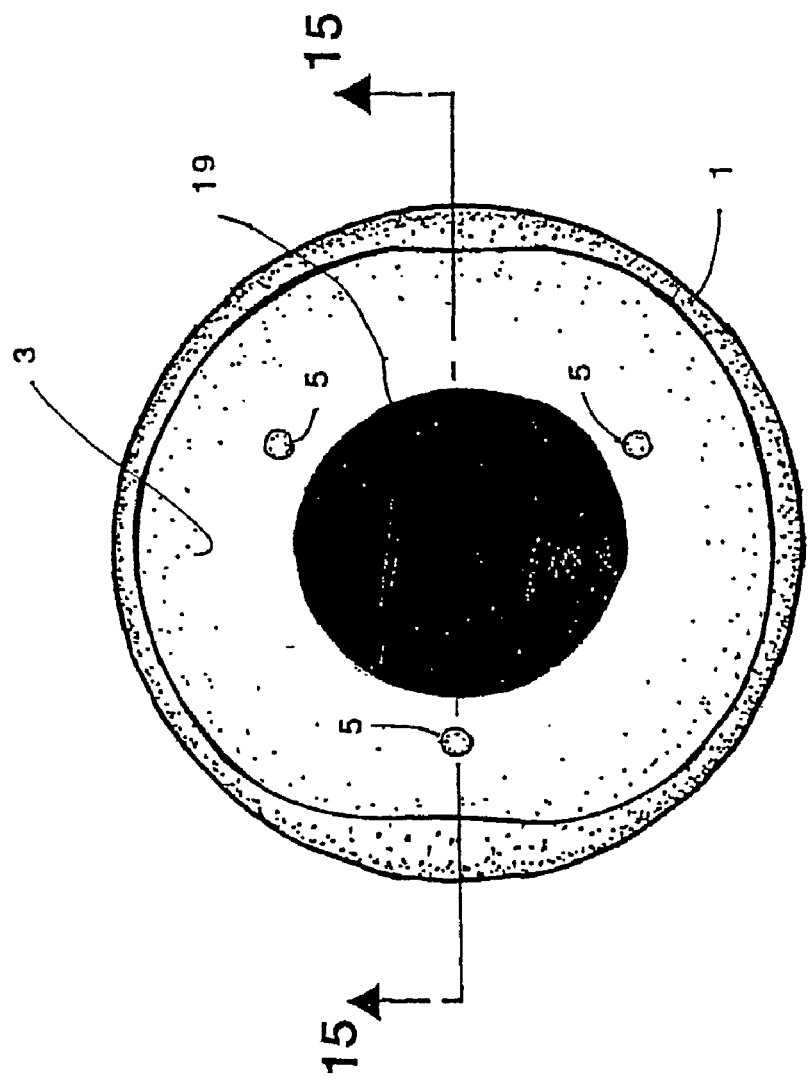
FIG. 11 is a top view of the base 1.
Figure 16G:
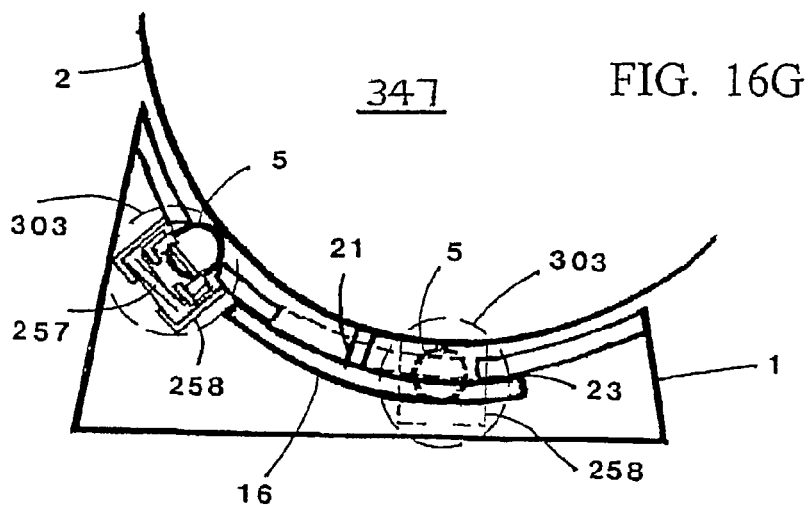
FIG. 16G is a detailed view of an alternative embodiment of the design show in FIG. 15A for a locking mechanism, with ball bearing support apparati 303 and ball bearings 5 not to scale.
Figure 16H:
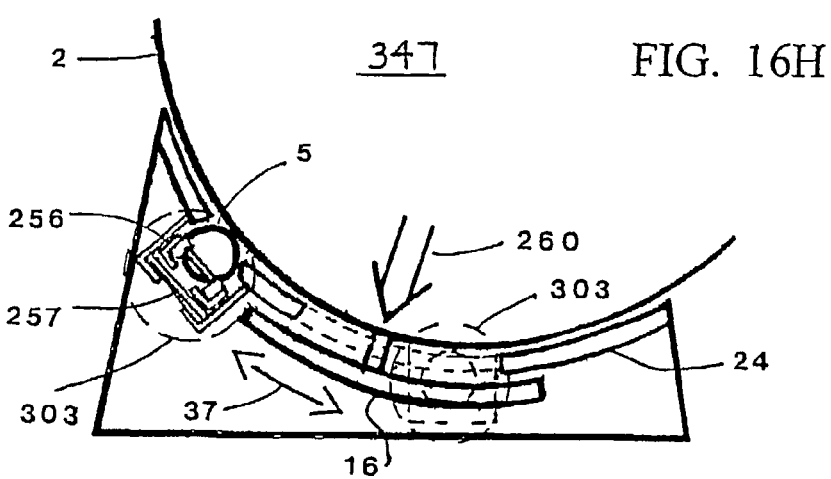
FIG. 16H is a detailed view of an alternative embodiment of the design shown in FIG. 15B, for a locking mechanism, with ball bearing support apparati 303 and ball bearings 5 not to scale, and demonstrating displacement of disc 16 from contact 23 with inner surface 24 of base 1 with application of downward pressure 260 to upper portion 2.

An alternative arrangement 303 for a mechanism to secure a ball bearing to the surface of the base 1 or upper portion 2 is shown in FIGS. 16E, 16F, 16G and 16H. This arrangement comprises a housing 258 with four rectangular, orthogonal and connected side walls and a square floor attached to the bottom surface of the four side walls, said floor optionally containing a rectangular opening for access to the interior of the housing 258, and said side walls attached along their free edge to the interior surface 24 of the base 1 or the interior surface of the upper portion 2, as may be appropriate to the particular embodiment of the invention. Contained within the housing 258 and resting upon its floor is a one end of a coil or similar spring device 257, upon whose opposite end rests the undersurface of the floor 262 of a movable housing 256, comprising four rectangular, orthogonal and connected side walls and a square floor 262 attached to the bottom surface of the four side walls, said floor 262 optionally containing a rectangular opening for access to the interior of the movable housing 256. Secured to the upper surface of the floor 262 of the movable housing 256 are four supports 253, each arrayed with their base resting on or near a corner of the floor 262 of the movable housing 258, and each support containing an upper area comprising two slots 255, clips or other similar retaining devices, each such device 255 receiving the axle end 252 of a roller 251, said device 255 preventing translational movement of, but not impeding rotational movement of the axles 252 and rollers 251 attached thereto. A ball bearing 5 of diameter greater than the distance between opposing parallel rollers 251 rests its subequatorial region upon the four rollers 251. The supraequatorial region of the ball bearing 5 projects through a circular opening in the surface of the base 1 or upper portion 2, as may be appropriate for the particular embodiment of this invention, said opening being of smaller diameter than that of the diameter of the ball bearing 5. Thus, the ball bearing is retained within a space bounded by the rollers 251 and the opening in the surface of the base 1 or upper portion 2. In a preferred embodiment, as in FIGS. 16G and 16H, rotation of the upper portion 2 relative to the base 1 causes the ball bearings 5 to rotate, such rotation being facilitated by contact of each ball bearing 5 against rollers 251, which to varying degrees may rotate as the ball bearing rotates, or may serve as a pivot point for low friction rotation of the ball bearing 5, thereby minimizing friction and resistance to ball bearing 5 rotation. A minimum of three such devices 303, each with its associated ball bearing 5, is arrayed from the inside surface 24 of the contact region 3 in the embodiment as shown in FIGS. 11, 16G and 16H.

Figure 17:
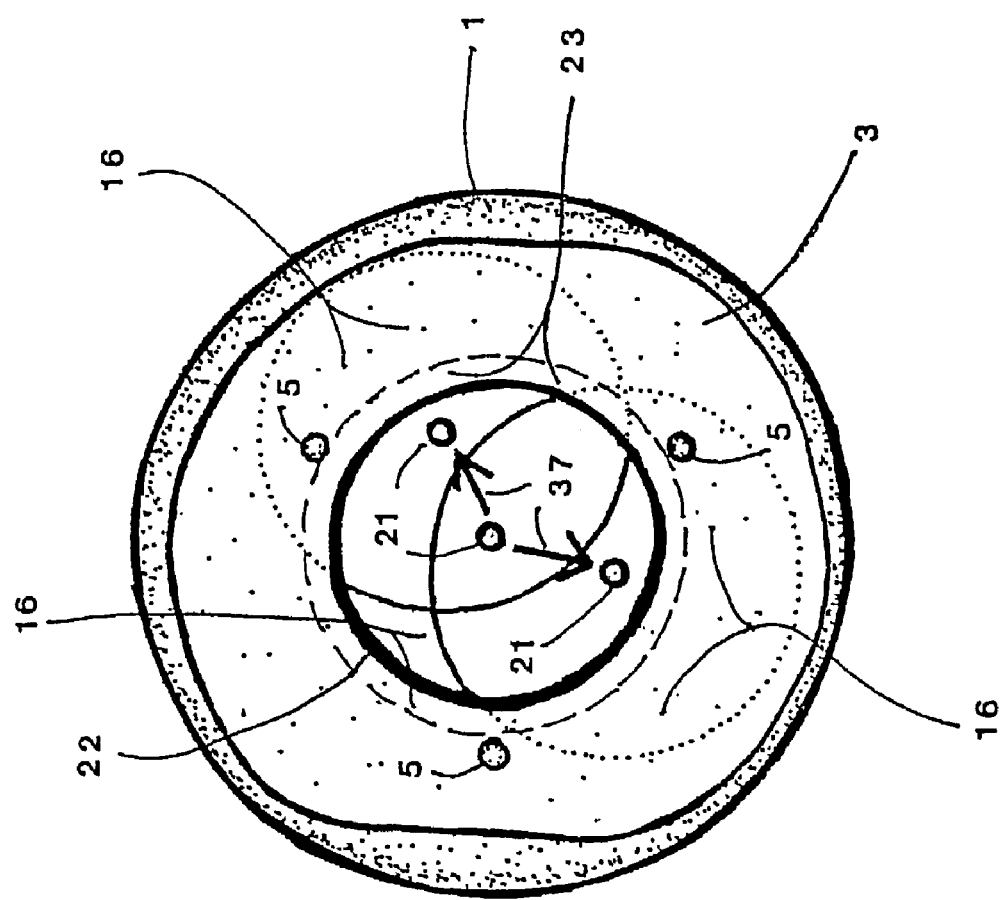
FIG. 17 is a top view of the base, with disc 16 shown in position, and rod 21 shown in cross section, and with the remainder of the upper portion removed. Three locations for the rod 21 and disc 16 are shown by way of example, with phantom outlines to indicate the portions of the disc 16 which are concealed by the surface of the contact region 3.

In one embodiment (FIGS. 15B, 16A, 16B, 16G, 16H and 17A) a mechanism is provided to connect and attach the upper portion 2 to the base 1 so as to prevent them from becoming separated, and to permit the upper portion 2 to be secured relative to the base 1 in any desired position within the certain constraints detailed below, yet to permit the base 1 again to move to any other desired and permissible position and again be secured in that position. In the embodiment, as in FIGS. 8, 11 and 15-17, the base 1 is provided with a round opening 19 in the center of the contact region 3, permitting access into a portion of the interior region 20 of the base. Secured (by mechanisms detailed below) to the inner surface 203 of the convex region 4, and projecting from it, is a rod 21 or similar structure which extends through the opening 19 in the base 1. As shown in FIGS. 16A and 17, the upper portion's 2 range of motion 37 is thereby limited by contact between the rod 21 and any portion of the rim or edge 22 of the opening 19 in the base 1. The size of the opening 19 and the diameter of the rod 21 thus determine the maximum range of motion of the upper portion 2 relative to the base 1.

Referring now to FIGS. 13-17, a disc, washer, or equivalent structure 16, whether with smooth continuous or discontinuous perimeter circumference (or a similar structure with open spaces) either flat or representing a portion of the surface of a sphere (with a radius of curvature to match the inner surface of the base 1) and of solid material, is fixably attached to one end of the aforementioned rod 21, and is positioned within the interior of the base. The length of the rod 21 projecting beyond the convex region 4 is such as to keep the disc 16 within close proximity to the inner surface 24 of the base 1. The diameter of the disc 16 is larger than the diameter of the opening 19 of the base, thus preventing the disc 16 from pulling through the opening 19 and thereby preventing the upper portion 2 from separating from the base 1. The other end of the rod 21 is fixably or movably attached to upper portion 2 by mechanisms described below.

Referring to FIGS. 15B, 16A and 16B, a further embodiment of this invention comprises a locking mechanism 346 by which the upper portion 2 may be locked or secured in any position relative to the base 1 by means of the aforementioned disc, washer or similar structure 16. By various mechanisms discussed below the disc 16 may be pulled tight against the interior surface 24 of the contact region 3 to prevent rotational motion 17 of the upper portion 2 relative to the base 1, or released from such contact, thereby permitting such motion with subsequent reversible fixation.

In another arrangement, not shown, the same locking mechanism may be placed in another location in which the surfaces of the base and upper portion may be in apposition. In another embodiment not shown, the disc 16 of convex rather than concave shape, is located within the interior of the upper portion 2, and connected to the rod 21 which projects through an circular opening in the convex region 4 and is fixably or movably connected, by certain mechanisms analogous to those described immediately below for the embodiments, to the base 1, such that disc 16 may be pulled tight against the interior surface of the convex region 4 to prevent rotational motion 17 of the upper portion 2 relative to the base 1, or released from such contact, thereby permitting such motion.

In an embodiment 346 (FIGS. 16A and 16B) of this locking mechanism the device utilized to release and secure this locking mechanism may be a cable 25 coaxially inside a flexible cylindrical tube 26, similar to a camera cable release. One end of the cable 25 ("user end") is connected, through the exterior surface of the upper portion 2, to a lever, button, or similar device 27 which is located on or near the thumb region 10, as in FIGS. 1A, 4A and 7A, or alternatively on or near the finger region 15 or elsewhere on the upper portion 2, and said lever 27 may be depressed or otherwise actuated by pressure or motion 28 of the user's thumb or finger, as in FIG. 16A. One end 29 of the cylindrical tube 26 is fixably secured to the inner surface 203 of the upper portion 2 beneath the lever 27, and the other end 206, which may expanded in diameter, is fixably secured to the inner surface 30 of the convex region 4, such that it surrounds the opening 31 in the convex region 4 through which the rod 21 projects. The other end 312 of the cable 25 makes contact with the end 32 of the rod 21 (the "upper" end) opposite from the end attached to the disc 16. A small collar 33 or similar enlargement is provided at the upper end 32 of the rod 21. A spring 34 is positioned around the rod 21, and is situated between, and makes contact with, the collar 33 and the inner surface 203 of the upper portion inside the enlarged end 206 of cylindrical tube 26. The spring 34 provides pressure or force 35 between the collar 33 and the inner surface 203 of the upper portion, thereby applying pressure of force 36 on the rod 21 and disc 16 to maintain tight contact 23 between the disc 16 and the inner surface 24 of the base 1. Pressure 28 applied by the user to the lever 27 displaces the cable 25 longitudinally forward, creating force 345 upon the upper end 32 of the rod 21; said force, when greater than the opposing force 35 of the spring 34, moves the rod 21 toward the interior of the base 1 against the movement of the rod 21 releases the disc 16 from its contact 23 with the inner surface 24 of the base 1, permitting motion of the upper portion 2 relative to the base 1. When the pressure 28 is reduced below the force 35 of the spring 34 the disc 16 returns to its contact 23 with the inner surface 24 of the base 1, thereby again locking the base 1 relative to the upper portion 4.

In an alternative arrangement, not illustrated, for this locking mechanism 346, a lever mechanism or a series of mechanical linkages, or one or more hydraulic lines, or various combinations thereof, is substituted for the cable release in the aforementioned locking mechanism 346. Pressure 28 applied by the user's finger or thumb to a rod, lever, button or similar structure 27 on or near the thumb or finger region or elsewhere on the upper portion 2, is transmitted by such linkages, which may include one or more levers, and/or hydraulic lines, to the upper end 32 of the rod 21 as described above. That pressure 28 has the same consequent effects as described above.

In another embodiment 347 (FIGS. 16F, 16G and 16H) of a locking mechanism, the upper end 32 of the rod 21 is fixably attached to convex region 4 of the upper portion 2 and the opposite end of the rod 21, which projects through the opening 19 in the convex region 3 of the base 1, is fixably attached to the center of a disc 16, as described above, said rod 21 being of appropriate length to keep the surface of the disc 16 in close proximity to the inner surface 24 of the base 1. Each of three equidistant ball bearings are secured to the surface of the contact region 3 with housing 303. Pressure of the springs 257 push the ball bearings 5 against the convex region 4, raising the upper portion slightly away from the base and thereby pulling the disc 16 against 23 the inner surface 24 of the base 1, preventing motion of the upper portion 2 relative to the base 1. When the user applies downward force 260 on the upper portion 2, the force is transferred to each ball bearing 5 and its associated housing 303, such that each moveable housing 256 is displaced downward against the weaker opposing force of the spring 257. The displacement of the ball bearings 5 brings the upper portion 2 closer to the base 1, thereby releasing the disc 16 from its contact 23 with the inner surface 24 of the base 1, permitting motion of the upper portion 2 relative to the base 1. Reduction of the downward force 260 applied by the user to the upper portion results in renewed contact 23 of the disc 16 with the inner surface 24 of the base 1, thereby locking the position of the upper portion 2 relative to the base 1.

Other mechanisms not shown may be utilized to lock the base 1 to the upper portion 2 in the desired position, and then release the upper portion from the base for repositioning and locking.

This invention also comprises an alternative embodiment for each keyboard half 100, 200 in which each keyboard half 100, 200 is a single structure whose surface comprises a palm rest region 8, a hypothenar rest region 9, a thumb region 10, a finger key region 15, a region 6 for resting upon a table or similar surface, a region 7 for attachment of apparatus for fixable or adjustable attachment to chair, armrest, table or similar structure, and an interior space region which is at least partially hollow, the nature, design, arrangement and function of each such surface and interior region being as described elsewhere in this disclosure.

C. Relationship Between Keyboard Halves and Desk, Chair or Armrest, Including Issues of Adjustability, Ergonomics and Comfort.

Figure 18A:
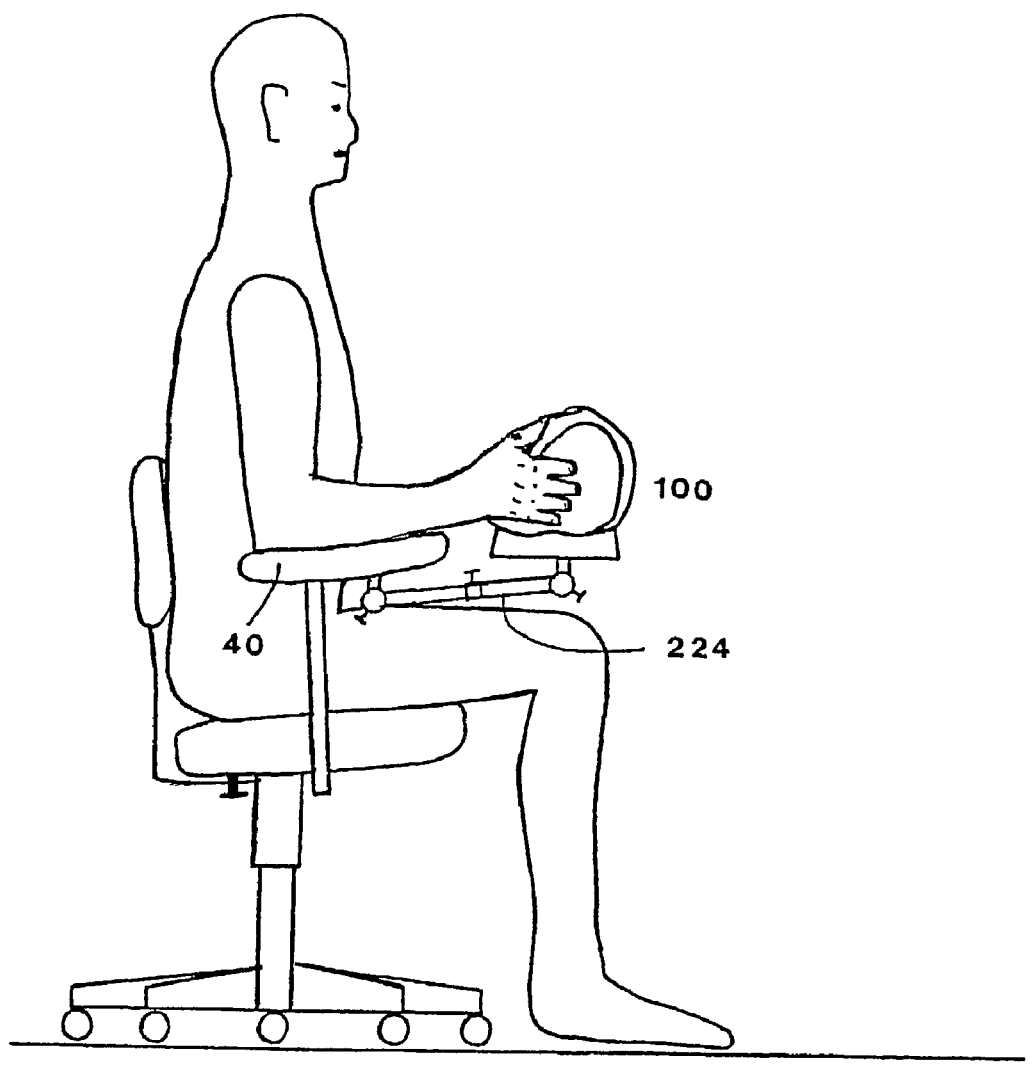
FIG. 18A shows an embodiment of an apparatus 224 for attachment of the right keyboard half 100 to a right forearm rest 40 of a user's chair, illustrating the user's position.
Figure 18B:
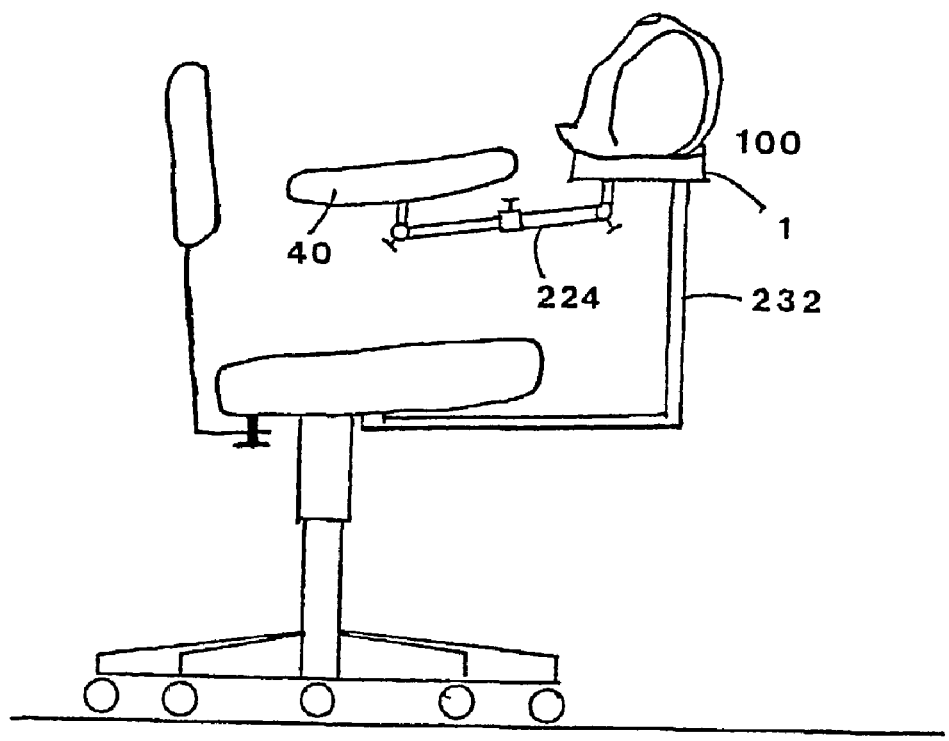
FIG. 18B shows an alternative embodiment for connecting and securing right the keyboard half 100 to the user's chair utilizing an attachment apparatus 232, and with an additional apparatus 224 connecting and securing forearm rest 40 to the right keyboard half 100.

Referring to FIGS. 18A and 18B, a key feature of this invention is the ability to use this keyboard while seated in various positions which are comfortable, convenient and ergonomically appropriate, said positions involving optimal positioning of the upper arms, forearms, wrists, hands and digits and resting support of the forearm, wrist and palm regions. Various components of this invention are included to achieve this goal.

In another embodiment the user's forearm rests upon a forearm rest 40 which is adjustable to the user's preference, and simultaneously the keyboard half 100 is positioned such that the various regions of the user's hand and wrist may be comfortably positioned upon the corresponding regions of keyboard 100 to the user's preference, and the upper portion 2 rotated and positioned relative to the base 1 such that arm, forearm, wrist and hand are positioned for maximal comfort according to the user's preference. In such an arrangement the degrees of hand separation, forearm elevation/depression, hand height relative to forearm height, forearm internal/external rotation, wrist flexion/extension, and wrist ulnar/radial deviation are all infinitely adjustable within predetermined ranges to achieve the optimal degree of user comfort, relief from stress and fatigue, and to minimize the risks of repetitive stress injury and carpal tunnel syndrome. Various embodiments of this invention are presented to illustrate arrangements by which the relationship between forearm rest 40 and keyboard half 100 be maintained when chair and desk/table, are component's of the user's environment. In all of the various embodiments, in order to enhance user comfort, the top surface 39 of the forearm rest 40 may be covered with cushioning material 249 comprising foam, leather, soft plastic, or similar material, or gel or other viscous material enclosed in a leakproof material which may mold to the shape of the user's forearm for maximal comfort. In an alternative arrangement, not further detailed, the user may operate the keyboard invention without any forearm rest, though with reduced benefits regarding comfort, stress relief and reduction in repetitive stress.

In one embodiment of this invention the keyboard half 100 rests upon a desk or table. The users chair, comprising in part a forearm rest 40 of conventional design and attachment to the chair, is positioned by the user at a comfortable distance from the desk or table. Increased comfort will be achieved when the chair height and forearm rest 40 height are adjusted to align the forearm rest at the same height as the keyboard half 100, 200, so that the forearm, wrist and hand are comfortably aligned in appropriate ergonomic positions as they rest upon the forearm rest 40, the palm rest region 8 and the hypothenar rest region 9, respectively.

In a second embodiment of this invention the keyboard half 100 is attached to the front or side or underside of a table or desk or similar structure by means of a supporting apparatus 7 (FIG. 8) which is fixably secured to a region of the base 1, the apparatus 7 being secured to table and/or base 1 in such a manner as to place the palm rest region 8, the hypothenar rest region 9 and the thumb region 10 at the user's desired or preferred height. The user's chair, comprising in part a forearm rest 40 of conventional design and attachment to the chair, is positioned by the user at a comfortable distance from the both keyboard halves 100 and 200. Increased comfort will be achieved when the chair height and forearm rest 40 height are adjusted to align the forearm rest at the same height as the keyboard half 100 so that the forearm, wrist and hand are comfortably aligned in appropriate ergonomic positions as they rest upon the forearm rest 40, the palm rest region 8 and the hypothenar rest region 9, respectively.

In a third embodiment of this invention a keyboard half 100 is adjustably secured to a forearm rest 40 of conventional design by means of adjustable connecting apparatus 224, as further described below, and either the keyboard half 100, the forearm rest 40 or the connecting apparatus 224 rests upon or is secured to a supporting surface or structure, as may be appropriate for the particular arrangement or application. To enhance user comfort, the top surface 39 of the forearm rest 40 may be covered with cushioning material 249 comprising foam, leather, soft plastic, or similar material, or gel or other viscous material enclosed in a leakproof material which may mold to the shape of the user's forearm for maximal comfort. FIG. 18A shows one arrangement for use of this connecting apparatus 224, wherein the standard forearm rest 40 is adjustably or fixably secured to the user's chair by conventional means, and said forearm rest 40 is adjustably connected to the base 1 of the keyboard half 100 by means of the connecting apparatus 224. FIG. 18B shows another arrangement, in which the base 1 of the keyboard half 100 is fixably or adjustably attached to the base of the user's chair by apparatus 232, as further described below, and base 1 is adjustably attached to forearm rest 40 by means of connecting apparatus 224.

In other arrangements not illustrated, the forearm rest and keyboard half 100 are adjustably connected as detailing below by the connecting apparatus 224, and either the forearm rest 40 or the keyboard half 100 or the connecting apparatus 224 is supported on the floor or table or user's thighs, or other body regions, or attached to a wall, by means of one or more supporting rods, cylinders or other apparati.

One embodiment of a supporting apparatus 224 is shown in FIGS. 18A, 18B, 19A and 19B. Connecting apparatus 224 (FIGS. 19A and 19B) comprises two ball 230 and socket 237 joints, a slidably adjustable joint apparatus, and various connecting rods or tubes. Tube or rod 225 is fixably attached to ball 230 which engages socket 237, whose position is adjustably secured by conventional screw-type pressure fitting and knob 231. One end of tube or rod 226 is fixably connected to socket 237 and its other end extends coaxially within tube 227, whose inner diameter is minimally greater the outside diameter of tube or rod 226. Sleeve 228, whose inside diameter is minimally greater than the outside diameter of tube 227, and whose length is a small fraction of the length of tubes 226, 227, is fixably secured to tube 227 toward one end of tube 227 by means of two or more radially oriented set screws 235 threaded into radially oriented threaded holes 234 in sleeve 228, such that, when set screws 235 are tightened, the inner ends of set screws 235 pressibly contact tube 227 and render it immobile in any of an infinite range of length and rotatory positions. Sleeve 228 also comprises an radially oriented threaded hole 233, of smaller diameter than radially oriented hole 238 near adjacent end of tube 227, such that threaded machine screw with knob 229 threadably engages hole 233 and extends through hole 238, where it pressibly contacts disc 236, whose pressible contact with tube 226 renders it immobile in any of an infinite range of length and rotatory positions. Free end of both tubes or rods 225 may be fixably secured by conventional means to forearm rest 40, to seat, back or other region of user's chair, to base 1 or other region of keyboard half 100, and/or to desk or table front, side or underneath region, or to other structures, as may be appropriate for the particular embodiment of this invention.

Figure 19A:
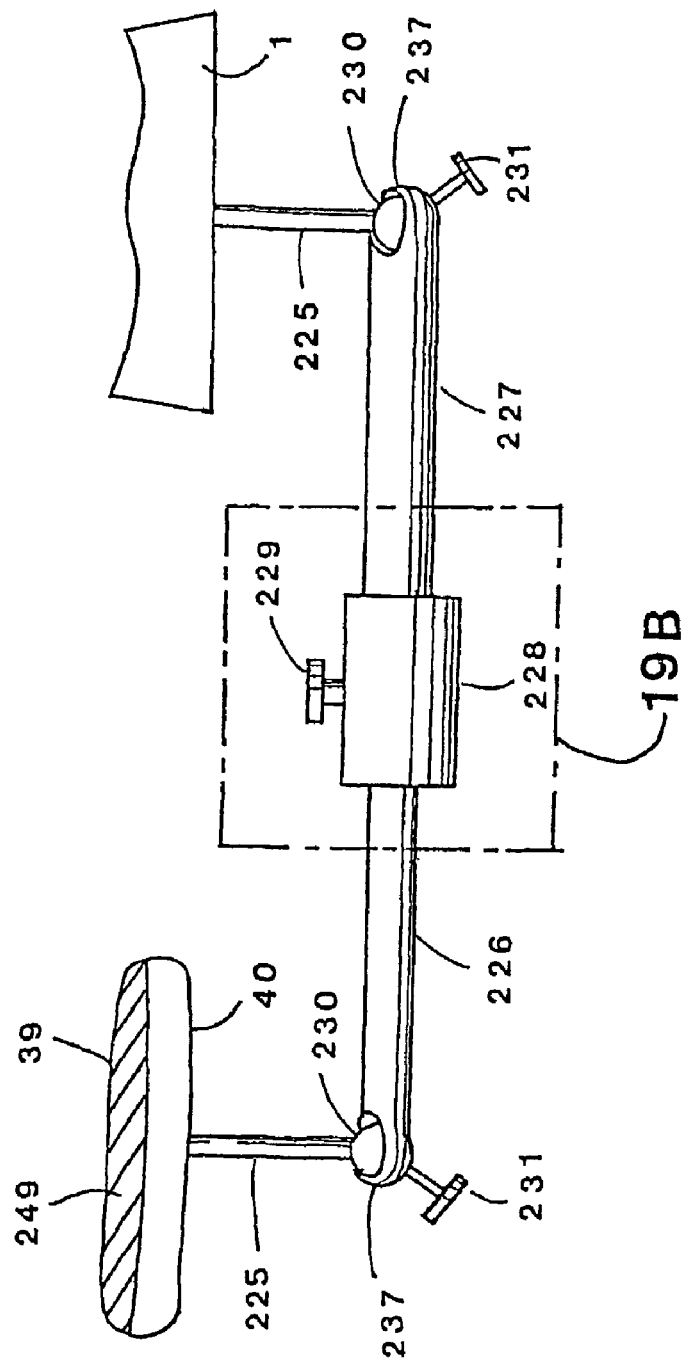
FIG. 19A is a lateral view of the apparatus 224 for adjustable attachment of the armrest 40 to the keyboard base 1.
Figure 19B:
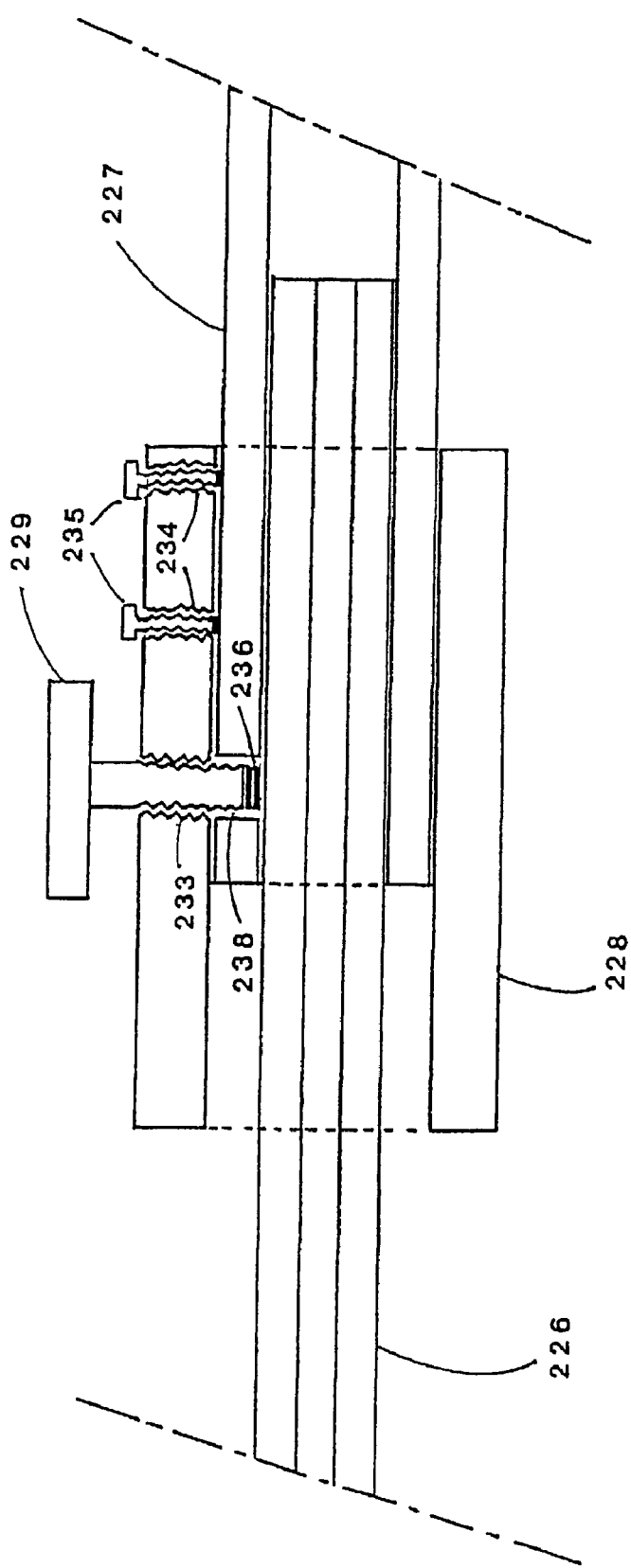
FIG. 19B is an enlarged longitudinal section of the portion of the apparatus 224 indicated as 19B in FIG. 19A.

Apparatus 232 (FIG. 18B) comprises a bent rod, tube or similar structure, or a series of fixably connected rods, tubes or similar structures, or alternatively connecting apparatus 224 in which the relative lengths of rods or tubes 225 and tubes 226, 227 are varied from those illustrated in FIG. 19A. Furthermore, one or more rods 225 may be replaced with the arrangement shown in FIG. 19B.

Thoughtful inspection of the concepts and arrangements disclosed herein will indicate that the various embodiments of this invention achieve the goals detailed above of achieving full individual adjustability for comfortable, restful, ergonomic positioning of all of the various regions and joints of each user's upper extremity while operating this invention.

D. Detailed Description of Finger Key Region.

Rest Position of Fingers, and the Home Row

Figure 20:
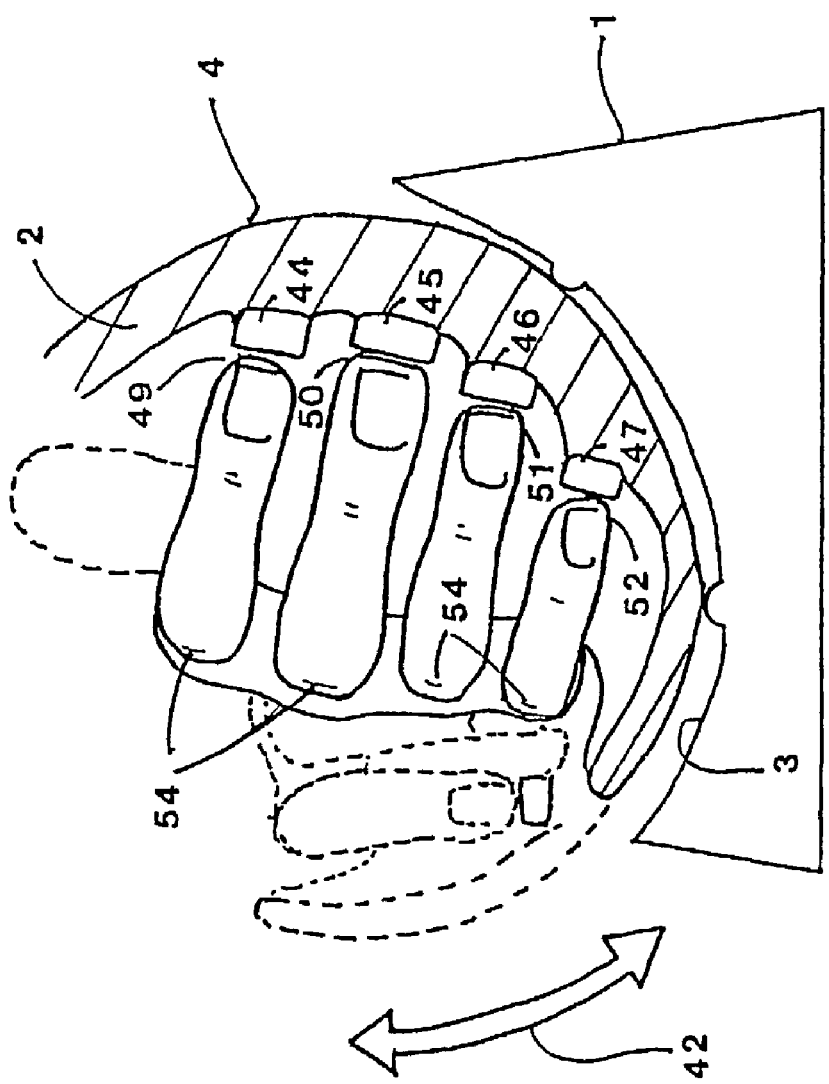
FIG. 20 is a partial cross section along line 1-1 as shown in FIGS. 3B, 7A and 21A, showing the position of the relaxed fingers on the home row keys 44, 45, 46 and 47, and illustrating adjustable positioning of upper portion 2 relative to base 1 of the right keyboard half 100 with regard to right forearm internal and external rotation 42.
Figure 21A:
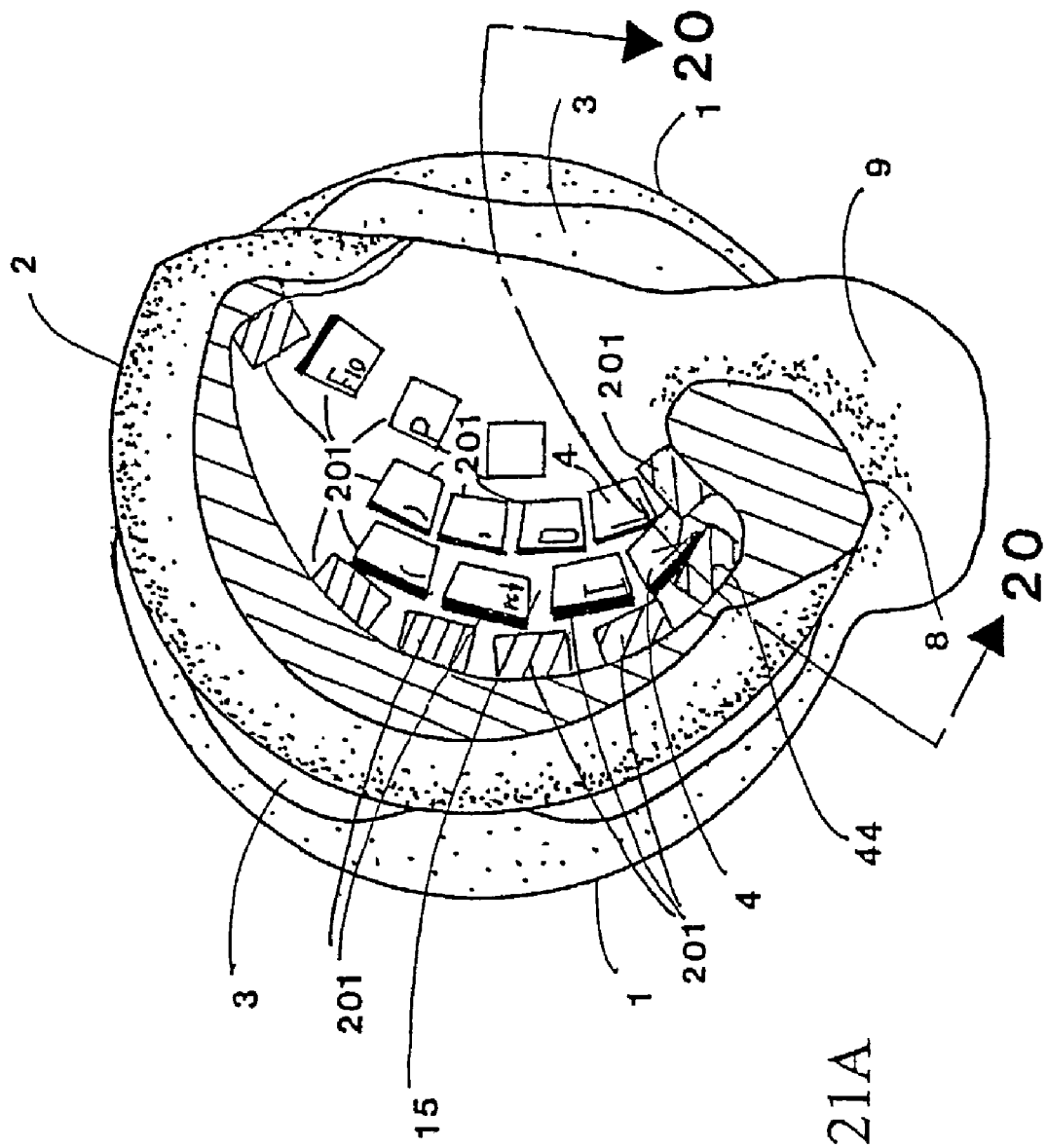
FIG. 21A is a top view of right keyboard half 100, with the upper part of the upper portion 2 removed along line 21A-21A as shown in FIGS. 3A and 4A.
Figure 21B:
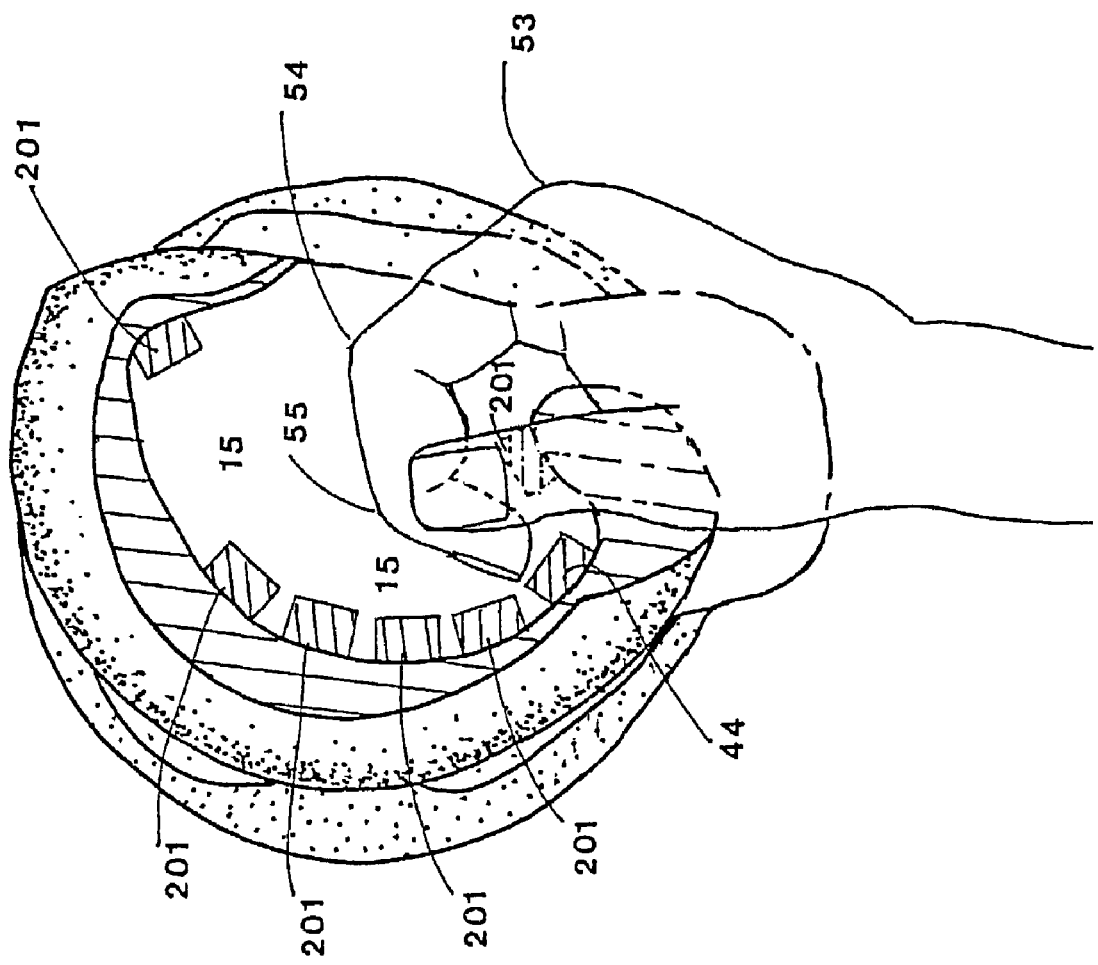
FIG. 21B is a top view of right keyboard half 100, with the upper part of the upper portion 2 removed along line 21A-21A as shown in FIGS. 3A and 4A, with the user's hand appropriately positioned for operation of the keyboard and certain keys not illustrated for clarity.

Referring now to FIGS. 12A-12C, when the wrist is held is slight dorsiflexion, the natural relaxed position of the fingers and thumb places the fingers in a comfortable position in which they are partially curved, or flexed, and slightly spread apart, and the thumb partially flexed and externally rotated away from the side of the adjacent index finger, as in FIGS. 12A-12C. Thus, in the preferred embodiment of this invention, as shown in FIGS. 1B, 3B, 4B, 6B, 7B, 18A, 20, 21B, 22A, 22B, 23A, 23B, 23C and 25C, when the upper extremity rests in a relaxed and comfortable fashion, with the forearm in contact with the forearm rest 40, if present, and the palm and adjacent region of the wrist in contact with the palm rest region 8, and the hypothenar region of the hand in contact with the hypothenar rest region 9, the fingers will come to rest in a relaxed and comfortable position in which they are partially curved, or flexed, and slightly spread apart, and the thumb partially flexed and externally rotated away from the side of the adjacent index finger, as in FIGS. 3B, 4B, 6B, 7B, 18A, 20, 21B, 22A, 22B, 23A, 23B, 23C and 25C, the rest position. The fingers will occupy the space partially bounded by the finger region 15 of the upper portion 2, (FIGS. 3A, 3C and 21B), with the tips of the fingers describing a curve 207 (FIG. 12C). Certain keys, designated the home row keys 44, 45, 46, 47 are positioned and spatially oriented (FIGS. 3A, 20, 21A and 27A-27D) along line 1-1 (FIGS. 3A and 3B), such that the tips of the index, long, ring and small fingers naturally make light contact with these keys 44, 45, 46, 47, respectively, when the fingers are naturally relaxed in the rest position (FIGS. 20 and 21B). Further, in this rest position the thumb will be adjacent to the thumb region 10, as in FIGS. 1B, 3B, 4B, 6B and 7B. A certain key, designated the thumb home key 48 or alternatively a thumb cursor controller roller ball 95, or alternatively a thumb cursor controller 96 is positioned and spatially oriented (FIGS. 1A, 4A, 7A, 22A, 22B, 23A, 23B and 23C) such that, with the thumb in the rest position, the tip of the thumb naturally make light contact with the thumb home key 48 or alternatively a thumb cursor controller roller ball 95, or alternatively a thumb cursor controller 96, as in FIGS. 4B, 7B, 22A, 22B, 23A, 23B and 23C.

Biomechanics of Finger Movements Including Flexion/Extension and Lateral Movement:

Considerations pertaining to natural, comfortable and ergonomic motions of the fingers and thumb are fundamental to the design of this keyboard and the placement of keys thereon. The fundamental design constraint of this invention, namely that the wrist and palm are positioned and maintained stationary and at rest on the palm rest 8, necessitates that natural, comfortable and ergonomically appropriate key actuation by any finger may be accomplished only with motions of the MCP 53, PIP 54 and DIP 55 joints (FIG. 25A) and by the thumb primarily with motions of the MCP 13 and interphalangeal joint 14 (FIG. 12A).

Figure 24A:
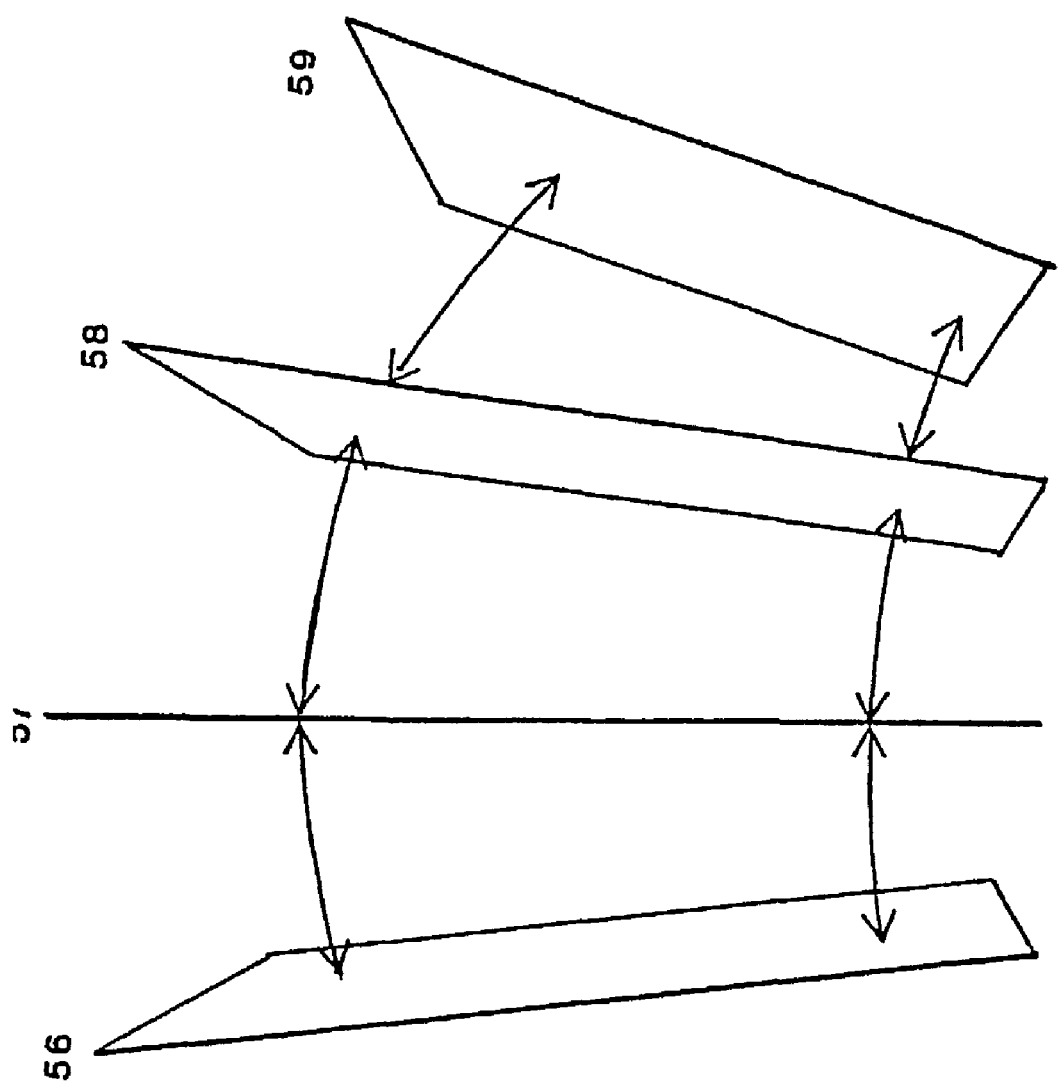
FIG. 24A is a simplified perspective drawing showing the planes of flexion-extension motion 56, 57, 58 and 59 for the four fingers of the right hand, and indicating the non-parallel relationship among these planes.

Considering now the fingers, a review of the functional anatomy of the MCP joints 53 indicates that there is a natural ergonomically appropriate plane of motion of this joint, namely flexion and extension; similar considerations apply to the PIP 54 and DIP 55 joints. The motion of the finger as it sweeps from full flexion of all three joints to full extension of those joints as in FIG. 25A, defines the plane of motion for that finger, namely for the index finger 56, for the long finger 57, for the ring finger 58, and for the small finger 59. According to this invention the keys which can be comfortably and easily actuated by any single finger are thus those whose stroking surfaces more or less intersect the plane of motion that finger, as in FIGS. 25B and 25C. The relative three dimensional spatial orientation of these planes is shown in FIG. 24A. I define the keys actuated by a finger in its plane of motion as a key array. The centerline for each key array represent the longitudinal midline along and about which the various keys may be placed. As shown partially in FIG. 3A and schematically in FIGS. 29A, 29B, 30A and 30B, the centerlines for the key arrays and the corresponding key array designations are along the cross-sectional arrows, which for the index finger are lines 21A-21A, labeled as array 60; for the long finger are lines 27B-27B, labeled as array 61; for the ring finger are lines 27C-27C, labeled as array 62; and for the small finger are lines 27D-27D, labeled as array 63.

Figure 25A:
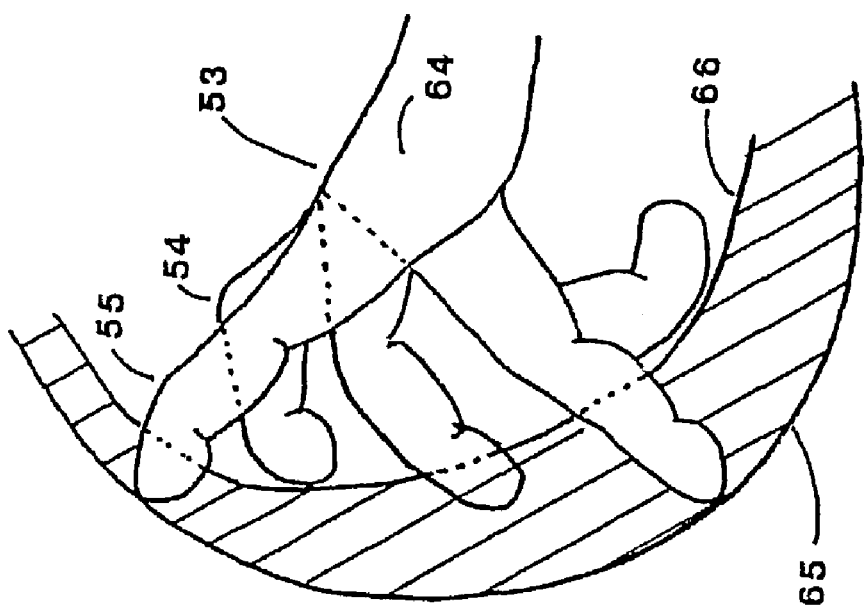
FIG. 25A is a simplified anatomic illustration of a lateral view of a representative finger in various potential positions in its range of flexion-extension motion, around axis 64, indicating theoretical minimum 66 and maximum 65 reach of the finger.
Figure 25B:
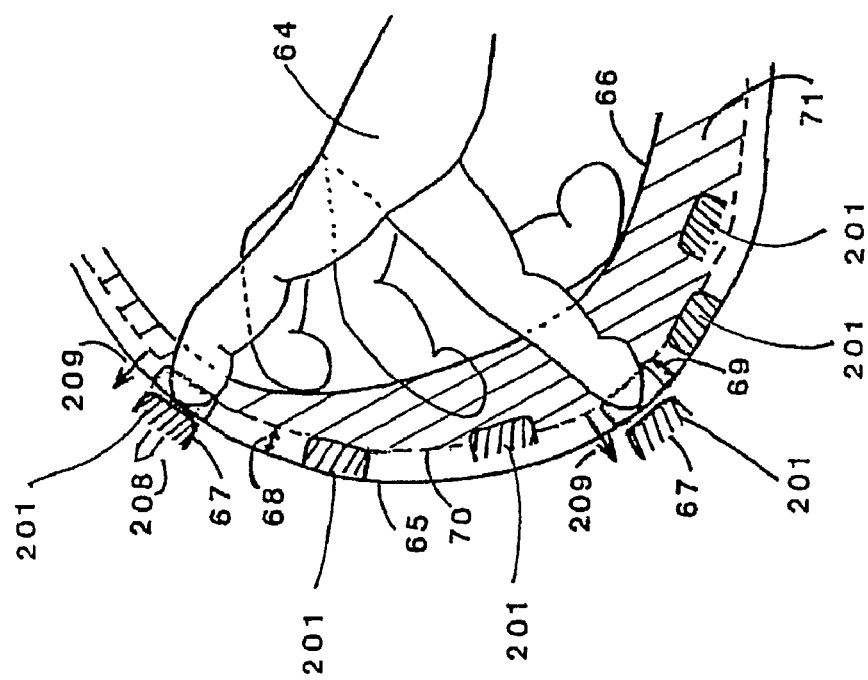
FIG. 25B is a simplified anatomic illustration of a lateral view of a representative finger in various potential positions in its range of flexion-extension motion around axis 64, illustrating the relevance of key displacement 69 during key actuation in determining the potential locations for key surfaces.

Defining the Placement of Key Surfaces in the Key Array for Each Finger:

Referring now to FIGS. 25A and 25B, when the upper extremity rests in a relaxed and comfortable fashion, with the forearm in contact with the forearm rest 40, if present, and the palm and adjacent region of the wrist immobile and in contact with the palm rest region 8, the tip of the finger will describe an arc as the MCP 53, PIP 54 and DIP 55 joints move from maximum extension to maximum flexion. The center 64 of that arc is located at the MCP joint 53. Multiple arcs can be described, depending upon the degree of flexion and/or extension of the corresponding PIP 54 and DIP 55 joints. Two extreme arcs can be identified: one arc 65, with the PIP and DIP joints maximally extended, defining the maximum reach of that finger, and a second arc 66, with the PIP and DIP joints maximally flexed, defining a minimum reach of the finger. The former arc 65 defines the maximum extent to which any key 201, placed within the arc of motion of the finger, could be depressed 67 by that finger while the wrist and palm are stationary. Thus the practical location for the stroking surface of such keys 201 will, of necessity, be closer to the center 64 of the MCP joint 53 than that maximum arc 65, and indeed closer at least by a distance equal to the distance 68 that the key 201 moves 69 when the key is maximally depressed 67 during key actuation. That closer location defines the maximal appropriate distance 70 for any key surface from the center 64 of the MCP joint 53, as in FIG. 25B.

Referring to FIG. 25B, the stroking surface of a key 201 can be located closer to the center 64 of the MCP joint 53 than that maximal distance 70, thereby reducing the stretch or reach required for the finger to actuate the key. There is, however, a minimal required distance 66 from key stroking surface to the center 64 of the MCP joint 53, namely the minimal arc of finger tip motion, as defined above. If the keystroking surface is closer than that distance 66, the fingertip (or the back surface of the flexed finger) will strike the key inadvertently when moving through its arc of motion to actuate other keys. Thus, these considerations define a potential space 71 (i.e., between the minimal 66 and maximal 70 key stroking surface positions) within the plane of motion of each finger 56, 57, 58, 59 where the stroking surfaces of the keys may appropriately be placed according to the principles of this invention for finger actuation without motion of the wrist or adjacent palm.

Because the length and anatomy structure of each finger of a hand is different, the unique appropriate potential space 71 for key stroking surface placement, as determined by empirical measurement, is uniquely different for each finger; the unique potential space for each finger, according the principles of this invention are shown to scale in FIGS. 26A, 26B, 26C and 26D.

Finger-key Interaction and the Effects of Finger Flexion/Extension on Key Surface Orientation and Key Motion:

In a standard conventional keyboard, all key stroking surfaces more or less intersect a single plane (or slightly curved surface,) and the direction of motion 208 of the key stroking surface when the key is actuated is essentially the same for all keys, i.e. generally perpendicular to the plane of the keyboard surface. Although the direction of motion for any key should be perpendicular to its stroking surface, thoughtful consideration reveals that this direction of motion 208 need not be uniform for all keys. Rather, it will depend upon the orientation of each keystroking surface and that orientation will in turn depend upon the easiest and ergonomically most appropriate direction of motion for each digit when in contact with each key surface. According to the principles of this invention the key stroking surfaces for the keys actuated by any finger should more or less intersect the partial plane surface defined by the potential space 71 for that finger, as described above. This invention discloses an arrangement of keys (as shown by way of example for the long finger 50 in FIG. 25C) in which certain keys 73 actuated by a finger when the finger joints are near maximal flexion will have their stroking surfaces oriented so that further flexion provides the appropriate force vector 209 for key actuation, producing co-linear key motion along vector 208 which is perpendicular to the stroking surface. In contrast, those keys 74 actuated with the finger joints in near maximal extension will have their surfaces oriented so that further extension of the PIP 54 and DIP 55 joints provides the appropriate force vector 209 for key actuation, producing co-linear key motion along vector 208 which is perpendicular to the stroking surface of said key 74. With the MCP joint 53 positioned in an intermediate degree of flexion, the force vector 209 for key actuation are oriented in a direction somewhat intermediate between the vectors utilized for actuation of keys 73 and keys 74, and the keys 75 actuated thereby have their stroking surfaces oriented such that motion 208 produced by finger pressure is co-linear with its corresponding force vector 209 and perpendicular to said key stroking surface. The resulting arrangement for any finger provides for key stroking surfaces which are oriented in a unique pattern, namely one which describes a curve or spiral pattern, as shown by way of example for the index finger 50 in FIG. 25C. In this invention a unique key arrangement may thus be defined for the key array for each finger.

Figure 25C:
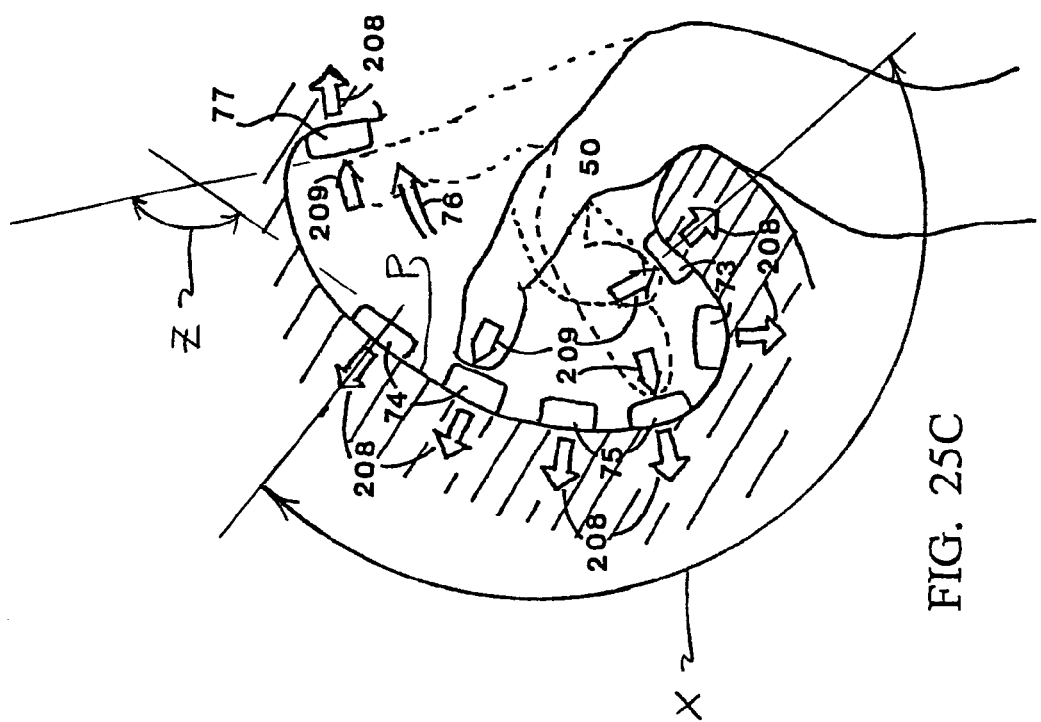
FIG. 25C is a simplified anatomic illustration of a lateral view of the long finger 50 in various potential positions in its range of flexion-extension motion with partial transverse section through the corresponding key array 61, illustrating an embodiment for location and surface orientation for each key, and showing digit motion utilized for actuation of each key.
Figure 26A:
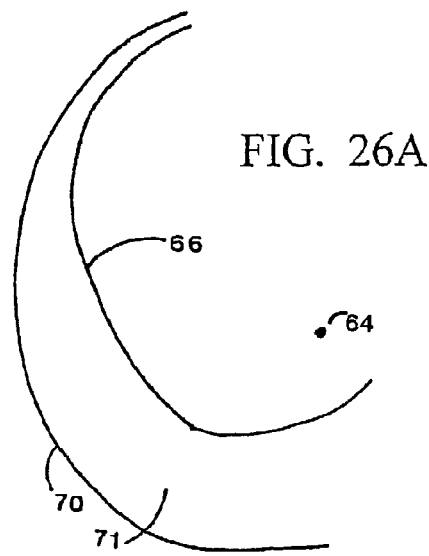
FIGS. 26A-D illustrate the restricted range of positions, in the plane of flexion-extension motion for a finger, where keys for actuation by that finger may be located in any of the various embodiments of this invention; shown to scale; index finger, FIG. 26A; long finger, FIG. 26B; ring finger FIG. 26C; and small finger, FIG. 26D.
Figure 26B:
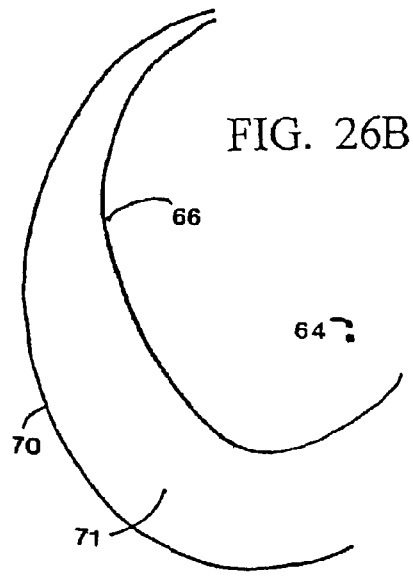
Figure 26C:
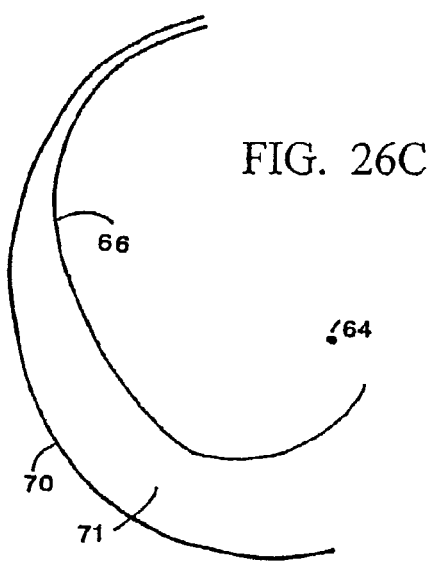
Figure 26D:
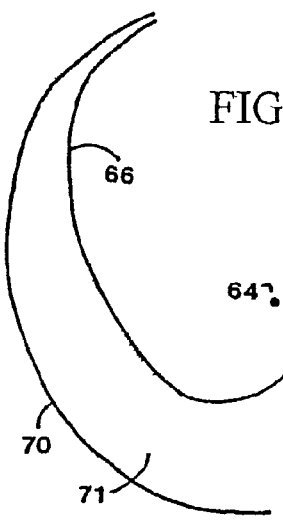

As illustrated in FIG. 25C, the keys 73, 74, 75 are positioned along an arc X and at least two keys 73, 74 (upper key of pair) are positioned along the arc and separated from each other by an angle of at least 135 degrees. The arc X is bounded by angle lines extending through the keys 73, 74 and perpendicular to the key support surface P. Additionally, the key 74 (upper key of pair) is positioned to be activated by a front or top surface of a finger while key 77 is positioned to be activated by the back surface of that finger when the hand is grasping the keyboard. The top surface of these keys form an angle Z less than 135 degrees.

Further consideration of FIGS. 25A-C reveals that, when the upper extremity rests in a relaxed and comfortable fashion, with the forearm in contact with the forearm rest 40, if present, and the palm and adjacent region of the wrist immobile in contact with the palm rest region 8, and when the PIP 54 and DIP 55 joints are at the extreme of extension, and the MCP joint 53 at near full extension, key actuation can occur only by further extension of the MCP joint 53 to finger position 76. However this position 76 would bring the back or nail surface of the finger, rather than the soft portion of the finger at its tip, in contact with the key surface. This invention discloses an embodiment in which an additional key 77 is provided in one or more of the finger keys arrays 60, 61, 62, 63 and other finger arrays 103, 107 (FIGS. 28D, 28F), described below, said key or keys 77 being actuated by contact of the nail or back surface of the digit against the key surface by utilizing extension of all three joints 53, 54, 55 of any finger, as in FIGS. 25C and 27A-D.

Figures 28A, 28B, 28C, 28D, 28E:
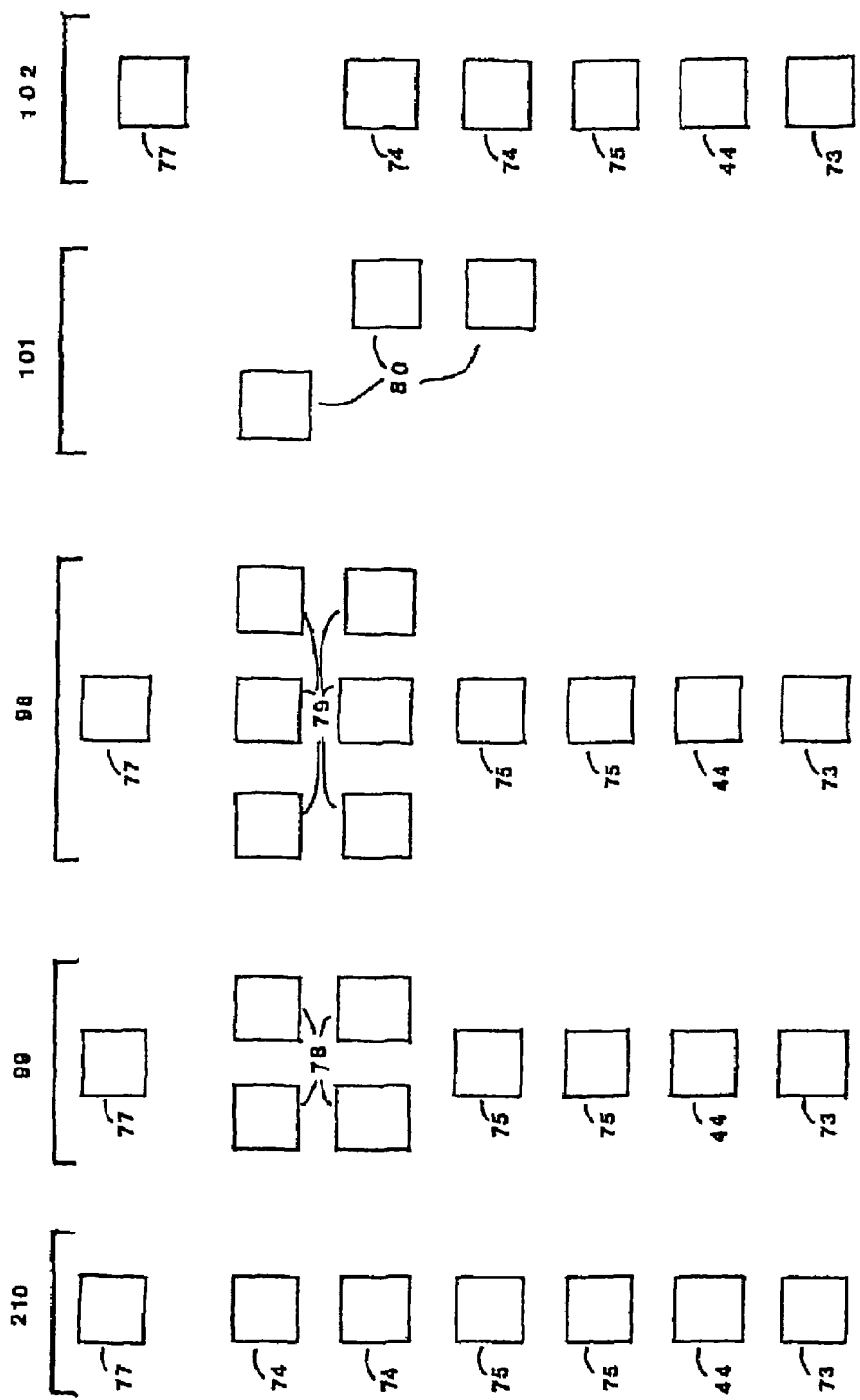
FIG. 28A is a conceptualized en face view or map of an embodiment for key arrangement 210 in index key array 60 and/or long finger key array 61, as shown also in FIGS. 3A, 21A, 27A and 27B.
FIG. 28B is a conceptualized en face view or map of an alternative embodiment for key arrangement 99 in index key array 60 and/or long finger key array 61, showing substitution of paired keys 78 for certain keys 74 shown in FIG. 28A.
FIG. 28C is a conceptualized en face view or map of an alternative embodiment for key arrangement 98 in index key array 60 and/or long finger key array 61, showing substitution of triplet keys 79 for certain keys 74 shown in FIG. 28A.
FIG. 28D is a conceptualized en face view or map of an embodiment for key arrangement 101 in key array 82 situated lateral to the index finger key array 60.
FIG. 28E is a conceptualized en face view or map of an embodiment for key arrangement 102 in ring finger key array 62 and/or small finger key array 63, as shown also in FIGS. 3A, 21A, 27C and 27D.

Based upon these principles, this invention discloses embodiments for the number, size, spacing, and orientation of the keys ("key arrangements") in the finger key arrays 60, 61, 62, 63, respectively, for the index, long, ring and small fingers, including designation of the respective home keys 44, 45, 46, 47 for each finger, as shown in FIGS. 27A, 27B, 27C and 27D, respectively, shown to scale. A schematic representation or map of the corresponding key arrangement 210 for the index and long finger key arrays shown in FIGS. 27A and 27B, respectively, are shown in FIG. 28A. Schematic representations of the corresponding key arrangements 102 for the ring and small finger key arrays shown in FIGS. 27C and 27D, respectively, are shown in FIG. 28E.

Figure 24B:
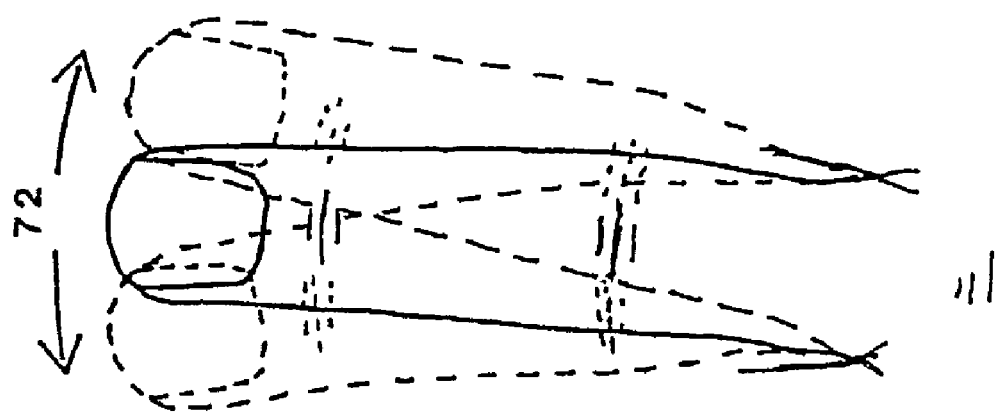
FIG. 24B is a simplified anatomic illustration of the long finger, showing the range of lateral motion 72 with MCP, PIP and DIP joints extended.
Figures 28F, 28G, 28H, 28I, 28J, 28K:
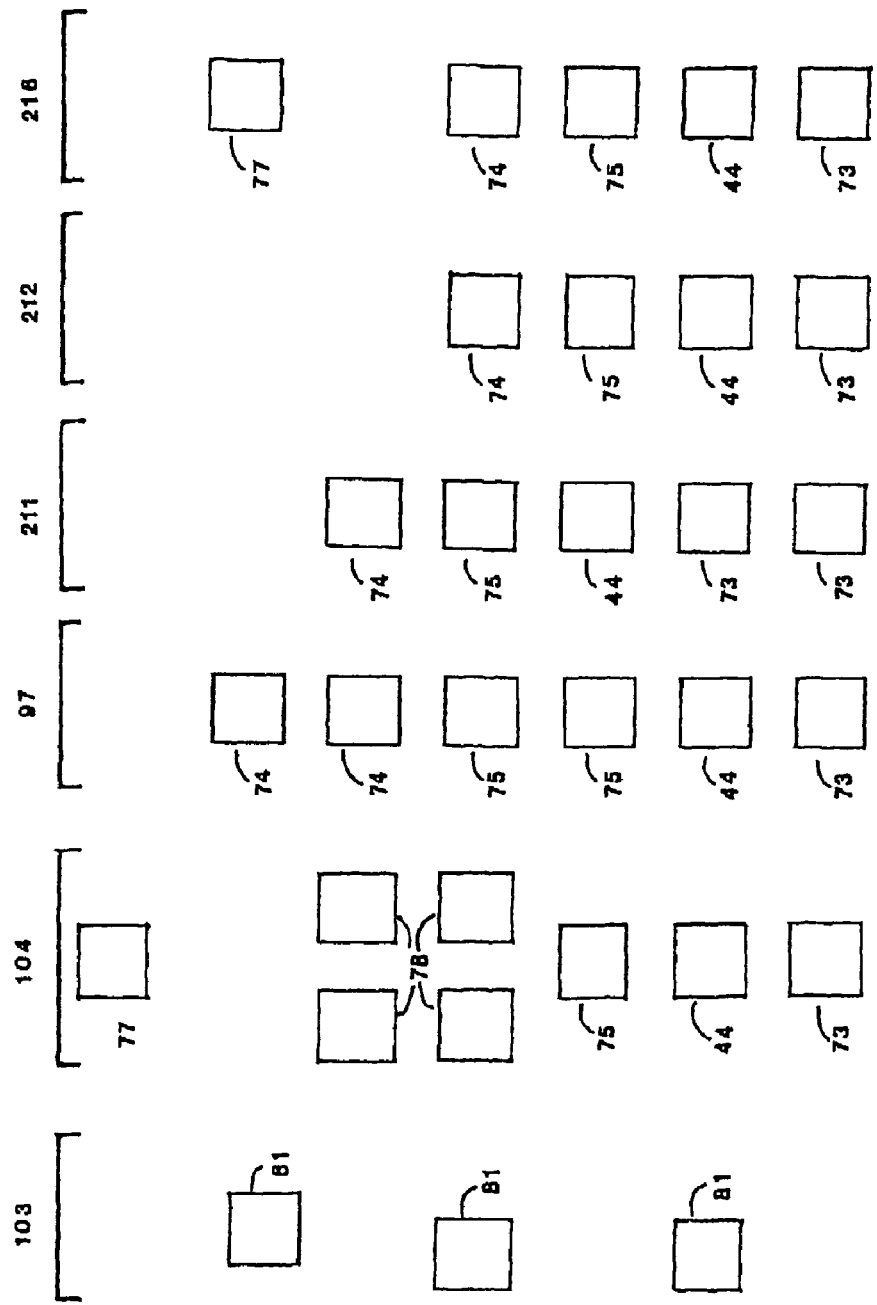
FIG. 28F is a conceptualized en face view or map of an embodiment for key arrangement 103 in key array 83 situated lateral to the small finger key array 63.
FIG. 28G is a conceptualized en face view or map of an alternative embodiment for key arrangement 104 in ring finger key array 62 and/or small finger key array 63, showing substitution of paired keys 78 for certain keys 74, 75 shown in FIG. 28I.
FIG. 28H is a conceptualized en face view or map of an alternative embodiment for key arrangement 97 in the index key array 60 and/or long finger key array 61, with key 77, shown in FIG. 28A, deleted.
FIG. 28I is a conceptualized en face view or map of an alternative embodiment for key arrangement 211 in index key array 60, long finger key array 61, ring finger key array 62 and/or small finger key array 63.
FIG. 28J is a conceptualized en face view or map of an alternative embodiment for key arrangement 212 in index key array 60, long finger key array 61, ring finger key array 62 and/or small finger key array 63.
FIG. 28K is a conceptualized en face view or map of an alternative embodiment for key arrangement 216 in index key array 60, long finger key array 61, ring finger key array 62 and/or small finger key array 63.

Further consideration of the anatomy of the fingers reveals that there is essentially no lateral motion possible at the PIP 54 and DIP 55 joints; similarly when the MCP joint 53 is flexed there is not lateral mobility possible at that joint. When the MCP joint 53 is at least partially extended, however, certain joint ligaments and connective tissues become lax, and that joint can achieve a limited degree of lateral or side to side mobility 72 as in FIG. 24B. Although the above embodiments disclosed in this invention utilize key arrangements 210, 102, for the arrays 60, 61, 62, 63 in which the stroking surfaces of the keys in any key arrangement intersect a region 71 of a single plane or curved surface (as in FIGS. 26A-D), there is indeed sufficient lateral finger mobility 72 that either of two keys 74 arrayed side by side in the upper area of finger extension can be comfortably selected by the finger without undue effort or strain. In an alternative embodiment of the key arrays of this invention I disclose key arrangements in which one or more of the keys in the upper region of each vertical key array is replaced with a pair 78 (or pairs) or triplet 79 (or triplets) of keys, whose stroking surfaces are arranged more or less perpendicular to the plane 71 of finger flexion/extension motion, said arrangements being 99 (FIG. 28B), 98 (FIG. 28C), 104 (FIG. 28G). Additional combinations and permutations of these single, paired 78 and triplet 79 key arrangements and of different key numbers in any key array for each finger are also possible. Examples of such alternative embodiments are shown by way of example as key arrays 97 (FIG. 28H), 211 (FIG. 28I), 212 (FIG. 28J), 216 (FIG. 28K) but do not exclude other possible embodiments. All possible orientations for key stroking surfaces for every key utilized in every key arrangement which are consistent with the principles of this invention are also disclosed.

Further consideration indicates that although some lateral motion of the long and ring fingers is possible, a greater degree of lateral movement of the index finger may be achieved as it moves away from the adjacent long finger, and similarly a greater degree of lateral movement of the small finger may be achieved as it moves away from the adjacent ring finger, when the respective MCP joints 13 are at least partially extended. Thus, in additional embodiments of this invention as in FIGS. 29A, 29B, 30A and 30B, I disclose arrangements in which an additional full or partial array 82 of keys 80 is provided lateral to the index finger, and an additional full or partial array 83 of keys 81 is provided lateral to the small finger. Within the constraints of physiology and ergonomics described herein, the keys are placed three-dimensionally according to the same guidelines and constraints enunciated above for the arrangements for the finger key arrays 60, 61, 62 and 63. The arrangement 101 for the keys 80 for the key array 82 for the index finger is shown in FIG. 28D in a conceptualized view or map, with the disclosure of additional arrangements not illustrated, including substitution of pairs or triplets of keys for one or more individual keys 80. The arrangement 103 for the keys 81 for the key array 83 for the small finger is shown in FIG. 28F, with the disclosure of additional arrangements not illustrated, including substitution of pairs or triplets of keys for one or more individual keys 81.

In sum, then, the finger region 15 of the upper portion 2 contains arrays of keys 60, 61, 62, 63. In various embodiments, for either or both the index and short finger there may be an additional array of keys 82, 83, respectively, each oriented lateral to that finger. In various embodiments, one or more key array may be provided with a top key 77 which is actuated by the nail or back surface of the finger, or alternatively without this arrangement for the topmost key. In various embodiments each array may contain only a single row of keys or, toward the upper portion, pairs or triplets of keys situated more or less side by side as may be appropriate. The total number of keys in any array may range from 1 to 13. Two embodiments of these arrangements are shown, for the right keyboard half 110, in FIGS. 29A and 30A, and for the left keyboard half 200 in FIGS. 29B and 30B. This invention discloses multiple embodiments for key arrangements according to the principles of this invention, and encompasses all of the possible combinations and permutations of key arrangements that may be derived, according to the principles of this invention, by varying the number of keys in any key array from one to thirteen, and including or deleting one or more keys 77 and substituting paired or triplet keys for one or more of certain single keys actuated in the upper range of finger extension, and with or without key array 82, and with or without key array 83, and with various positioning of the keys and orientations for the stroking surface of each key.

Variable Key Spacing and Key Sizes:

Referring now to FIGS. 27A, 27B, 27C and 27D, comparison of the arrays 60, 61, 62, 63, which represent index, long, ring and small fingers, respectively, will reveal important differences. The length of each finger is different, so the arc which defines the surfaces of the keys in the array for each finger will differ. Specifically, the arc 85 for the long finger, which is the longest finger, is largest arc, whereas the arc 87 for the small finger, which is the smallest finger, is the smallest arc, and the arcs 84, 86 for the intermediate length fingers, i.e., for the index and ring fingers, are of intermediate size. My invention discloses such an arrangement.

Furthermore, referring again to FIGS. 27A-27D, for each finger the distance from the center of motion of each MCP joint 64 to the surface of the keys (i.e. the arcs 84, 85, 86, 87) for that finger will be greater for the long finger, less for the index and ring finger, and less so for the small finger. This invention discloses such an arrangement.

Referring again to FIGS. 27A-27D and additionally to FIG. 25C, each key has a top surface. A perpendicular projection from the top surface of at least one key 73 in a finger key array 60, 61, 62, 63 (FIG. 3A) will intersect within the bounds of the arc for that finger key array. In one embodiment of the subject invention, a perpendicular projection from the top surface of at least one key 73 in each finger key array 60, 61, 62, 63 will intersect within the bounds of the arc for that finger key array.

Additionally, referring again to FIGS. 27A, 27B, 27C, 27D, since the various arrays 60, 61, 62, 63 may need to accommodate a similar number of keys, it follows that for the smallest array (i.e., corresponding to the smallest arc) the spacing between keys may be reduced compared to the spacing among keys in intermediate size arrays, which may be smaller than the key spacing in the key array with the largest arc. It also follow that the actual key size may therefore differ, with small keys and small key-to-key distance provided in the smallest arrays, and larger key sizes and key-to-key spacing as the size of the array increases. My invention discloses an arrangement in which the sizes of the keys and the spacing between keys is not necessarily constant, but in various embodiments vary to differing degrees, more or less in proportion to the length of each fingers and the size of the arcs 84, 85, 86, 87 of the key array corresponding to each finger. Similar principles apply to the arrangements for the sizes and spacing for the keys for the key arrays 82, 83, and such all combinations and permutations of such arrangements are disclosed in this invention.

Construction of the Finger Region From the Key Arrays:

Having established that each finger will actuate the keys that lie in a particular plane, one must next establish how these planes, and the key arrays that derive from them, are positioned relative to each other and relative to the palm rest region 8. Examination of the planes 56, 57, 58, 59, as in FIG. 24A, described by the natural motions of each of the four fingers will indicate that these planes of motion are not parallel to each other, but rather are to some degree splayed or angled away from each other. This reflects the anatomic fact that when flexed, the fingers are close together but when full extended they are spread apart. Thus the planes of the key arrays 60, 61, 62, 63, will not be parallel to each other but will naturally be somewhat splayed from each other, as in FIG. 3A.

In the embodiment described above, ergonomic finger motion as herein illustrated (FIGS. 25A-25C) and is planar; similarly the locations of key stroking surfaces 71 according to the principles of this invention, and the corresponding finger arrays 60, 61, 62, 63 are planar. We disclose alternative embodiments in which the stroking surfaces of the keys of one or more key arrays lie within a curved surface 71 which is not planar. All combinations and permutations of such arrangements are also disclosed. Nevertheless, in all of these various alternative embodiments the splayed relationship of the various key arrays is maintained as in FIG. 3A.

Referring now to FIGS. 1B, 3A, 3B, 4B, 7B, 12, 20 and 21B, when the upper extremity rests in a relaxed and comfortable fashion, with the forearm in contact with the forearm rest 40, if present, and the palm and adjacent region of the wrist in contact with the palm rest region 8, the fingers will come to rest in a relaxed and comfortable position in which they are partially curved, or flexed, and slightly spread apart as in FIGS. 3B, 4B, 7B, 12A, 12B, 12C, 20 and 21B. In this position the tips of the four fingers will not form a straight line but will rather form a staggered arrangement, with the tip of the long finger 50 extending further than the index 49 and ring 51 fingers, which in turn extend further than the tip of the small finger 52, as in FIG. 20. In this arrangement then a fundamental feature is that the surfaces of the corresponding home row keys 44, 45, 46, 47, and the key arrays to which they correspond, will be correspondingly elevated or depressed relative to each other to permit the fingers to achieve the described relaxed position. This arrangement provides easy tactile recognition of the appropriate location of the fingers on their home keys with regard to side to side positioning, since only one hand position will permit the fingers to rest with the long finger on the deepest key 45 and small finger on the most elevated key 52.

When the upper extremity is positioned as described above, the tips of the four fingers 49, 50, 51, 52 will not line on a straight line when the fingers are viewed down the length of the distal phalanx (finger bone) of each finger as FIG. 12C. Rather the location of the tips of the four fingers will describe a curve 207 with the long finger extending furthest, the index and ring fingers less far, and the small finger the shortest distance from the wrist as in FIG. 12C. This invention discloses an arrangement in which the surfaces of the corresponding home row keys 44, 45, 46 and 47, and the key arrays to which they correspond, are appropriately located in positions along line 27D-27D (FIG. 3A) which correspond to these locations of the finger tips at rest.

The resulting arrangement of key arrays in my invention creates a three-dimensional surface contour of the key region in which each key is actuated by a specific finger, and in which the position and orientation of each key permits optimum comfort and efficiency within ergonomic constraints defined herein. In essence, the keys are positioned where the fingers naturally rest or where the fingers may reach for key actuation with natural, easy, ergonomic motions.

E. Thumb Region

Ergonomic Motions of the Thumb:

Referring now to FIGS. 1B, 3B, 4B, 7B, 12A, 12B, 12C, 22A, 22B, 23A, 23B and 23C, a natural rest position for the thumb may be described in which the upper extremity rests in a relaxed and comfortable fashion, with the forearm in contact with the forearm rest 41, if present, and the palm and adjacent region of the wrist in contact with the palm rest region 8, such that the thumb is comfortably relaxed and naturally, partially flexed at the MCP 13 and interphalangeal (IP) 14 joints, and slightly externally rotated 11, as in FIG. 12A. In this rest position the tip of the thumb naturally makes light contact with the thumb home key 48 or alternatively a thumb cursor controller roller ball 95, or alternatively a thumb cursor controller 96, in the thumb region 10 of the upper portion 2, as in FIGS. 4B, 7B, 22A, 22B, 23A, 23B and 23C. In this rest position (FIG. 12A) the thumb is oriented such that with further flexion 12 of the MCP 13 and IP 14 joints of the thumb, and motion of the first metacarpal bone, the tip of the thumb tends to move toward the side of the index finger and thence toward the palm of the hand. Conversely, in extension 88 the thumb moves away from the palm, in a manner similar to extension of the fingers. In addition, the thumb may also move naturally and comfortably toward or away from the index finger in a plane perpendicular to the plane of flexion of the thumb, in motions termed abduction 89 and adduction 90, respectively, as in FIG. 12B. These four motions, namely flexion 12, extension 88, abduction 89 and adduction 90 of the thumb, constitute natural and ergonomically appropriate motion of the thumb, facilitated by the arrangements of joints, ligaments, tendons and muscles of the forearm, hand, palm and thumb and are, according to the principles of this invention, the motions for key actuation by the thumb.

Figure 32C:
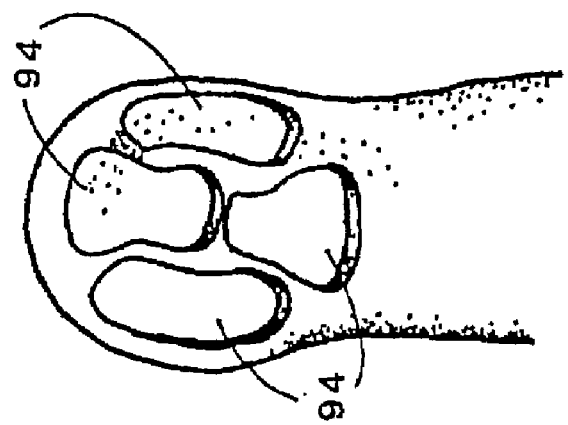
FIGS. 32A, 32B and 32C each show an oblique or en face view of the thumb region 10, with alternative embodiments for shapes, sizes, locations and arrangements for keys and cursor control devices for thumb use.
Figure 32B:
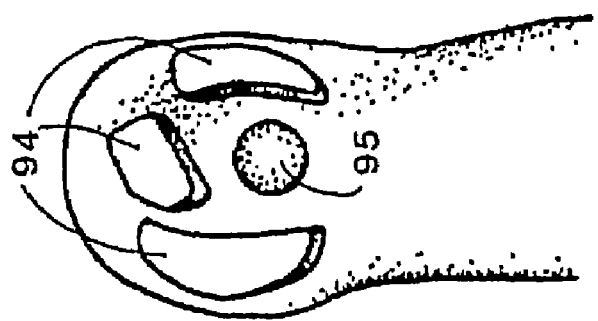
Figure 32A:
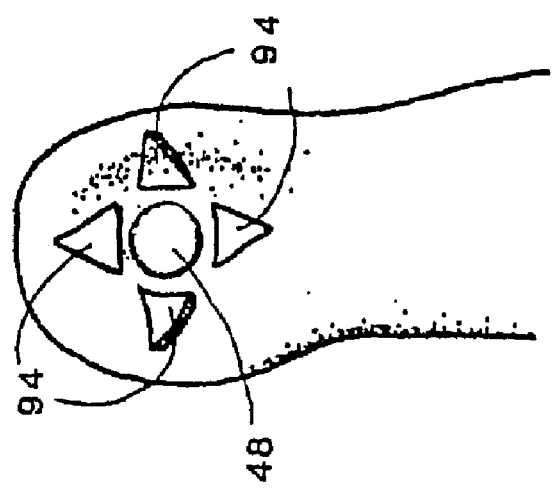

Key Positions Which Correspond to Natural Ergonomic Thumb Motions:

For the purposes of this invention any arrangements of keys disposed upon the thumb region 10 for actuation by the thumb constitutes a thumb key array 215. Referring now to FIGS. 4A, 7A, 22A, 22B, 23A, 23B and 23C, keys 48, 91, 92 are positioned upon the surface of the thumb region 10 to be actuated by natural ergonomic motions of the thumb. The thumb home key 48 is actuated by thumb flexion from its rest position as in FIG. 23B. We disclose in this invention arrangements in which one or more additional keys 91 are positioned on the thumb region 10 to be actuated by varying degrees of natural flexion 12 and extension 88 of the thumb MCP 13 and IP 14 joints from its rest position; motion of the first metacarpal bone may also contribute to these thumb motions. In addition we disclose in this invention arrangements in which one or more additional keys 92 are positioned on the thumb region 10 to be actuated by varying degrees of natural abduction 89 and adduction 90 of the thumb from its rest position, as in FIGS. 23A-23C. In addition we disclose in this invention an arrangement in which a key 93 is positioned for actuation by contact of the nail or back surface of the thumb during extension 88 of the MCP 13 and IP 14 joints, as in FIGS. 22B and 23C. In each case the stroking surface of the key is perpendicular to the force 208 applied by the thumb in its ergonomic motion or motions for key actuation (FIGS. 22A, 22B, 23A, 23B and 23C). In addition we disclose in this invention arrangements (shown by way of example in FIGS. 32A, 32B and 32C) in which one or more keys 94 are positioned on the thumb region 10 for actuation by various combination of MCP 13 and IP 14 flexion and extension with abduction 89 or adduction 90. All combinations and permutations of these thumb key arrangements are included in this disclosure and each constitutes an embodiment of a key arrangement for the thumb key array 215.

Figure 22B:
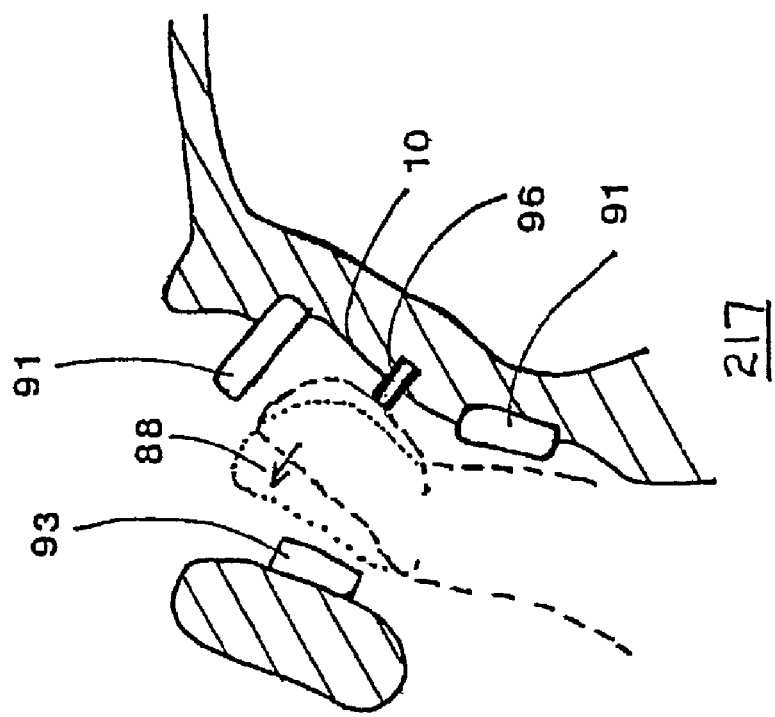
FIG. 22B is an alternative embodiment of the design show in FIG. 22A, showing a portion of the thumb region 10, with user's thumb, shown in phantom outline, appropriately positioned for operation of thumb keys 91, 93 and cursor controller 96, and illustrating an alternative embodiment 217 for the thumb key arrangement.
Figure 22A:
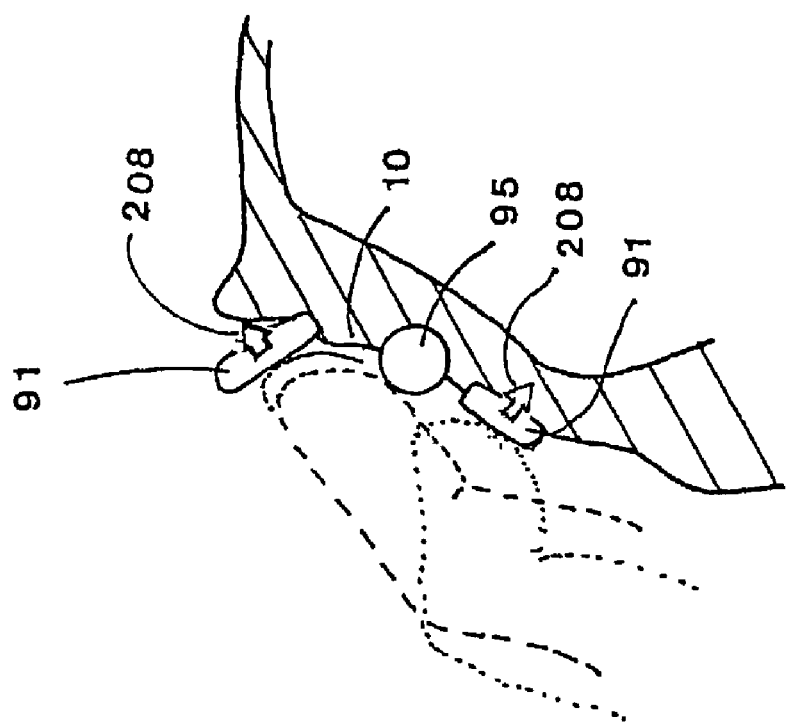
FIG. 22A is a partial section along line 22A-22A as shown in FIG. 7B, showing an embodiment 213 of a portion of the thumb region 10, with the user's thumb, shown in phantom outline, appropriately positioned for operation of thumb keys 91 and cursor controller roller ball 95, the latter located in thumb home key position.
Figure 23A:
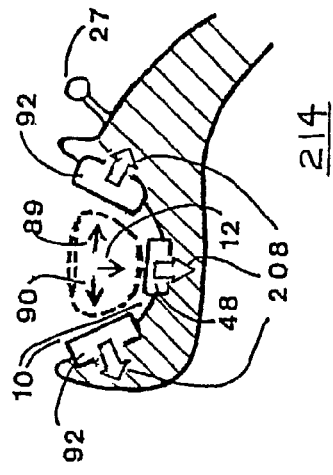
FIG. 23A is a partial section along line 23A-23A as shown in FIG. 7B, showing an embodiment 213 of a portion of the thumb region 10, with user's thumb, shown in phantom outline, appropriately positioned for operation of the keyboard and cursor controller roller ball 95 in thumb home key position.
Figure 23B:
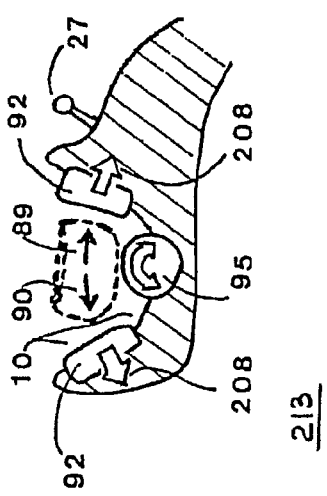
FIG. 23B is an alternative embodiment of the design shown in FIG. 23A, showing an alternative embodiment 214 of a portion of the thumb region 10, with user's thumb, shown in phantom outline, appropriately positioned for operation of the keyboard and with a key 48 in the thumb home key position.
Figure 23C:
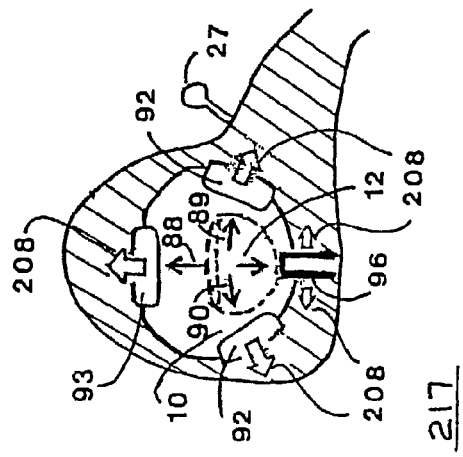
FIG. 23C is an alternative embodiment of the design shown in FIG. 23A, showing an alternative embodiment 217 of a portion of the thumb region 10, with the user's thumb, shown in phantom outline, appropriately positioned for operation of the keyboard, and showing a supporting structure 115 and key 93 for actuation by thumb extension 88 and a cursor controller pointer 96 in the thumb home key position, as shown in another view in FIG. 22B.
Figure 29A:
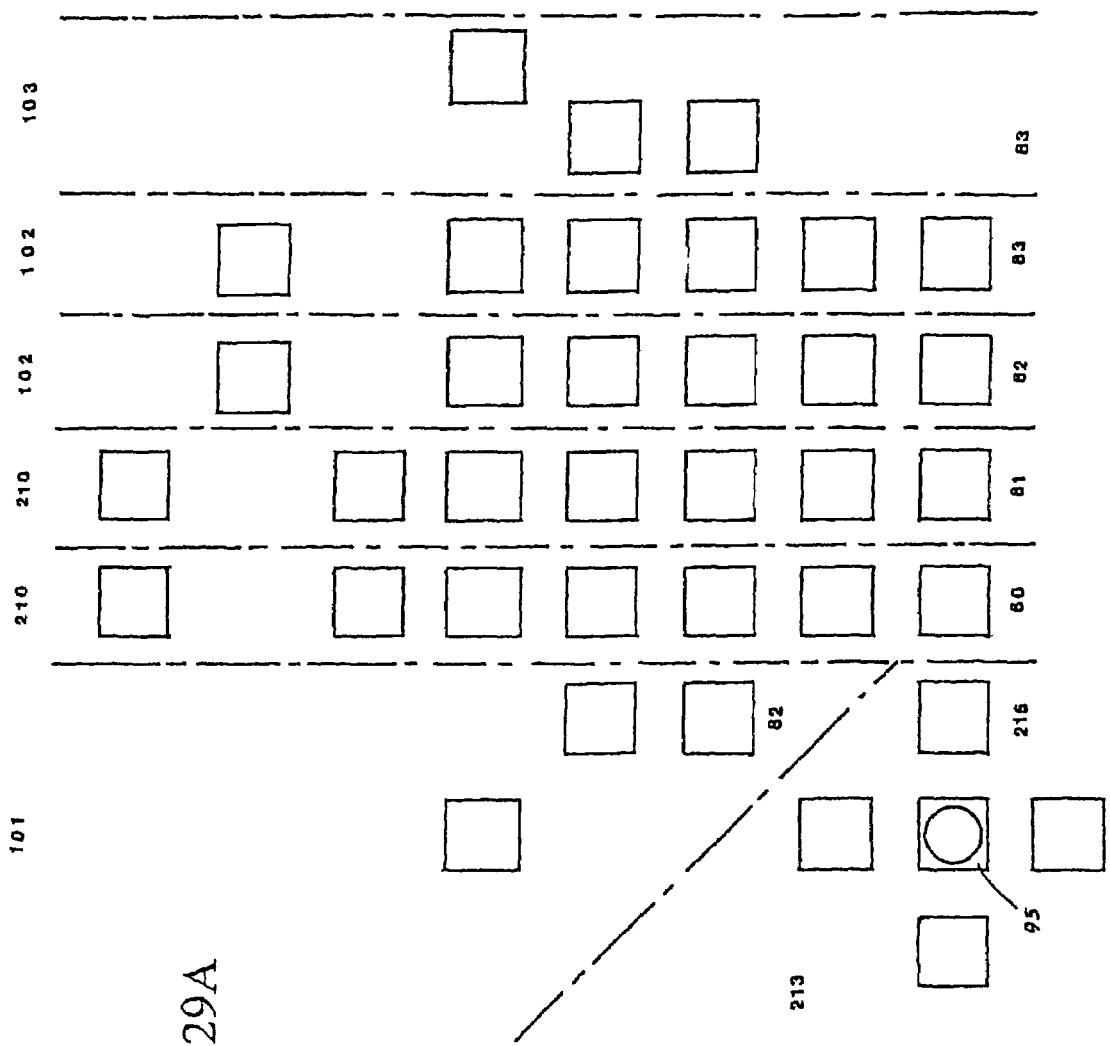
FIG. 29A is a schematic diagram or map showing an embodiment 304 for the selection and arrangement of key arrays and cursor control devices in the right keyboard half 100. Numbers across the top reference the specific key arrangement embodiment of the keys below; numbers below each set of keys designate the corresponding key array.
Figure 29B:
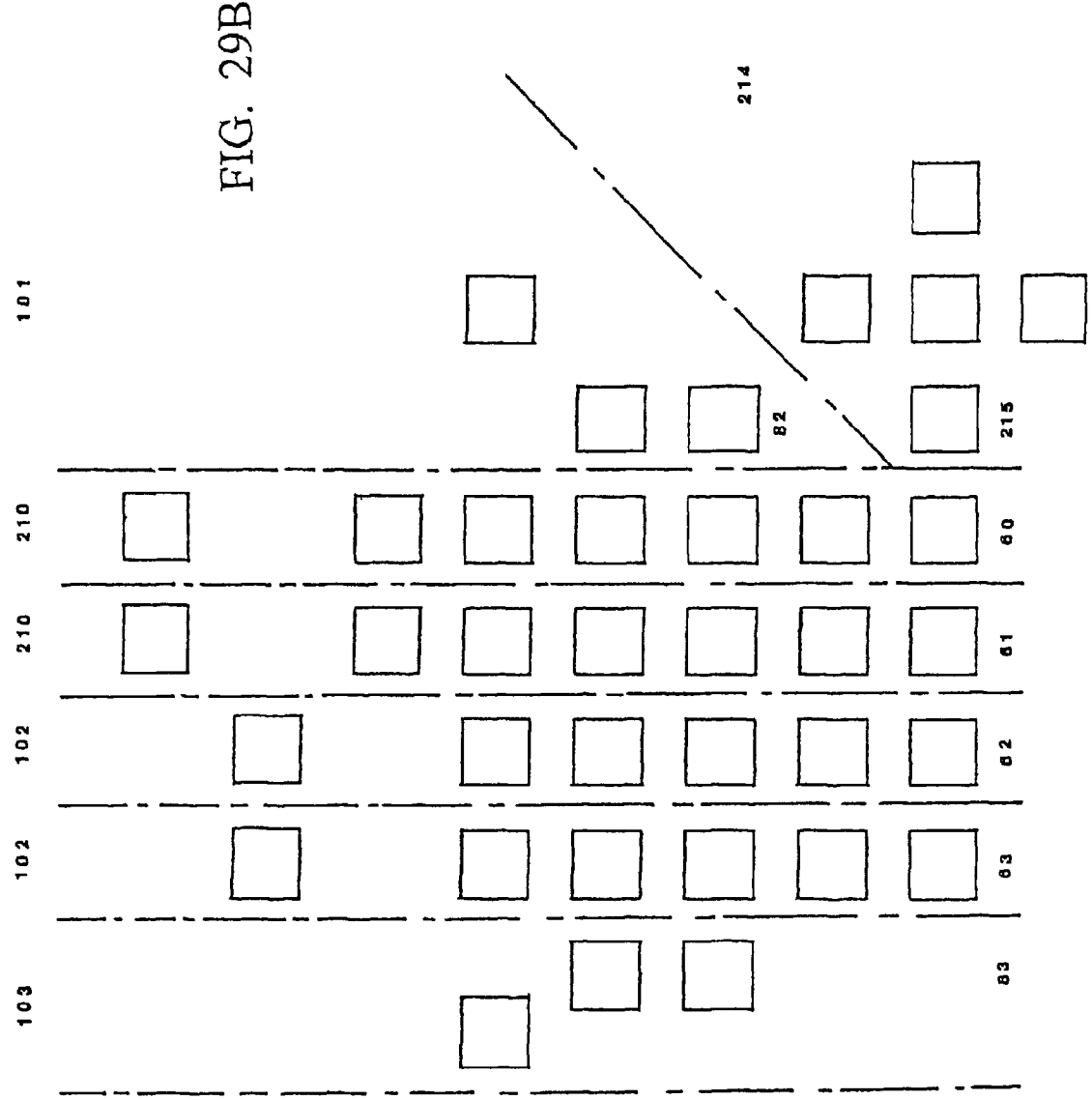
FIG. 29B is a schematic diagram or map showing an embodiment 305 for the selection and arrangement of key arrays and cursor control devices in the left keyboard half 200. Numbers across the top reference the specific key arrangement embodiment of the keys below; numbers below each set of keys designate the corresponding key array.
Figure 30A:
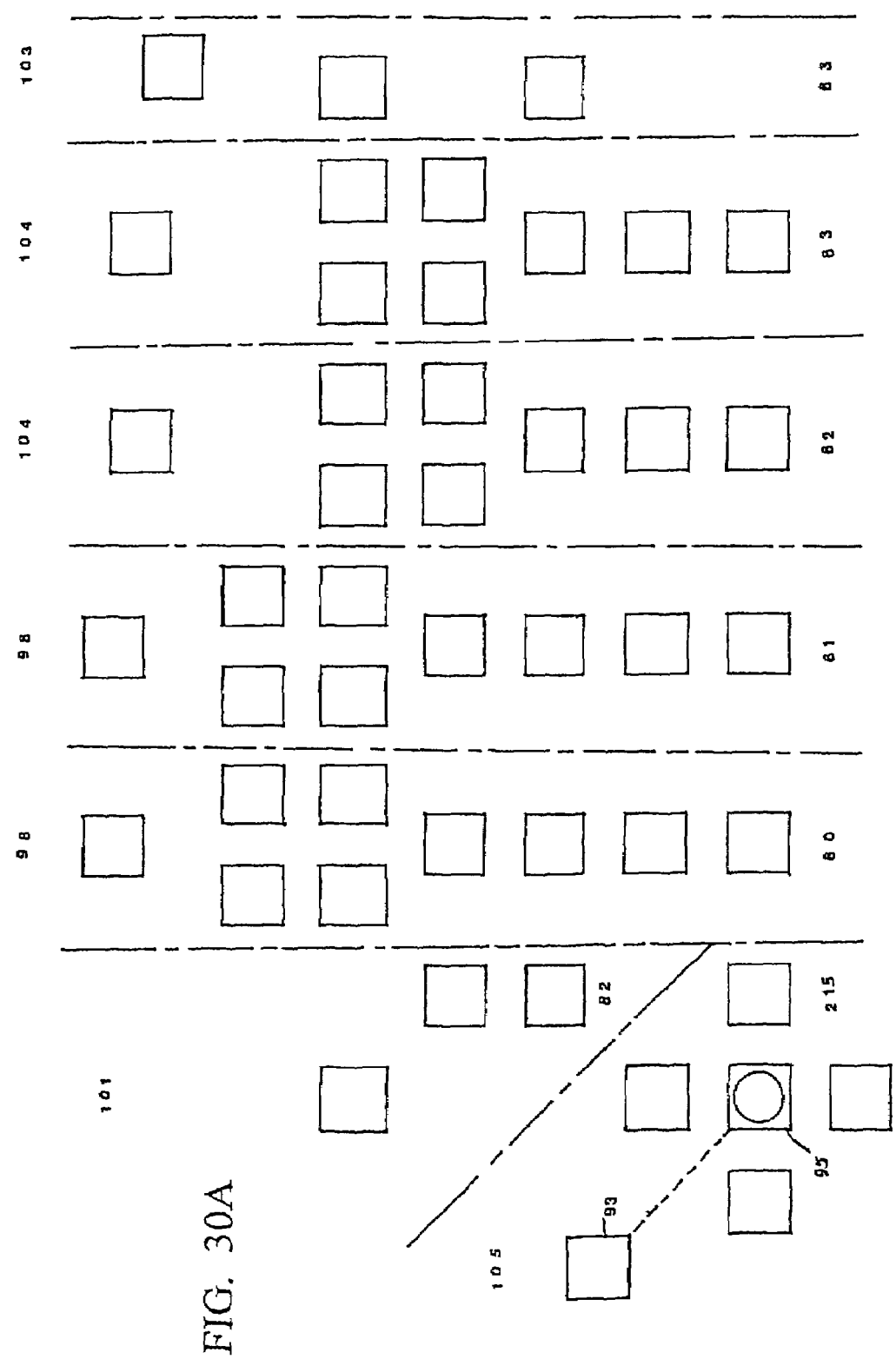
FIG. 30A is a schematic diagram or map showing an alternative embodiment 308 for the selection and arrangement of key arrays and cursor control devices in the right keyboard half 100. Numbers across the top reference the specific key arrangement embodiment of the keys below; numbers below each set of keys designate the corresponding key array.
Figure 30C:
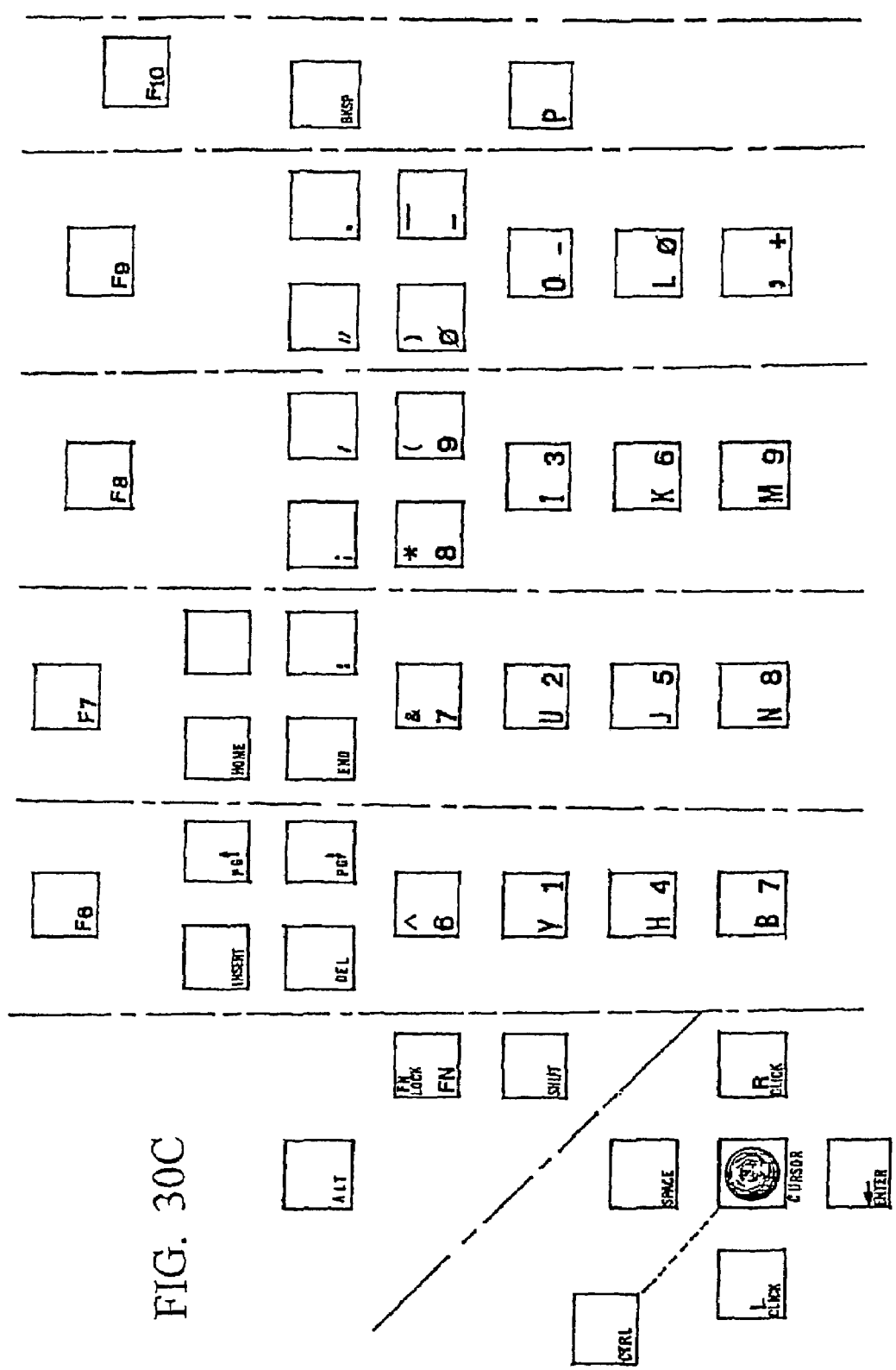
FIG. 30C is a schematic diagram or map showing an alternative embodiment 310 for assignment of alphanumeric, punctuation and function operations to individual keys of the right keyboard half 100 according to the embodiment disclosed in FIG. 30A.
Figure 30D:
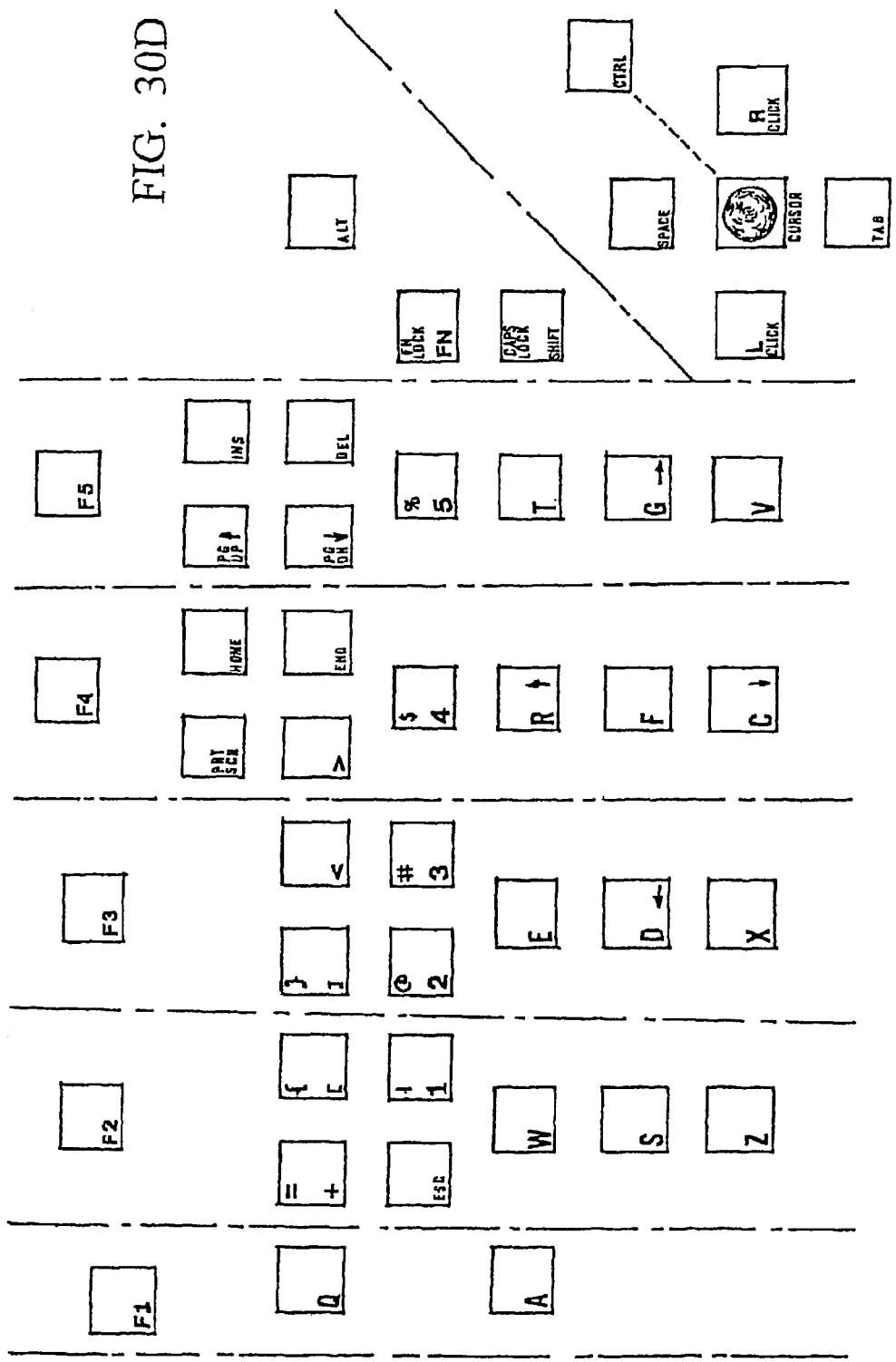
FIG. 30D is a schematic diagram or map showing an alternative embodiment 311 for assignment of alphanumeric, punctuation and function operations to individual keys of the left keyboard half 200 according to the embodiment disclosed in FIG. 30B.

An alternative embodiment 214 for such thumb key arrangements for the thumb key array 215 is partially shown in FIGS. 23B. Another alternative embodiment 213 for such thumb key arrangements for the thumb key array 215, in which a roller ball cursor controller 95 is substituted for the thumb home key 48 (see below) is shown in FIGS. 4A, 7A, 22A and 23A. Another embodiment 105 for such thumb key arrangements for the thumb key array 215, in which a key 93 is provided for actuation by thumb extension 88, is shown schematically in FIGS. 30A and 30B. Another embodiment 217 for such thumb key arrangements for the thumb key array 215, in which a cursor controller pointer 96 is substituted for the thumb home key 48 (see below) and a key 93 is provided for actuation by thumb extension 88, is shown in FIGS. 22A and 23A. Various figures show embodiments incorporating arrangements of the thumb keys in the thumb key array 215, but all combinations and permutations of these thumb key arrangements are included in this disclosure. FIG. 29A includes a conceptualized en face view or map of the thumb region with embodiment 213 for the thumb key arrays 215. FIG. 29B includes a conceptualized en face view or map of the thumb region with embodiment 214 for the thumb key arrays 215. FIGS. 30A and 30B include conceptualized en face views or maps of the thumb regions with embodiment 105 for the thumb key arrays F. Incorporation of Cursor Controller into Keyboard Standard Keyboard Arrangements for Cursor Controller:

Standard computers provide for control of the position of the cursor by the use of a mouse, roller ball, light pen or pointer, among others. These devices are either placed adjacent to the keyboard or incorporated as a separate region of the keyboard, although the pointer has been incorporated into the keyboard in the space between keys. In general it may appreciated that to use a mouse, roller ball or light pen the hand, or at least one digit, must be moved from its home position at the keyboard to the mouse, roller ball or light pen, and then returned again to its home position to resume typing.

My invention discloses an arrangement in which the cursor controller, (e.g. roller ball 95 or pointer 96) is incorporated into the keyboard finger or thumb region in one or more of several specific locations which would otherwise be occupied by one or more keys, respectively. In this arrangement the appropriate finger or thumb may move the cursor by minimal, ergonomic motions of the tip of the finger or thumb while that digit is in its natural, relaxed and comfortable position on its respective home key, with the wrist and adjacent palm comfortably at rest on the palm rest region 8. In the embodiments, as described in detail above, a roller ball 95 and/or pointer 96 replaces one or both thumb home keys 48 (FIGS. 4A, 7A, 22A, 22B, 23B and 23C). In alternative embodiments not shown a roller ball 95 and/or pointer 96 is substituted for one or more thumb keys 92, 93, 94, or is substituted for one or more home keys 44, 45, 46, 47. Several embodiments for such cursor controller substitution arrangements for the thumb region 10 are shown in FIGS. 4A, 7A, 22A, 22B, 23A and 23C but all combinations and permutations of these cursor controller arrangements are included in this disclosure.

G. Preferred Embodiments for Key Arrangement:

A multitude of keyboard key and cursor arrangements may be generated from the various combinations of finger key arrangements, thumb key arrangements and cursor controller arrangements according to the principles of this invention, and all such combinations and permutations are disclosed. Several embodiments are shown by way of illustration.

FIG. 29A is a schematic diagram or map showing the embodiment 304 for the selection and schematic arrangement of key arrays and cursor control devices in the right keyboard half 100. Numbers across the top reference the specific key arrangement embodiment of the keys below; numbers below each set of keys designate the corresponding key This embodiment 304 utilizes the thumb key and cursor controller arrangement 213 for the thumb key array 215; the finger key arrangements 210 for both the index 60 and long 61 finger arrays; the finger key arrangements 102 for both the ring 62 and small 63 finger arrays; the finger key arrangements 101 for the lateral key array 82 for the index finger; and the finger key arrangements 103 for the lateral key array 83 for the small finger.

FIG. 29B is a schematic diagram or map showing the embodiment 305 for the selection and arrangement of key arrays without cursor control device in the left keyboard half 200. Numbers across the top reference the specific key arrangement embodiment of the keys below; numbers below each set of keys designate the corresponding key array. This embodiment 305 utilizes the thumb key and cursor controller arrangement 214 for the thumb key array 215; the finger key arrangements 210 for both the index 60 and long 61 finger arrays; the finger key arrangements 102 for both the ring 62 and small 63 finger arrays; the finger key arrangements 101 for the lateral key array 82 for the index finger; and the finger key arrangements 103 for the lateral key array 83 for the small finger.

FIG. 30A is a schematic diagram or map showing an alternative embodiment 308 for the selection and arrangement of key arrays and cursor control devices in the right keyboard half 100. Numbers across the top reference the specific key arrangement embodiment of the keys below; numbers below each set of keys designate the corresponding key array. This embodiment 308 utilizes the thumb key and cursor controller arrangement 105 for the thumb key array 215; the finger key arrangements 98 for both the index 60 and long 61 finger arrays; the finger key arrangements 104 for both the ring 62 and small 63 finger arrays; the finger key arrangements 101 for the lateral key array 82 for the index finger; and the finger key arrangements 103 for the lateral key array 83 for the small finger.

FIG. 30B is a schematic diagram or map showing an alternative embodiment 309 for the selection and arrangement of key arrays and cursor control devices in the left keyboard half 200. Numbers across the top reference the specific key arrangement embodiment of the keys below; numbers below each set of keys designate the corresponding key array. This embodiment 309 utilizes the thumb key and cursor controller arrangement 105 for the thumb key array 215; the finger key arrangements 98 for both the index 60 and long 61 finger arrays; the finger key arrangements 104 for both the ring 62 and small 63 finger arrays; the finger key arrangements 101 for the lateral key array 82 for the index finger; and the finger key arrangements 103 for the lateral key array 83 for the small finger.

H. Preferred Embodiment for the Assignment of Alphanumeric, Punctuation and Function Operations to Individual Keys:

In this invention the finger region 15 contains an arrangement of keys in which the assignment of alphanumeric, punctuation and other functional operations to each key is intended to duplicate, to the extent possible, the sequence and order of such key operations found in a standard "QWERTY" keyboard. Nevertheless certain conventional key locations are not provided in this invention, since those positions are not available because of the constraints on key placement as enumerated above. Additionally the arrangement of keys in the thumb region 11 differs substantially from the key arrangement for thumb actuation on the conventional keyboard. For these reasons other key positions or locations are substituted as is practical and necessary, thereby generating a vast number of possible embodiments for the assignment of alphanumeric, punctuation and function operations to individual keys depending according to the principles of this invention. In part the number of embodiments will depend upon which embodiments for the arrangement of keys and cursor controllers are selected, inasmuch as this will determine the number and arrangement of keys in each key array.

Figure 31:
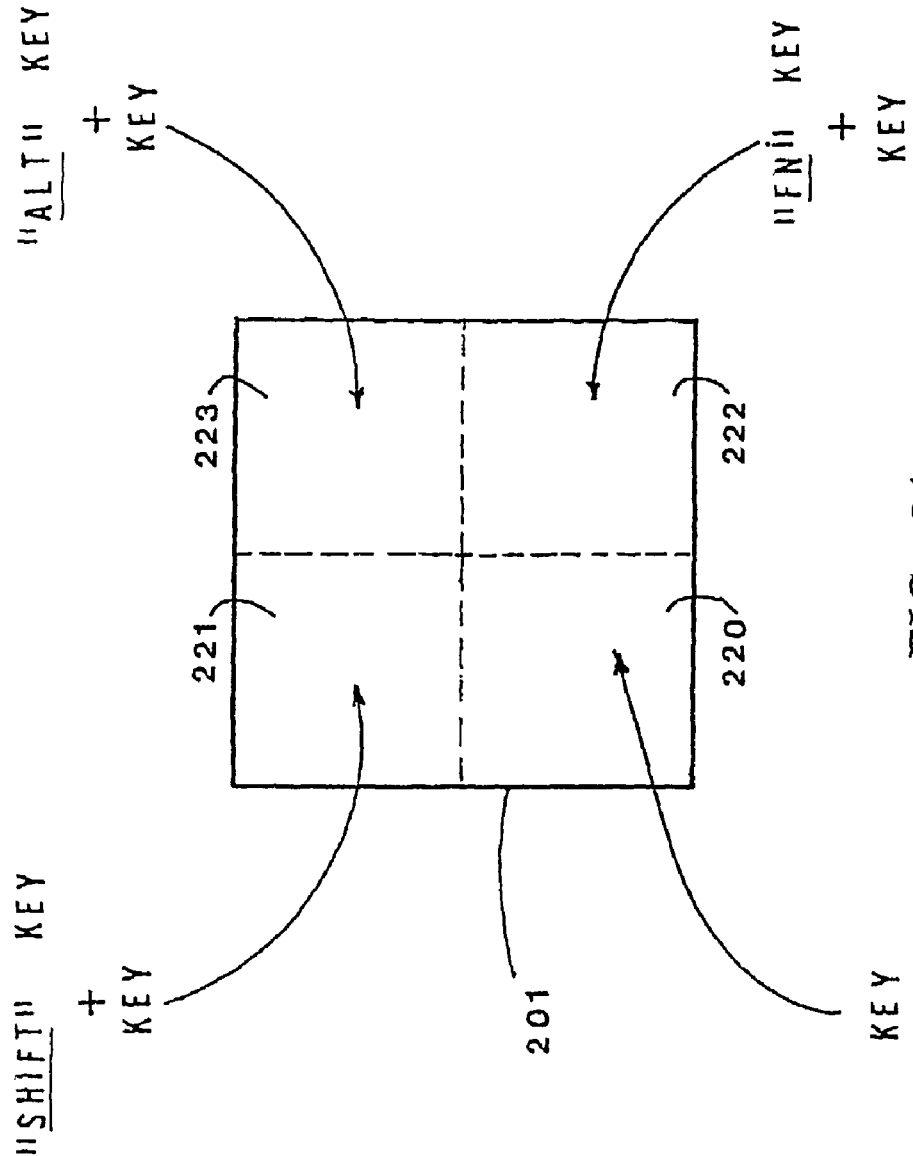
FIG. 31 is a schematic representation of face or stroking surface of typical key 201, showing the potential space for up to four different alphanumeric, punctuation and/or function symbols, one in each quadrant 220, 221, 222, 223, of said key surface, and indicating the key stroke combination needed to actuate the operation represented by the symbol in each quadrant, where "key" indicates actuation of the key shown, and "shift" key, "alt" key, and "fn" key indicates actuation of the corresponding shift, alt and fn keys, respectively, and "+" indicates the instruction to actuate the two indicated keys simultaneously.

In certain embodiments of key arrangements for this invention, situations may arise in which the number of keys available for assignment of alphanumeric, punctuation and function operations is less than the total number of alphanumeric, punctuation and function operations to be assigned to those keys. In conventional keyboards, this situation is partially resolved by the use of a shift key, which either manually or electronically assigns a second operation to any particular key, such that when the shift key and selected key are actuated simultaneously, that second operation for the selected key becomes activated. Actuation of another key, the Caps Lock key, causes the second operation to become the automatic operation for all keys, or for certain predetermined keys (e.g. the alphabet keys). In this invention each key may be assigned up to four operations, including the standard or nominal operation, which occurs if the selected key alone is actuated. This operation is shown or symbolized in the left lower quadrant 220 of the key stroking surface (FIG. 31) of selected key, or in schematic representations of said key stroking surface (e.g., FIGS. 29C, 29D, 30C and 30D) and involves in particular actuation of the lower case symbol for letters shown on keys with alphabet symbols in the left lower quadrant 220 of said key stroking surface.

The operation for any selected key actuated by simultaneous actuation of a "Shift" key and that selected key is shown or symbolized in the left upper quadrant 221 of said key stroking surface (FIG. 31), or in schematic representations of such key stroking surface (e.g., FIGS. 29C, 29D, 30C and 30D). The operation for any selected key actuated by simultaneous actuation of a "FN" [function] key and that selected key is shown or symbolized in the left lower quadrant 222 of said key stroking surface (FIG. 31), or in schematic representations of said key stroking surface (e.g., FIGS. 29C, 29D, 30C and 30D). The operation for any key actuated by simultaneous actuation of an "ALT" key and that selected key is shown or symbolized in the right upper quadrant 223 of said key stroking surface (FIG. 31), or in schematic representations of such key stroking surface (e.g., FIGS. 29C, 29D, 30C and 30D). Simultaneous actuation of a "Shift" key and a "FN" key actuates the operation the operation symbolized in the left upper quadrant 21 of said "FN" key, said operation being "FN Lock" which causes the "Function" operation to be locked on, i.e. to remain actuated for all subsequent key actuations such that all such subsequent key actuations will cause actuation of the operation shown or symbolized in the right lower quadrant 222 of the selected key stroking surface; said "Function lock" will be terminated with another simultaneous actuation of a "Shift" key and a "FN" key. Similarly, simultaneous actuation of a "Shift" key and a second "Shift" key actuates the operation symbolized in the left upper quadrant 221 of said "Shift" key, said operation being "CAPS Lock" which causes the "Shift" operation to be locked on, i.e. to remain actuated for all subsequent key actuations involving keys showing an alphabet letter in the left lower quadrant 220 of the key stroking surface ("alphabet keys"), such that all such subsequent key actuations of any alphabet key will cause actuation of the capital symbol (rather than lower case symbol) for said key, shown or symbolized in the right lower quadrant 222 of the selected key stroking surface; said "CAPS lock" operation will be terminated with another simultaneous actuation of the "Shift" key and a second "shift" key.

In addition an "ALT" lock operation may be disclosed (not illustrated) in which simultaneous actuation of a "Shift" key and an "ALT" key actuates the operation symbolized in the right upper quadrant 223 of said "ALT" key, said operation being "ALT Lock" which causes the "ALT" operation to be locked on, i.e. to remain actuated for all subsequent key actuations such that all such subsequent key actuations will cause actuation of the operation shown or symbolized in the right upper quadrant 223 of the selected key stroking surface; said "ALT lock" operating will be terminated with another simultaneous actuation of a "Shift" key and an "ALT" key. In addition, and in keeping with this arrangement, and with the principles of this invention that the keyboard may be fully operated with the forearms, hands and wrist stationary, this invention discloses an arrangement which eliminates the standard arrangement of a separate keyboard region for a standard numeric keypad matrix, (in which keys for the numerical operations 0 to 9 are arrayed in a rectangular arrangement, thereby eliminating the need for the palm and hand to move off the wrist rest to actuate these keys; instead, this invention discloses an arrangement in which these numerical operations are assigned to the "FN" operation, shown in the right lower quadrant region 222 of certain keys of the finger region arrayed in a rectangular arrangement on one keyboard half 100 or 200, or both, said numeric "FN" operations being actuated by sequentially actuating the selected one of said keys while simultaneously actuating, with a digit of the other hand. one or more designated keys situated on the contralateral keyboard half.

Figure 29C:
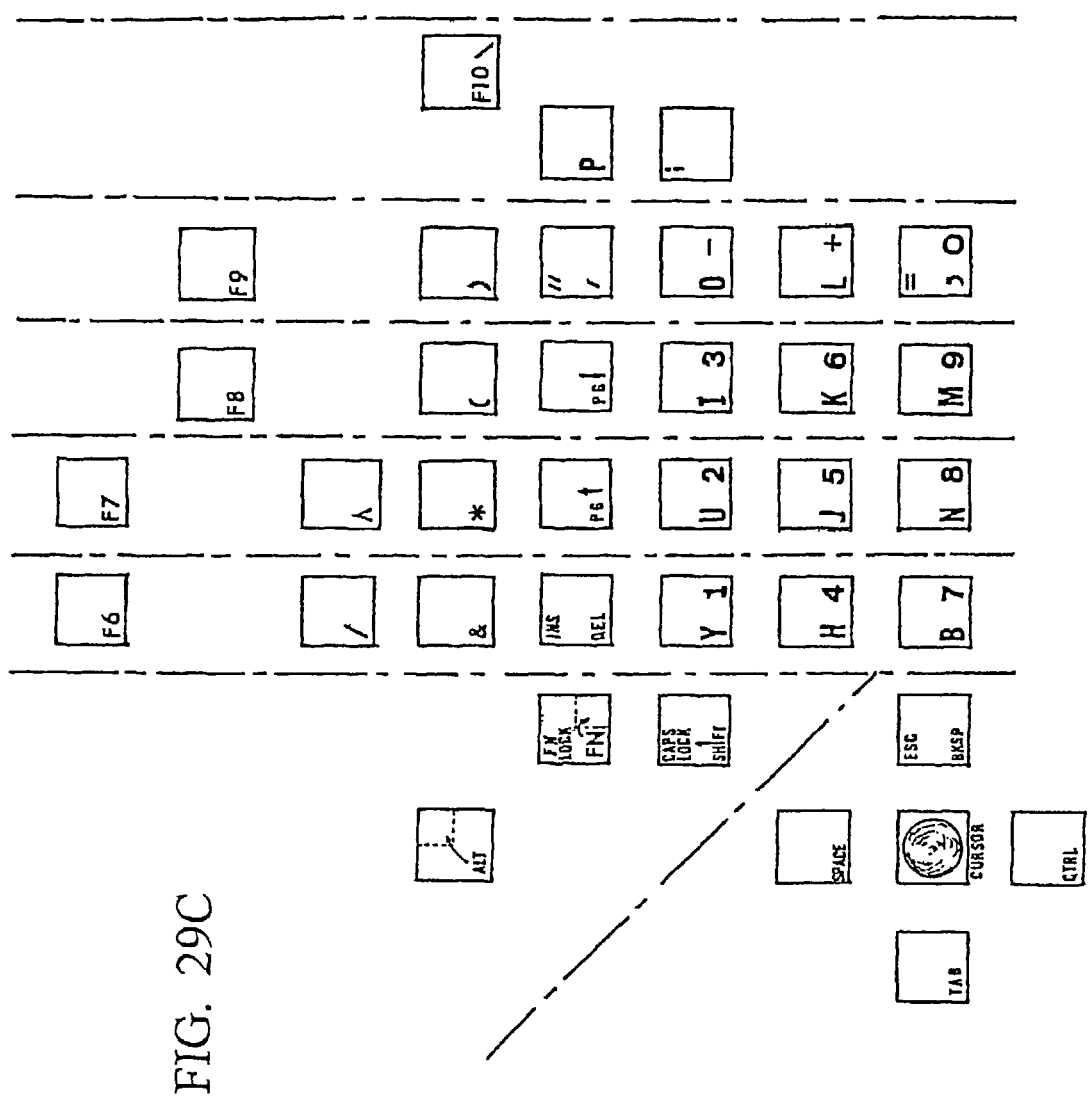
FIG. 29C is a schematic diagram or map showing an embodiment 306 for assignment of alphanumeric, punctuation and function operations to individual keys of the right keyboard half 100, according to the embodiment disclosed in FIG. 29A.
Figure 29D:
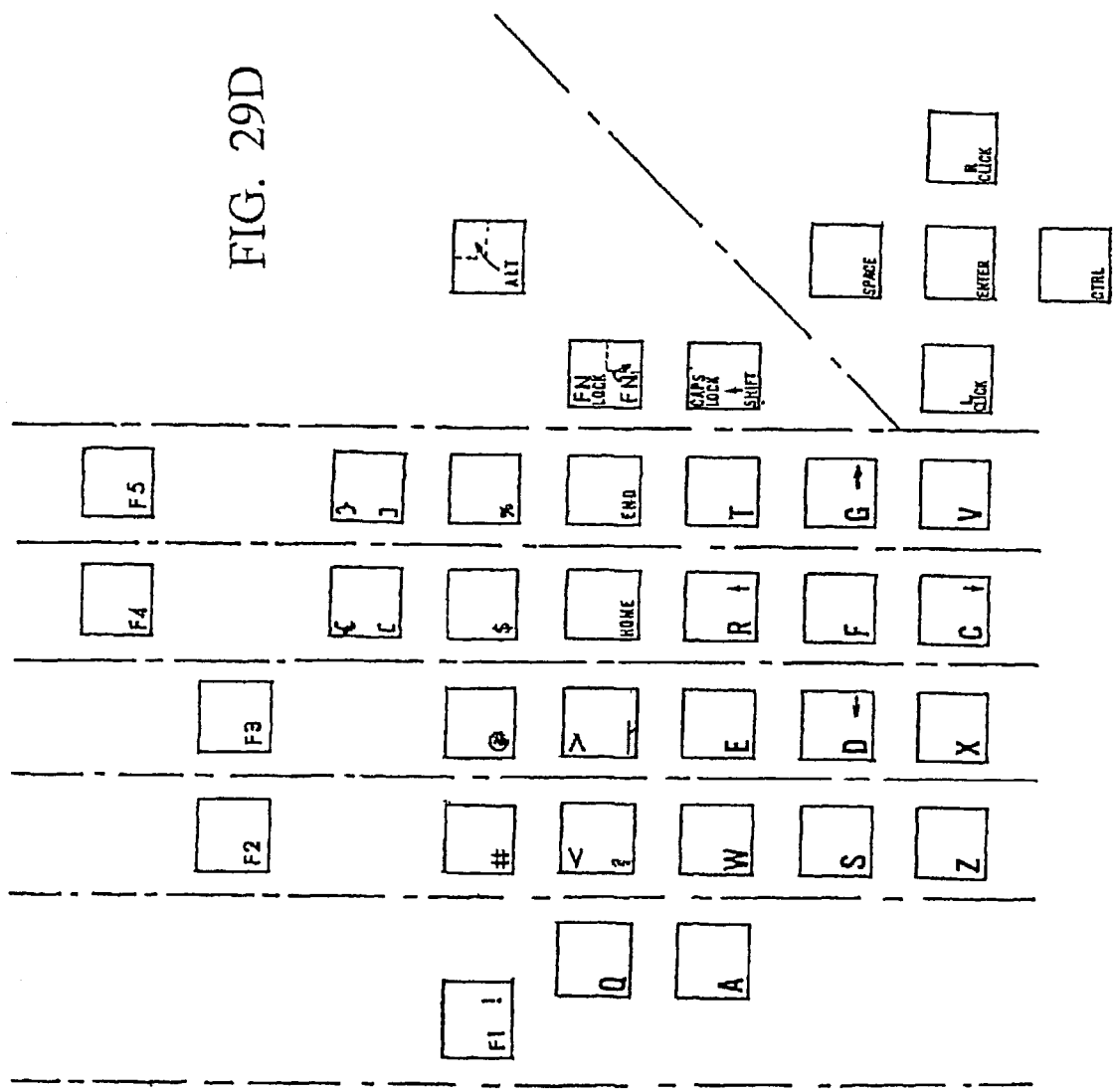
FIG. 29D is a schematic diagram or map showing an embodiment 307 for assignment of alphanumeric, punctuation and function operations to individual keys of the left keyboard half 200, according to the embodiment disclosed in FIG. 29B.

An embodiment for assignment of alphanumeric, punctuation and functional operations to various keys is shown in FIGS. 29C and 29D, and an alternative embodiment in FIGS. 31C and 31D. In these illustrated embodiments the numeric keypad is situated in the right keyboard half 100 and the key pad is actuated with simultaneous actuation of the "FN" key on the left keyboard half 200, or with antecedent and simultaneous actuation of the "FN" and "Shift" keys of either keyboard half, in which case the keyboard may then be deactivated by subsequent and simultaneous actuation of the "FN" and "Shift" keys of either keyboard half. Mirror image arrangements for the location and function of the numeric keypad are disclosed, as are arrangements in which numeric keypads are disposed on both keyboard halves 100, 200. This invention discloses all combinations and permutations for assignment of alphanumeric, punctuation and functional operations to various keys as such keys may be arranged according to the principles and embodiments of this invention.

I. Adjustments to Accommodate Different Hand Sizes and Shapes

A fundamental feature of the arrangement disclosed in this invention is the placement of the arrays of keys at the appropriate distance from the palm rest, thereby permitting each finger to reach its appropriate keys with natural, comfortable and ergonomic motions of the finger joints, without the need to move the wrist and palm from their rest positions on the palm rest region 8. Careful consideration will indicate that the requisite distance from palm to key arrays may vary among users, based upon differences in hand sizes, hand geometry and finger lengths. My invention discloses arrangements which permit users with different size or shape hands, or different finger lengths, to use this keyboard for its intended purposes.

Figure 33:
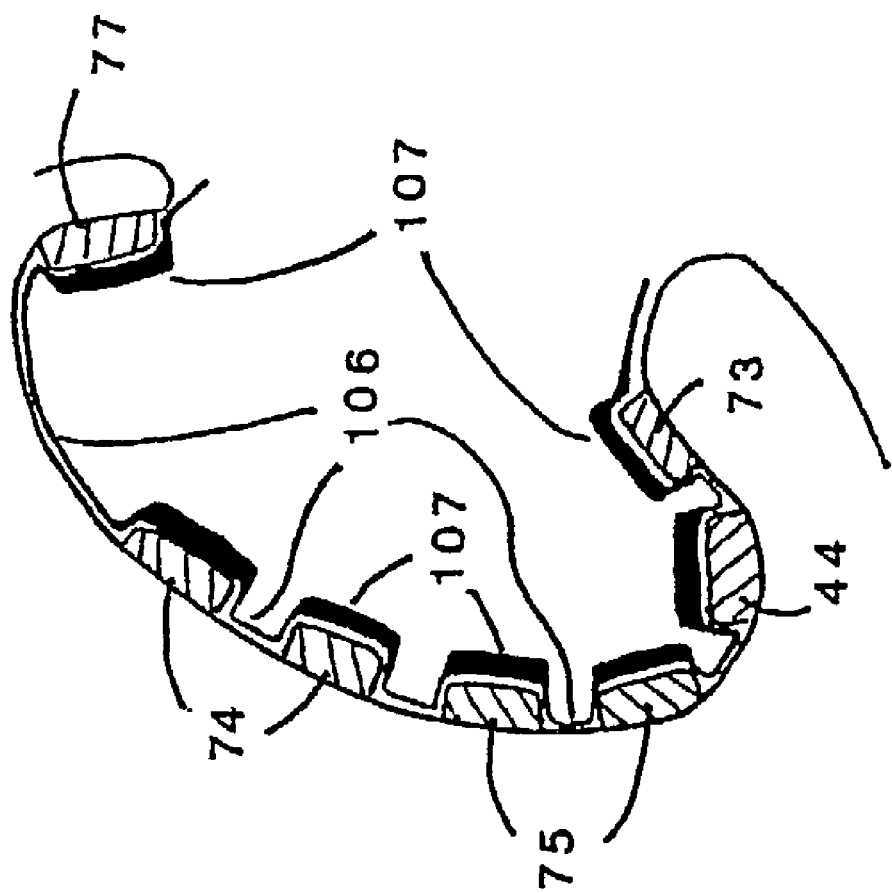
FIG. 33 is a transverse section of key array 60 along line 21A-21A as shown in FIG. 3A, showing, in cross section, the presence of a contoured flexible sheet 106 of variable thickness applied to the surface of the keys to change the effective key height.

Adjustments to Key Height by Means of Clear Overlay Sheet of Specific Thickness:

My patent discloses an arrangement to accommodate hands of different sizes and shapes. This arrangement is simple, inexpensive, and easily interchangeable for different users. As shown in FIG. 33, the arrangement consists of a specifically designed, flexible sheet 106, of rubber, plastic or similar material, curved and contoured to match the finger region 15 surface with its elevated key surfaces, said sheet 106 being placed securely and snugly over the finger region 15 surface and adjacent areas of the upper portion 2. The overlay may be of clear material, so that key designations are visible through the overlay 106, or alternatively of not clear material, with the appropriate key designations represented on the overlay 106 surface overlying each corresponding key. In certain areas of the overlay 106, namely where the overlay is positioned over keys, the overlay is of increased thickness 107 such that the increased thickness 107 of the overlay raises the key surface, bringing it closer to the tips of the users' fingertips. A series of such overlay sheets 15 is envisioned, in which the thickness 107 varies to accommodate differing finger lengths and hand sizes. Different patterns by which the thickness 107 of the key overlay 106 progresses from sheet to sheet may be established, representing alternative embodiments of this invention. In one embodiment, all keys in any sheet have the same overlay thickness 107, with different sheets manifesting progressive, graded increments of said overlays thickness 107. In another embodiment, as the thickness increases from sheet to sheet, the overlay thickness 107 over keys actuated by the shorter fingers increases proportionally more than for keys actuated by the long finger; conversely, in another embodiment the overlay thickness 107 increases proportionally less for the shorter than the longer fingers. Additionally, in various embodiments those regions of the overlay sheet 106 which do not overlay keys may be of standard or increased thickness. Various combinations and permutations of these various arrangements may be developed, as may be discerned by one skilled in the art. Certain aspects of this arrangement may derive from arrangements previously disclosed.

We disclose another arrangement, not illustrated, which is simple, inexpensive, and easily interchangeable for different users, consisting of a specifically designed, flexible sheet 106, of rubber, plastic or similar material, curved and contoured to match the palm rest region 8 and/or the hypothenar rest region 9, said sheet 106 being placed securely and snugly over the palm rest region 8 surface and/or the hypothenar rest region and adjacent areas of the upper portion 2. In certain areas of the sheet are of increased thickness 107 such that the increased thickness 107 of the sheet raises the palm rest region 8 and/or the hypothenar rest surface, such that when the user rests the palm and/or hypothenar areas of the hand on such sheet, the increased elevation of the palm rest region 8 and/or the hypothenar rest region 9 brings the tips of the users' fingertips closer to the stroking surface of the finger region 15 keys. A series of such overlay sheets 106 is envisioned, in which the thickness 107 varies to accommodate differing finger lengths and hand sizes. Different patterns by which the thickness 107 of the key overlay 106 progresses from sheet to sheet may be established, representing alternative embodiments of this invention. In one embodiment, all sheet have the same thickness 107 of the hypothenar rest region 9, with of the palm rest region 8. In another embodiment, all sheet have the same thickness 107 of the palm rest region 8, with different sheets manifesting progressive, graded increments of said thickness 107 of the hypothenar rest 9. In another embodiment, different sheets manifest progressive, graded increments of said thickness 107, and for each sheet the thickness 107 is the same for all regions of said sheet. Other possible arrangements and variations of sheet thickness or envisioned and disclosed in this invention.

In another arrangement the palm rest region and/or the hypothenar rest region may be moveable, such the distance between the palm rest region 8 and the finger region 15 keys, or between the hypothenar rest region 9 and finger region 15 keys may be moveably adjusted to accommodate hands and fingers of different sizes, such arrangements being previously disclosed or readily apparent to those skilled in the art.

In another arrangement the height of each individual key stroking surface may be fixably adjusted or modified by the use of interchangeable key caps, or screw-adjustable connectors between key and key caps, such arrangements being previously disclosed, or apparent to those skilled in the art.

J. Accommodations for Fingers of Differing Strengths:

The actual strength of all digits is not constant, but varies as a function of anatomic factors (i.e., the size of the pertinent muscles) as well as by use and training. Nevertheless the original typewriter design as well as contemporary keyboards, to the extent we have been able to determine, require the same force or pressure for actuation of all keys. The only related arrangement is seen in some electric typewriters, which permits adjustment of typing sensitivity (i.e. key actuation pressure); however, this adjustment affects all keys uniformly.

My invention discloses an arrangement, not illustrated, for the incorporation of varying degrees of resistance to key actuation among different keys, so that certain key have less resistance to key actuation than other keys, and thus certain keys are actuated with less digit pressure 209 than other keys. In one embodiment, key actuation mechanisms are selected so that keys actuated by the weaker digits require less pressure 209 for actuation than those actuated by stronger digits. In another arrangement, keys which are reached by digit motion which tend to require more effort (e.g. lateral motion) will themselves require less pressure 209 for key actuation. In another embodiment, small size keys will require less actuation pressure 209 than larger keys. Various other embodiments, utilizing other arrangements of key resistance are envisioned and are incorporated in this invention.

Current key actuation mechanisms (i.e. key switches) utilize various mechanisms to provide a resistance to key actuation motion; among those mechanisms are those utilizing a spring or the deformation of a flexible sheet or strip. Keys are currently available from various manufacturers which exhibit different resistances to key actuation, utilizing springs or deformable sheets or strips of different resistances, or other arrangements to achieve a range of resistances. In this invention, we disclose the arrangement in which such currently available keys of varying resistances (achieved by whatever mechanism) are incorporated in this keyboard arrangement as described herein, and envision that new key actuation mechanism, as may be developed for this purpose from time to time, are also included in this disclose.

K. Features to Enhance Tactile Identification of Keys:

The goal of this component of my invention is to vary the surface texture, contour, material, and temperature feel of keys (e.g. provide a different "feel" for alpha, numeric, punctuation and function keys) by the use of keys of different shapes, surface contours, textures, resiliencies and thermal conductivities, to provide tactile cues about key identity:

Current keyboards use keys mostly of a single uniform size and shape, although a few keys have different shapes, and these are typically larger in size. Almost all utilize a concave key surface, perhaps to match the convex shape of the digit tip. The uniformity of the surfaces of all keys eliminates tactile cues based on key contours or other surface characteristics. These cues are useful in facilitating identification of the key contacted by the digit before key actuation occurs, thereby improving key selection accuracy and hence typing speed.

My invention discloses an arrangement which specifically exploits potential differences among key shapes and other tactile characteristics to provide additional tactile information to permit the user to distinguish or differentiate by feel among different keys or groups of keys. To this end I disclose a family of potential variations in the tactile characteristics of keys, including, but not limited to:

1. Shape and surface contour: e.g. create keys which are, to varying degrees, concave, convex or pointed, flat, etc;

2. Texture: e.g. smooth; slightly or more severely roughened; ridged in various directions; containing one or more elevated points linear or curved elevation, or other projections, etc;

3. Resiliency: e.g. hard, as in hard plastic; soft, as in rubber or similar flexible materials; cloth-like; felt-like, etc;

4. Thermal conductivity: differences in this property make surfaces feel more or less cold to the touch; plastic and metal offer two different such feels because of differing thermal conductivities; other arrangements are also considered;

5. Other characteristics which also enhance tactile differentiation among keys may also be utilized.

The specific assignment of one or more of these tactile features to one or more keys may be random, or systematic; by way of example we disclose an embodiment, not illustrated, in which all vowels have tactile features different from consonants, which in turn may differ from punctuations, numerical keys, function keys, numbers, etc. Other patterns, combinations and permutations for assignment of these tactile features among keys may also be recognized and are included as embodiments in my patent disclosure.

L. Features to Enhance Visual Cues for Key Identification of Keys:

The physical arrangement of keyboard halves 100, 200, plus the disposition of the hands and digits on the keyboard halves 100, 200, as disclosed herein, prevents the keyboard user from viewing most of the keys, particularly the keys on which the fingers rest. This is particularly true as the forearm rotates into external rotation, such that the transverse key rows become less accessible to the user's line of sight. Visual cues utilized to guide a digit to its appropriate key thus become unavailable to the keyboard user.

In this invention I disclose an arrangement in which the positions of the each and every digit as it rests upon a key is displayed upon a region of the user's video display terminal VDT 110 (FIG. 34). In one embodiment, as shown in FIG. 34, computer software 108 provides a schematic representation of the actual keyboard key arrangement (such as is shown by way of examples in FIGS. 29A, 29B, 30A and 30B) on a region 109 of the VDT 110 and said software 108 also provides, on that VDT keyboard schematic representation, the actual assignment of alphanumeric, punctuation and functional operations to various keys (such as is shown by way of examples in FIGS. 29C, 29D, 30C and 30D). In addition to the standard electric switch 111 (of whatever mechanical, electronic or other nature) incorporated into each key 201 for key actuation 112 by standard key displacement in direction 208, I disclose an arrangement in which a second switch 114 (of whatever mechanical, electronic or other nature) is also incorporated into every key 201, and actuated by ultra light or minimal digit pressure 115, applied more or less in the same direction as the pressure 209 utilized for standard key actuation. As one or more digits rest upon a key or keys 201, the light pressure 115 so applied causes an initial minor displacement 116 of the key which is sufficient to actuate 117 the ultra light pressure switch 114, and this information is transmitted to the computer's processing unit via a microcontroller 118. Computer software 108 converts the electronic information into a visual display which indicates, on the dedicated keyboard display region 109 of the VDT 110, those keys which are, at any moment, being touched. In various arrangement, for example, those keys upon which fingers are resting or are lightly touched may be highlighted in a different or brighter color, or a different type face or type size, or any other method to yield an appropriate visual cue. In one arrangement, the computer software may be programmed to highlight differentially the last key touched, permitting the user to follow each finger as its moves to a key and touches it, confirming visually that the correct key has been selected before it is actuated. By referring to this visual display while typing (even without looking at the keys themselves) the user will be able to determine whether he/she is about to actuate the correct, desired key, before key actuation occurs. This arrangement will facilitate typing for those not fully schooled in touch-typing, thereby reducing error rate and enhancing typing speed.

The invention has been described with reference to the preferred embodiments. Obvious modifications and alterations will occur to others upon reading and understanding the preceding detailed description. It is intended that the invention be construed as including all such modifications and alterations insofar as they come within the scope of appended claims or the equivalents thereof.

I claim:

1. A keyboard with a keypad mounted thereupon, wherein the keypad is comprised of a plurality of finger key arrays adjacent to one another on the keyboard, wherein the fingers are identified as the index, long, ring and short fingers of a hand with a palm and wherein each finger key array has associated with it specific keys and wherein each finger key array has a different curvature to accommodate the range of motion of that finger to actuate the respective keys when the wrist and palm are in a stationary position and wherein the keys of each key array are positioned along an arc located between the maximum and the minimum range of flexion of finger motion through the metacarpophalangeal, proximal interphalangeal and distal interphalangeal joints without any wrist motion; wherein at least one key in each array is defined by the location of a finger tip when the metacarpophalangeal, proximal interphalangeal and distal interphalangeal joints for that finger are all in flexion and wherein the keyboard further includes a palm support adapted to support the palm in a stationary position relative to the keyboard while permitting free motion of the metacarpophalangeal joint and wherein each key has a top surface and wherein a projection perpendicular to the key top surface of at least one key in a finger key array will intersect within the bounds of the arc of that finger key array.

2. The keyboard according to claim 1 wherein the curvature for any shorter finger of the finger key array is less than the curvature for any longer finger of the finger key array.

3. The keyboard according to claim 1 wherein each finger key array is aligned with a plane defined by the path of the finger associated with that array as the finger moves from the clenched position to the fully extended position.

4. The keyboard according to claim 3 wherein the planes diverge as they extend away from the clenched hand.

5. The keyboard according to claim 3 further including at least one additional finger key array positioned laterally on either side of a respective key array plane, thereby providing at least one additional key actuatable by a finger.

6. The keyboard according to claim 5 wherein an additional finger key array for a single finger is positioned on each side of the plane associated with that finger.

7. The keyboard according to claim 1 wherein each key array has at least three keys.

8. The keyboard according to claim 1 wherein the arc upon which the keys of each key array are positioned is located between the maximum and the minimum range of flexion and extension of finger motion through the metacarpophalangeal, proximal interphalangeal and distal interphalangeal joints without any wrist motion and wherein a key positioned to be activated by a front surface of a finger has a top surface which forms an angle of less than 135 degrees with the top surface of a key adapted to be activated by a back surface of the same finger when the hand is grasping the keyboard.

9. The keyboard according to claim 1 wherein at least one key positioned along the arc is actuated by flexion at the joints of the finger and at least one other key positioned along the arc is actuated by a combination of extension and flexion of the three joints of the finger.

10. The keyboard according to claim 9 wherein each key in a key array has a top surface and the top surfaces of all keys in an array together form a non-planar surface and wherein actuation of each key requires a force perpendicular to the top surface of the respective key.

11. The keyboard according to claim 9 wherein any finger key array may have a cursor controller.

12. The keyboard according to claim 1 wherein the curvature is concave.

13. The keyboard according to claim 1 further including a thumb key array positioned adjacent to but separate from the finger key arrays and having a contour to accommodate the thumb range of motion.

14. The keyboard according to claim 13 wherein the thumb key array may have a cursor controller.

15. The keyboard according to claim 13 wherein the thumb range of motion is defined by an arc extending between the maximum and minimum range of flexion, extension, adduction and abduction of the thumb joints.

16. The keyboard according to claim 1 wherein the finger key arrays are contiguous with a palm rest region on a keyboard supporting the keypad.

17. The keyboard according to claim 1 wherein home key positions are defined for each finger in the position that finger would assume in a relaxed position.

18. The keyboard according to claim 1 wherein the keys associated with each finger key array are spaced apart at smaller distances for smaller fingers and larger distances for larger fingers.

19. The keyboard according to claim 1 wherein the keys associated with each finger key array are smaller for smaller fingers and larger for larger fingers.

20. The keyboard according to claim 1 wherein a plurality of keys are adapted to be activated by the front surface of a finger on a hand securing the keyboard while at least one other key is adapted to be activated by the back surface of a finger on a hand.

21. A keypad on a keyboard comprised of a plurality of finger key arrays adjacent to one another on the keyboard, wherein the fingers are identified as the index, long, ring and short fingers and wherein each finger key array has associated with it specific keys and wherein each finger key array has a different curvature to accommodate the range of motion of that finger to actuate the respective keys when the wrist and palm are in a stationary position and wherein the keys of each key array are positioned along an arc located between the maximum and the minimum range of flexion of finger motion through the metacarpophalangeal, proximal interphalangeal and distal interphalangeal joints without any wrist motion; wherein at least one key in each array is defined by the location of a finger tip when the metacarpophalangeal, proximal interphalangeal and distal interphalangeal joints for that finger are all in flexion; and wherein each key has a top surface and wherein a projection perpendicular to the top surface of at least one key in a finger key array will intersect within the bounds of the keys in the arc.

22. The keypad according to claim 21, wherein each key has a top surface and wherein a projection perpendicular to the key top surface of at least one key in each finger key array will intersect within the bounds of the keys in the arc of that finger key array.

23. A keypad on a keyboard comprised of a plurality of finger key arrays adjacent to one another on the keyboard, wherein the fingers are identified as the index, long, ring and short fingers and wherein each finger key array has associated with it specific keys and wherein each finger key array has a different curvature to accommodate the range of motion of that finger to actuate the respective keys when the wrist and palm are in a stationary position and wherein the keys of each key array are positioned along an arc located between the maximum and the minimum range of flexion and extension of finger motion through the metacarpophalangeal, proximal interphalangeal and distal interphalangeal joints without any wrist motion and wherein at least one key in each array is defined by the location of a finger tip when the metacarpophalangeal, proximal interphalangeal and distal interphalangeal joints for that finger are all in flexion and wherein at least two keys are positioned along the arc and separated from each other by an angle of at least 135 degrees and wherein the angle is measured from angle lines extending through the keys and perpendicular to the key support surface and wherein each key has a top surface and wherein a projection perpendicular to the key top surface of at least one key in a finger key array will intersect within the bounds of the arc of that finger key array.

\* \* \* \* \*

UNITED STATES PATENT AND TRADEMARK OFFICE
CERTIFICATE OF CORRECTION

| | | |
|---|---|---|
| PATENT NO. | : 7,324,019 B2 | Page 1 of 1 |
| APPLICATION NO. | : 10/169654 | |
| DATED | : January 29, 2008 | |
| INVENTOR(S) | : David J. Levenson | |

It is certified that error appears in the above-identified patent and that said Letters Patent is hereby corrected as shown below:

Title Page;
Face of the Patent, insert the following:
    Item -- (60) Related U.S. Application Data
       Provisional application No. 60/174,216, filed on Jan. 3, 2000. --

Signed and Sealed this

Twenty-ninth Day of July, 2008

JON W. DUDAS
*Director of the United States Patent and Trademark Office*